US006678886B2

(12) United States Patent
Kumon

(10) Patent No.: US 6,678,886 B2
(45) Date of Patent: Jan. 13, 2004

(54) APPARATUS AND METHOD FOR GENERATING OPTIMIZATION OBJECTS

(75) Inventor: Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/822,468

(22) Filed: Apr. 2, 2001

(65) Prior Publication Data

US 2001/0037497 A1 Nov. 1, 2001

Related U.S. Application Data

(63) Continuation of application No. PCT/JP98/05814, filed on Dec. 22, 1998.

(51) Int. Cl.[7] .............................. G06F 9/45; G06F 9/44
(52) U.S. Cl. ...................... 717/151; 717/135; 717/136; 717/140; 717/146; 717/154; 717/158; 717/159
(58) Field of Search ................................. 717/135, 136, 717/139, 140, 151, 146, 131, 154, 158, 159

(56) References Cited

U.S. PATENT DOCUMENTS

| 5,854,935 | A | * | 12/1998 | Enomoto ..................... 717/159 |
| 5,884,080 | A | * | 3/1999 | Blandy et al. .............. 717/130 |
| 5,963,740 | A | * | 10/1999 | Srivastava et al. .......... 717/130 |
| 6,023,583 | A | * | 2/2000 | Honda ......................... 717/158 |
| 6,141,791 | A | * | 10/2000 | Takuma et al. .............. 717/125 |
| 6,275,984 | B1 | * | 8/2001 | Morita ........................ 717/151 |
| 6,317,870 | B1 | * | 11/2001 | Mattson, Jr. ................. 717/151 |
| 6,397,379 | B1 | * | 5/2002 | Yates, Jr. et al. ........... 717/140 |

FOREIGN PATENT DOCUMENTS

| US | EP000908819 A2 | * | 4/1999 | ............. G06F/9/45 |

* cited by examiner

Primary Examiner—Todd Ingberg
Assistant Examiner—Qamrun Nahar
(74) Attorney, Agent, or Firm—Staas & Halsey LLP

(57) ABSTRACT

A system and method enable appropriately concentrating instruction strings or data pieces sporadically present in a plurality of regions over more than one compilation unit and adjusting the front-and-rear relationship of executed instruction strings without changing the program compilation unit such as a file, subroutine, or function and also without creating a link processing program for batch processing of the system as a whole. Different section names are given to the executed instruction strings and the unexecuted instruction strings and the referenced data and the unreferenced data of an object program respectively. When an execution module is generated from the object program by linking, the sections having an executed section name and the sections having an unexecuted section name in a plurality of files may be aggregated respectively to divide the instructions into an execution portion and an unexecution portion.

25 Claims, 38 Drawing Sheets

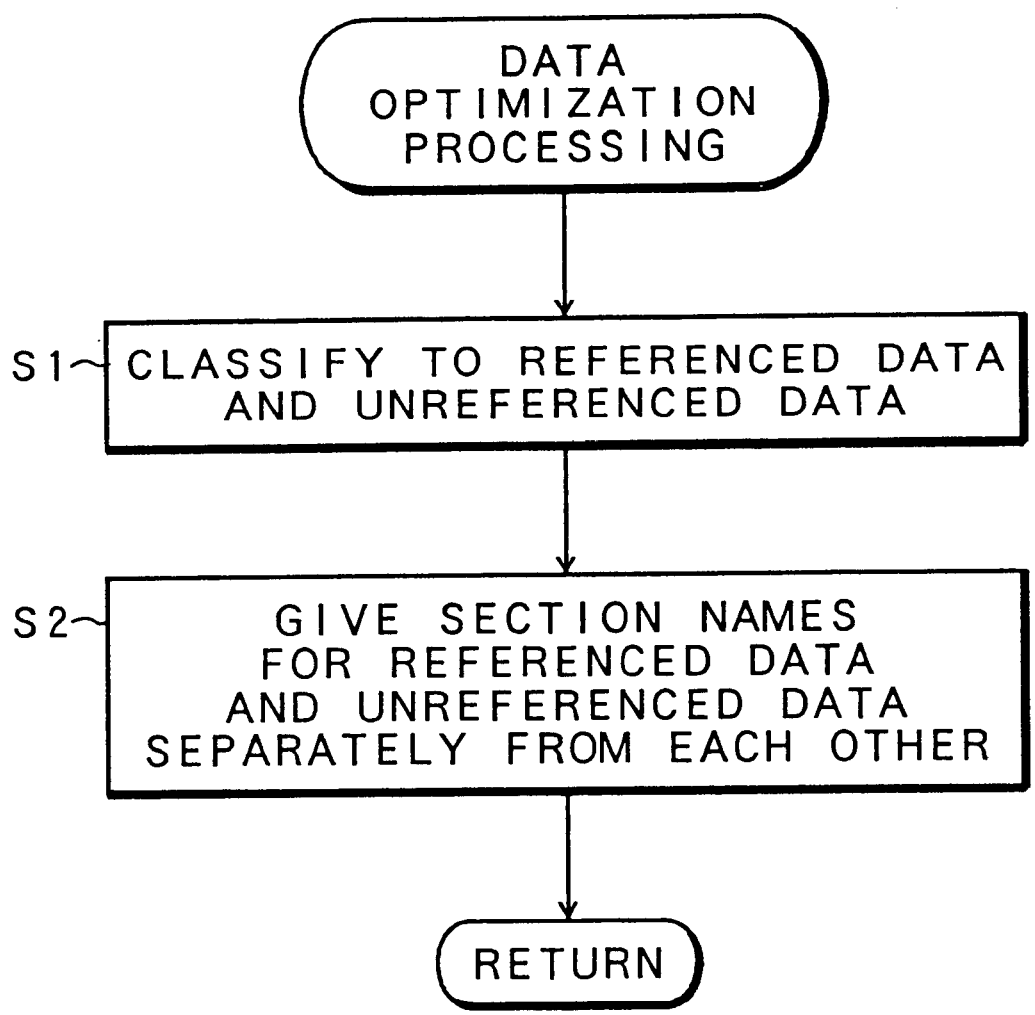

FIG. 10A 24-1 SOURCE FILE  
SUBROUTINE 38-1

```
sub1() {
    ....
    sub2();
    PROCESSING 1;
    if (ERROR OCCURRED) {
        ERROR PROCESSING 1;
        ....
    }
    return;
} sub2() {
    ....
    PROCESSING 2;
    if (ERROR OCCURRED) {
        ERROR PROCESSING 2;
        ....
    }
    return;
}
```

38-2

FIG. 10B 30-1 OBJECT FILE   84-1

| | | |
|---|---|---|
| | SECTION TEXT | |
| | public sub1 | |
| sub1: | .... | EXECUTED |
| | call sub2 | EXECUTED |
| | PROCESSNG 1 | EXECUTED |
| | IF NO ERROR OCCURRED then goto no error1; | EXECUTED |
| | ERROR PROCESSING 1 | UNEXECUTED |
| | .... | UNEXECUTED |
| no error1: | return; | EXECUTED |
| | public sub2 | |
| sub2: | .... | EXECUTED |
| | EROOR PROCESSING 2 | EXECUTED |
| | IF NO ERROR OCCURRED then goto no error2; | EXECUTED |
| | ERROR PROCESSING 2 | UNEXECUTED |
| | .... | UNEXECUTED |
| no error2: | return; | EXECUTED |
| | ENDSECTION TEXT | |

84-2

FIG. 11A 24-1 SOURCE FILE    SUBROUTINE 38-1

```
sub1() {
    ....
    sub2();
    PROCESSING 1;
    if (ERROR OCCURRED) {
        ERROR PROCESSING 1;
        ....
    }
    return;
} sub2() {
    ....
    PROCESSING 2;
    if (ERROR OCCURRED) {
        ERROR PROCESSING 2;
        ....
    }
    return;
}
```
38-2

FIG. 11B 30-1 OBJECT FILE    84-1

| | | |
|---|---|---|
| | SECTION TEXT | |
| | public sub1 | |
| sub1: | .... | EXECUTED |
| | call sub2 | EXECUTED |
| | PROCESSING 1 | EXECUTED |
| | IF NO ERROR OCCURRED then goto no_error1; | EXECUTED |
| | ERROR PROCESSING 1 | UNEXECUTED |
| | .... | UNEXECUTED |
| no_error1: | return; | EXECUTED |
| | public sub2 | |
| sub2: | .... | EXECUTED |
| | PROCESSING 2 | EXECUTED |
| | IF NO ERROR OCCURRED then goto no_error2; | EXECUTED |
| | ERROR PROCESSING 2 | UNEXECUTED |
| | .... | UNEXECUTED |
| no_error2: | return; | EXECUTED |
| | ENDSECTION TEXT | |

30 OBJECT FILE

```
         SECTION TEXT
         public sub1
sub1:    .....
         call sub2                              HIGHLY-FREQUENTLY EXECUTED
         PROCESSING 1                           HIGHLY-FREQUENTLY EXECUTED
         if OF CONDITION 1 HOLDS then goto label1;  HIGHLY-FREQUENTLY EXECUTED
ret1:    return;                                HIGHLY-FREQUENTLY EXECUTED
         ENDSECTION TEXT
```
⎫ 94-1

```
         SECTION TEXT2
label1:  PROCRSSING 2                           MEDIUM-FREQUENTLY EXECUTED
         .....                                  MEDIUM-FREQUENTLY EXECUTED
         if OF CONDITION 2 HOLDS goto ret1      MEDIUM-FREQUENTLY EXECUTED
         goto label2                            LOW-FREQUENTLY EXECUTED
         ENDSECTION TEXT2
```
⎫ 94-2

```
         SECTION TEXT3
label2:  PROCESSING 3                           LOW-FREQUENTLY EXECUTED
         .....                                  LOW-FREQUENTLY EXECUTED
         goto ret1                              LOW-FREQUENTLY EXECUTED
         ENDSECTION TEXT3
```
⎫ 94-3

```
         SECTION TEXT
         public sub2
sub2:    .....                                  HIGHLY-FREQUENTLY EXECUTED
         PROCESSING 4                           HIGHLY-FREQUENTLY EXECUTED
         return;                                HIGHLY-FREQUENTLY EXECUTED
         ENDSECTION TEXT
```
⎫ 94-4

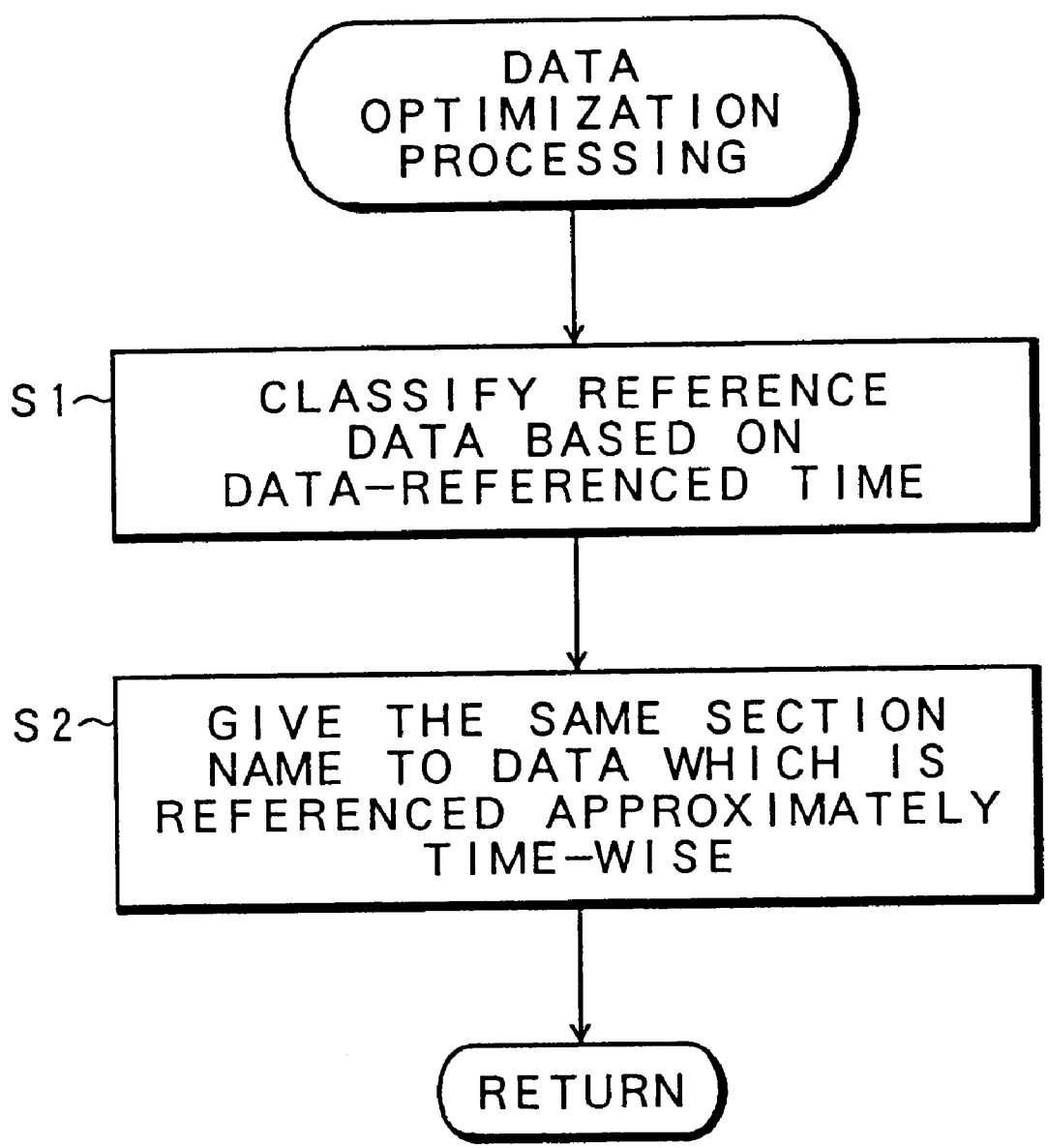

FIG. 18B

30-1 OBJECT FILE

```
               SECTION TEXT
sub1:          INDIRECT BRANCH AT TABLE 1 VALUE
table1:        dw label1
               dw label2      ~101-1
               dw label3
label1:        PROCESSING 1
               goto common1
label2:        PROCESSING 2
               goto common1
label3:        PROCESSING 3
               goto common1
common1:       return
```
100-1

```
sub2:          INDIRECT BRANCH AT TABLE 2 VALUE
table2:
               dw label4
               dw label5      ~101-2
               dw label6
label4:        PROCESSING 4
               goto common2
label5:        PROCESSING 5
               goto common2
label6:        PROCESSING 6
               goto common2
common2:       return
```
100-2

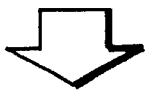

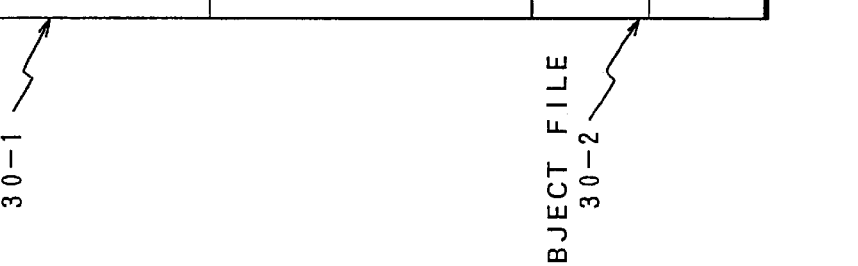

FIG. 24A

```
                                        30 OBJECT FILE
            SECTION TEXT                                              ┐
            public sub1                                               │
    sub1:   ....                          HIGHLY-FREQUENTLY EXECUTED  │
            call sub2                     EXECUTED                    ├─ 120-1
            PROCESSING 1                  HIGHLY-FREQUENTLY EXECUTED  │
            if OF CONDITION 1 HOLDS then goto label1;                 │
                                          HIGHLY-FREQUENTLY EXECUTED  │
    ret1:   return;                       HIGHLY-FREQUENTLY EXECUTED  │
            ENDSECTION TEXT                                           ┘

SECTION TEXT                                              ┐
            public label1                                             │
    label1: PROCESSING 2                  MEDIUM-FREQUENTLY EXECUTED  │
            ....                          MEDIUM-FREQUENTLY EXECUTED  ├─ 120-2
            if OF CONDITION 2 HOLDS goto ret1                         │
                                          MEDIUM-FREQUENTLY EXECUTED  │
            goto label2                   LOW-FREQUENTLY EXECUTED     │
            ENDSECTION TEXT                                           ┘

SECTION TEXT                                              ┐
            public label2                                             │
    label2: PROCESSING 3                  LOW-FREQUENTLY EXECUTED     │
            ....                          LOW-FREQUENTLY EXECUTED     ├─ 120-3
            goto ret1                     LOW-FREQUENTLY EXECUTED     │
            ENDSECTION TEXT                                           ┘

SECTION TEXT                                              ┐
            public sub2                                               │
    sub2:   ....                          HIGHLY-FREQUENTLY EXECUTED  │
            PROCESSING 4                  HIGHLY-FREQUENTLY EXECUTED  ├─ 120-4
            return;                       HIGHLY-FREQUENTLY EXECUTED  │
            ENDSECTION TEXT                                           ┘
```

APPARATUS AND METHOD FOR GENERATING OPTIMIZATION OBJECTS

This application is a continuation of PCT/JP98/05814, filed Dec. 22, 1998.

BACKGROUND OF THE INVENTION

1. Technical Field

The invention relates to an apparatus and a method for generating an optimization object for providing an execution program module by linking necessary routines etc. to an object program generated by compiling a source program made up of a number of source files and, more specifically, to an apparatus and a method for generating an optimization object which can generate an execution program module in which instruction strings are so located as to be suitable for execution of a computer's cache functions and predictive branch functions.

2. Background Art

In recent computer systems, to speedily execute instructions of a database processing program etc., future execution is predicted before actual execution. For example, a computer speed-up apparatus utilizing such prediction may come in:

I. a translation lookaside buffer (TLB) used for speedily referencing a page table provided to correlate with each other memory's physical locations and their logical locations observable from the program, II. a cache apparatus for using both time-wise and space-wise localities of a memory accessed by instructions to thereby hold necessary data in prediction of future memory accesses, or III. a branch prediction apparatus for predicting whether a branch instruction branches or not before it is determined, to previously execute the instruction speculatively according to the results of the prediction.

The above-mentioned database has a large memory region of for example 8 GB and its source program is comprised of an aggregate of roughly 1000 through 10000 source files, each typically having more than 100 to less than 10,000 instruction strings, so that if each file is supposed to have an average of 1000 instructions, the program as a whole comprises a vast number of instruction strings of as many as 100 thousand to 10 millions. Whether an execution speed-up apparatus would properly function for such a large sized program depends largely on the instruction strings, or their execution scheme, of the application program as an execution program module generated by linking necessary routines to the object program. For example, an instruction cache apparatus can be reserved for reducing an average memory access time for fetching necessary instructions required for execution thereof. When the instructions are executed consecutively without executing a branch instruction, those instructions are fetched one after another, so that by expanding a cache block in units of which they are fetched at a time by the instruction cache apparatus from the memory, the number of time-consuming memory accesses can be decreased to thereby speed up the execution.

An actual application program, however, contains conditional branch instructions, unconditional branch instructions, and subroutine calling instructions and so its execution efficiency is largely deteriorated because:

I. the instructions are not executed smoothly in that some of the instructions that are not executed in a block especially fetched from the memory, are arranged in the cache memory, thus decreasing its utilization ratio; and II. when a branch instruction is executed or a subroutine is called, control may be transferred to an instruction string described in a different file, so that instruction strings actually running in the execution program module may be discontinuous; to frequently update a TLB for the instructions provided for speedily referencing an instruction page table for use in correlating physical locations in the memory and logical locations observable from the program with each other.

Also, there are similar problems in data access; if data accessed and data not accessed are mixed in a certain execution environment or if data pieces accessed proximately time-wise are arranged at space-wise separate locations from each other, the execution speed is largely deteriorated because a data TLB is frequently updated which is used to speedily reference a logical address/physical address translation table for data addresses for use in correlating the physical locations in the memory and the logical locations observable from the program. Those situations can be improved by increasing the capacity of the cache memory capacity and the data TLB However, this is difficult to carry out in terms of cost and space because it increases the hardware size required.

Further, a branch prediction apparatus actually involves:

I. dynamic branch prediction for recording a hysteresis of whether conditions for a conditional branch instruction have been satisfied hitherto to thereby predict its future branch/non-branch;

II. explicit static branch prediction for recording beforehand branch/non-branch information of an instruction in the instruction itself when it is described to use it later when it is executed; and III. implicit static branch prediction for observing a location relationship between a branch destination and a branch source to thereby decide branch/non-branch when a relevant instruction is executed; which are combined and used actually. Dynamic prediction by the branch prediction apparatus uses a hysteresis about how a branch instruction has been executed hitherto in prediction of its future. Therefore, if a relevant program has a large loop configuration such that once an instruction is executed, a large number of other instructions are executed until that instruction is executed next time, all of the hystereses, which are necessary for hysteresis recording, of executed branch instructions cannot be recorded due to limitations on the hardware size, so that some of the past hystereses may not be utilized in many cases. Even in such a case where past hystereses cannot be utilized, static branch prediction can be applied. By implicit static branch prediction used often, a branch is often predicted according to an experience rule that conditional branch instructions of a loop typically "have often a skip destination instruction with a lower numbered address (i.e., backward branch) and hardly have a skip destination instruction with a higher numbered address (i.e., forward branch)". This experience rule, however, does not always work sufficiently.

Thus, in order to effectively operate the speed-up mechanism of hardware for executing instructions, when an object program or an execution program module is generated, an execution state is guessed or a thus generated program is executed experimentally. This is done to thereby decide instruction strings highly likely to be executed based on a record etc. of the execution state, or discriminate between execution portions and unexecution portions in a certain operational environment or between portions likely to be executed frequently and portions not likely to be done so. By dividing such a program into execution portions, unexecution portions, and frequently used portions and thus controlling it, the updating frequency of the TLB can be reduced, and also the location relationship between branch sources and branch destinations can be adjusted so that the implicit static branch prediction can function properly.

However, a source program made up as an aggregate of a large number of source files is compiled by the compiler processing each of its files, subroutines, functions, etc. as one unit to thereby generate an object program. Therefore, each compilation unit for the object file, object subroutine, and object function is divided into execution portions, unexecution portions, and frequently used portions, so that for example a plurality of files, i.e. compilation units, has not been processed so much. Accordingly, in order to concentrate execution instruction strings over a plurality of compilation units or optimize a system as a whole by adjusting those in front of and behind those strings, a vast source program comprised of a large number of source files must be compiled in a batch by a compiler newly developed, which takes a long time in compilation and is problematic.

Also, in order to generate an execution program module (application program) from an object program with a link processing program known as Linker or Assembler, for a unit of compilation, for example, each object file, module files of the execution program module are generated. As a result, a plurality of object files are not often processed at a time. Therefore, in order to concentrate execution instruction strings over a plurality of object files or adjust those in front of and behind those strings, it is necessary to create a link processing program for dedicated use in batch processing of a plurality of object files, thus taking a considerably long time in link processing.

SUMMARY OF THE INVENTION

In view of the above, it is an object of the invention to provide an optimization object generating apparatus and a method for appropriately concentrating instruction strings or data pieces which are sporadically present over a plurality of regions having a plurality of compilation units, without changing the compilation program unit such as a file, a subroutine, and a function, and also without creating a link processing program required in batch processing of the system as a whole.

(Optimization by Giving Section Name)

An optimization object generating apparatus according to the invention features a newly provided section name giving unit to the existing compiler, simulator, and linker. The compiler compiles a source program made up of a plurality of files to generate an object program in a predetermined compilation unit of a file, subroutine, function, etc. The simulator executes the object program thus generated by the compiler in a specific execution environment to generate execution information indicating executed instructions and unexecuted instructions. The section name giving unit featured by the invention uses the execution information thus generated by the simulator to, based thereon, separate a plurality of files of the object program into sections outputting executed instruction strings and sections outputting unexecuted instruction strings and give different section names to them. When generating an execution program from the object program by linking, a link processing unit (link processing program), which is the linker or the assembler, collects the sections with the execution section names and the sections with the unexecution section names of the plurality of files, and separates them into an execution portion and an unexecution portion. Thus, the invention utilizes the "function of aggregating sections with the same name" of the existing link processing unit for generating an execution program from an object program to collect the instructions sporadically present in a plurality of regions over more than one compilation unit and divide them into an instruction portion likely to be executed and an instruction portion unlikely to be executed, without changing the program compilation unit such as a file, a subroutine, or a function, and also without creating a link processing program required to process the whole system in a batch. In the case of a database processing program, for example, even if it has a large size of 5 MB, its instruction portion likely to be executed has a small size of about 200 KB. By collecting the execution instruction portion at one position, it is possible to largely reduce the frequency that the TLB for the instructions is updated in the cache apparatus and speed up the execution of the program as compared to the case where the 200 KB execution instruction portion is scattered over the whole size of 5 MB.

By the optimization object generating apparatus according to the invention, an object program generated by the compiler is executed in a specific execution environment, so that the execution frequency information of thus executed instructions is generated by a simulator, based on which information the section name giving unit gives section names to sections outputting the executed instruction strings of a plurality of files in the object program according to the execution frequency, after which finally the link processing unit, when generating an execution program module from the object program by linking, collects the sections having the same section name to one position, thus gathering the instruction strings with a high execution frequency into a small aggregate. In this case, the "function of aggregating sections with the same name" of the link processing unit is utilized to collect into a small aggregate the high execution frequency instruction strings sporadically present in a plurality of regions over more than one compilation unit without changing the program compilation unit such as a file, a subroutine, or a function. This is also done without creating a link processing program for batch processing of the system as a whole, thus largely reducing the updating frequency of the TLB for the instructions and speeding up program execution.

Also, by the optimization object generating apparatus according to the invention, an object program generated by the compiler is executed by a simulator in a specific execution environment to generate execution time information of thus executed instructions. Based on this information, the section name giving unit gives the same section name to sections outputting time-wise proximately executed instruction strings of a plurality of files of the object program After this the link processing unit, when generating an execution program module from the object program by linking, collects the sections with the same section names into one aggregate, thus placing proximately time-wise the instruction strings executed proximately space-wise over a plurality of files. In this case, the "function of aggregating sections with the same name" of the link processing unit is utilized to arrange the time-wise proximately executed instruction strings sporadically present in a plurality of regions over more than one compilation unit in a memory space proximately with each other without changing the program compilation unit such as a file, subroutine, or function and also without creating a link processing program for batch processing of the system as a whole, thus largely reducing the updating frequency of the TLB for the instructions and speeding up program execution.

Also, by the optimization object generating apparatus according to the invention, an object program generated by the compiler is executed by a simulator in a specific execution environment to generate the execution frequency information of thus executed instructions. The section name giving unit gives, based on the execution frequency information from the simulator, different section names to sections outputting branch destination instruction strings having a higher execution frequency and sections outputting branch destination instructions having a lower execution frequency so as to correctly conduct static branch prediction for deciding branching or non-branching predictably by observing a location relationship between branch destinations and branch sources. Finally, when generating an execution program module from the object program by linking, the link processing unit arranges based on the section names the above-mentioned branch destination instruction strings in a descending order of the execution frequency so as to conduct static branch prediction correctly. In this case, the "function of aggregating sections with the same name" of the link processing unit is utilized to arrange the front-and-rear relationship of the sporadically present branch instructions so as to bring about right static branch prediction without changing the program compilation unit such as a file, subroutine, or function. The link processing unit is also processed without creating a link processing program for batch processing of the system as a whole, thus increasing the probability of the successful static branch prediction to thereby speed up program execution.

Also, the optimization object generating apparatus may be provided with all functions of execution/unexecution discrimination based on giving of section names, execution frequency, translation of time-wise approximate execution to space-wise approximate execution, and front-and-rear relationship adjustment for successful static branch prediction. That is, in this case, the optimization object generating apparatus comprises a compiler which compiles a source program made up of a plurality of files to generate an object program in a predetermined compilation unit.

A simulator executes the object program generated by the compiler in a specific execution environment to thereby generate execution information indicating executed instructions and unexecuted instructions, frequency information of the executed instructions, and execution time information of the executed instructions.

A first section name giving unit gives, section names to the sections outputting the executed instruction strings and the sections outputting unexecuted instructions strings of a plurality of files in the object program based on the execution information from the simulator.

A second section name giving unit gives section names to the sections outputting the executed instruction strings of the plurality of object program according to the execution frequency based on the execution frequency information from the simulator.

A third section name giving unit gives the same section name to the sections outputting the instruction string executed proximately time-wise of the plurality of files of the object program based on the execution time information from the simulator.

A fourth section name giving unit gives different section names to the sections outputting branch destination instruction strings having a higher execution frequency and the sections outputting branch destination instruction strings having a lower execution frequency based on the execution frequency information from the simulator, so as to bring about right static branch prediction for deciding branching or non-branching predictably by observing a location relationship between branch destinations and branch sources when a conditional branch instruction is executed.

A link processing unit, collecting the sections having the same section name in the plurality of file into one aggregate to thereby arrange them in an execution portion and an unexecution portion separately when generating an execution program module from the object program by linking, so as to collect the instruction strings having a higher execution frequency into a small range in order to translate the time-wise proximately executed instruction strings into space-wise proximately executed instruction strings over a plurality of files, thus further placing the above-mentioned branch destination instruction strings in a descending order of the execution frequency for correct static branch prediction.

The optimization object generating apparatus also includes modifications of an arbitrary combination of the functions provided by giving of the section names such as:
I. execution/unexecution discrimination;
II. execution frequency;
III. translation of time-wise approximate execution to space-wise approximate execution; and
IV. adjustment of front-and-rear relationship for successful static branch prediction.

(Optimization by Giving of External Reference Names)

Another embodiment of the invention utilizes the "function of controlling the jointing order in the modules according to the external reference name list" of the existing link processing unit to thereby optimize the system without changing the compilation unit of the program such as a file, subroutine, or function. This is also done without creating a link processing program for batch processing of the system as a whole. To this end, the optimization object generating apparatus according to the invention comprises a compiler, a simulator, and a link processing unit and further an external reference name giving unit which is a feature of the invention. In this case, an object program generated by the compiler is executed by the simulator in a specific execution environment to thereby generate execution information indicating executed instructions and unexecuted instructions. Based on this execution information from the simulator, the external reference name giving unit divides a plurality of files in the object program into sections outputting the executed instruction strings and sections outputting unexecuted instruction strings to give those sections different external reference names. At the same time, an external reference name list is created that separates from each other the external reference names of the sections to which the executed instruction strings belong and the external reference names of the sections to which the unexecuted instruction strings belong. Finally, based on this external reference name list, the link processing unit collects, when generating an execution program module from the object program by linking, the executed sections and the unexecuted sections in the plurality of files to respective aggregates and separate them into execution portions and unexecution portions. Thus, the invention can utilize the "function of controlling the jointing order in the modules according to the external reference name list" of the existing link processing unit which generates the execution program module from the object program to thereby collect instructions sporadically present in a plurality of regions over more than one compilation unit into an instruction portion likely to be executed and an instruction portion unlikely to be executed. This is done without changing the program compilation unit such as a file, subroutine, or function and also without creating a link processing program for batch processing of the system as a whole. By thus aggregating the executed instructions, the frequency can be largely reduced of updating the instruction TLB in the cache memory apparatus to speed up program execution.

By the optimization object generating apparatus according to the invention also, an object program generated by the compiler is executed by the simulator in a specific execution environment to generate execution frequency information of the executed instructions. Based on this execution frequency information from the simulator, the external reference name giving unit gives sections outputting the executed instruction strings of a plurality of files in the object program external reference names according to the execution frequencies and, at the same time, creates an external reference name list in which they are sorted in a descending order of the execution frequency. Finally, based on the external reference name list, the link processing unit collects, when generating an execution program module from the object program by linking, the executed sections in the plurality of files to thereby arrange the instruction strings with higher execution frequencies in a small range. In this case, the "function of controlling the jointing order in the modules according to the external reference name list" of the link processing unit can be utilized to collect the instruction strings with higher execution frequencies sporadically present in a plurality of regions over more than one compilation unit into a small range. This is done without changing the program compilation unit such as a file, subroutine, or function and also without creating a link processing program for batch processing of the system as a whole, thus largely reducing the frequency of updating the instruction TLB and speeding up program execution.

Also, the optimization object generating apparatus according to the invention executes an object program generated by the compiler in a specific execution environment to create execution time information of the executed instructions. Based on the execution time information from the simulator, the external reference name giving unit gives the same external reference name to sections outputting instruction strings executed proximately time-wise of a plurality of files in the object program. At the same time, an external reference name list is created that lists the external reference names of the sections outputting the time-wise proximately executed instruction strings. Based on the external reference name list, the link processing unit, when generating an execution program module from the object program by linking, translates in arrangement the instruction strings executed proximately time-wise over a plurality of files into those approximate space-wise. In this case, the "function of controlling the jointing order in the modules according to the external reference name list" of the link processing unit to translate in arrangement the time-wise proximately executed instruction strings sporadically present in a plurality of regions over more than one compilation unit into those approximate space-wise in the memory space without changing the program compilation unit such as a file, subroutine, or function and also without creating a link processing program for batch processing of the system as a whole, thus largely reducing the frequency of updating the instruction TLB and speeding up program execution.

Also, by the optimization object generating apparatus according to the invention, an object program generated by the compiler is executed by the simulator in a specific execution environment to thereby generate execution frequency information of the execution instructions. Based on the execution frequency information from the simulator, the external reference name giving unit gives different external reference names to sections outputting branch-destination instruction strings having a higher execution frequency and sections outputting branch-destination strings having a lower execution frequency for successful static branch prediction for deciding branching or non-branching predictably by observing the location relationship between branch destinations and branch sources when conditional branch instructions are executed At the same time, an external reference name list that lists the external reference names is generated in a descending order of the execution frequency. Based on the external reference name list, the link processing unit arranges, when generating an execution program module from the object program by linking, the branch-destination instruction strings in a descending order of the execution frequency so that the static branch prediction come true. In this case, the "function of controlling the jointing order in the modules according to the external reference name list" of the link processing unit can be utilized to adjust the front-and-rear relationship of the branch-destination instructions sporadically present for successful static branch prediction without changing the program compilation unit such as a file, subroutine, or function. This is also done without creating a link processing program for batch processing of the system as a whole, to enhance the probability of successful static branch prediction, thus speeding up program execution.

Also, the optimization object generating apparatus may be provided with such functions as execution/unexecution discrimination by giving of external reference names, execution frequency, translation of time-wise approximate execution into space-wise approximate execution, and adjustment of front-and-rear relationship for successful static branch prediction. That is, in this case the optimization object generating apparatus comprises a compiler for generating in a predetermined compilation unit an object program from a source program made up of a plurality of files.

A simulator executes the above-mentioned object program generated by the compiler in a specific execution environment to generate execution information indicating executed instructions and unexecuted instructions, frequency information of the executed instructions, and execution time information of the executed instructions.

A first reference name giving unit divides, based on the execution information from the simulator, a plurality of files in the object program into sections outputting the executed instruction strings and sections outputting the unexecuted instruction strings to thereby give them different external reference names and, at the same time, generate an external reference name list that separates from each other the external reference names of the sections to which the executed instruction belong and the external reference names of the sections to which the unexecuted instruction strings belong.

A second external reference name giving unit gives, based on the execution frequency information from the simulator, external reference names to the sections outputting the executed instruction strings of the plurality of files in the object program according to the execution frequency and, at the same time, generates an external reference name list that sorts them in a descending order of the execution frequency A third external reference name giving unit gives, based on the execution time information from the simulator, the same external reference name to the sections outputting the instruction strings executed proximately time-wise of the plurality of files in the object program and, at the same time, generates an external reference name list that lists the external reference names of the sections outputting the instruction strings executed proximately time-wise.

A fourth external reference name giving unit gives, based on the execution frequency information from the simulator, different external reference names to sections outputting branch-destination instruction strings having a higher execution frequency and sections outputting branch-destination instruction strings having a lower execution frequency for successful static branch prediction for deciding branching or non-branching by observing the location relationship between the branch destinations and the branch sources when conditional branch instructions are executed. At the same time, an external reference name list is generated, which lists them in a descending order of the execution frequencies.

A link processing unit, when generating an execution program module from the object program by linking, collects based on the external reference name list the executed sections and the unexecuted sections in the plurality of files into respective aggregates to separate them into execution portions and unexecution portions. The executed sections in the plurality of files are gathered into one aggregate in order to arrange the instruction strings with a higher execution frequency into a small range, thus translating the instruction strings executed approximate time-wise over the plurality of files into those approximate space-wise and also arranging the above-mentioned branch-destination instruction strings in a descending order of the execution frequency for successful static branch prediction.

(Optimization of Data Arrangement)

The optimization object generating apparatus according to the invention utilizes the "function of aggregating sections with the same name" of the existing link processing unit for generating an execution program module from an object program to thereby divide data sporadically present in a plurality of regions over more than one compilation unit into data pieces likely to be referenced and data unlikely to be referenced during execution. This is done without changing the program compilation unit such as a file, subroutine, or function, and also without creating a link processing program for batch processing of the system as a whole.

To this end, the optimization object generating apparatus permits the simulator to execute the object program generated by the compiler in a specific execution environment to thereby generate data reference information indicating data referenced and data not referenced during execution. Based on the data reference information from the simulator, the section name giving unit gives different section names to the data referenced and the data not referenced during execution of a plurality of files in the object program. The link processing unit, when generating an execution program module from the object program by linking, collects the data having the same section name into one aggregate to thereby adjacently arrange the referenced data and the unreferenced data separately from each other. In this case, the "function of aggregating sections with the same name" of the existing link processing unit for generating an execution program from the object program cam be utilized to divide data sporadically present in a plurality of regions over more than one compilation unit into data likely to be referenced and data unlikely to be referenced without changing the program compilation unit such as a file, subroutine, or function. This is also done without creating a link processing program for batch processing of the system as a whole, thus largely reducing the frequency of updating the data TLB to speed up program execution.

Also, the optimization object generating apparatus according to the invention comprises a simulator for executing an object program generated by the compiler under a specific execution environment to generate reference time information of the referenced data. A section name giving unit, based on the reference time information from the simulator, gives the same section name to sections outputting the data referenced proximately time-wise of a plurality of files in the object program. A link processing unit, when generating an execution program module from the object program by linking, collects and arranges the time-wise proximately referenced data pieces so that they may be approximate with each other space-wise. In this case, the "function of aggregating sections with the same name" of the link processing unit can be utilized to arrange the time-wise proximately referenced data pieces sporadically present in a plurality of regions over more than one compilation unit, so that they may be approximate with each other space-wise without changing the program compilation unit such as a file, subroutine, or function and also without creating a link processing program for batch processing of the system as a whole, thus largely reducing the frequency of updating the TLB to speed up program execution.

Also, the optimization object generating apparatus includes modifications by an arbitrary combination provided by giving of external reference names, such as:

I. separating execution and unexecution from each other;
II. classification based on execution frequency;
III. translation of time-wise approximate execution to space-wise approximate execution; and
IV. adjustment of front-and-rear relationship for successful static branch prediction.

(Method of Optimization by Giving of Section Names)

The invention provides also a method for generating an optimization object and, when execution and unexecution are discriminated from each other in giving of section names, comprises performing a compilation by generating an object program in a predetermined compilation unit from a source program made up of a plurality of files.

A simulation is performed by executing the object program generated by the compilation in a specific execution environment to thereby generate execution information indicating executed instructions and unexecuted instructions.

A section name giving is performed, based on the execution information from the simulation, by dividing a plurality of files in the object program into sections outputting executed instruction strings and sections outputting unexecuted instruction strings to thereby give them different sections names.

A link processing is performed, when generating an execution program module from the object program by linking, by collecting the sections having the executed section names and the section having the unexecuted section names in the plurality of files into one aggregates respectively to thereby discriminate between execution portions and unexecution portions.

The sections are arranged in a descending order of the execution frequency in giving of the section names, which comprises performing a simulation by executing the object program generated by the compilation in a specific execution environment to thereby generate execution frequency information of the executed instructions.

A section name giving is performed based on the execution frequency information from the simulation step, by giving section names of the sections outputting executed instruction strings of the plurality of files in the object program according to the execution frequencies.

A link processing is performed, when generating an execution program module from the object program by linking, by collecting the sections having the same section name into one aggregate to thereby gather the instruction strings having a higher execution frequency into a small range.

Also, when the time-wise approximate instructions are to be re-arranged so that they may be approximate space-wise in giving of the section names, it comprises performing a compilation by generating an object program in a predetermined compilation unit from a source program made up of a plurality of files.

A simulation is performed by executing the above-mentioned object program generated by the compilation in a specific execution environment to thereby generate execution time information of the executed instructions.

A section name giving is performed, based on the execution time information from the simulation, by giving the same section name to sections outputting instruction strings executed proximately time-wise of the plurality of files in the object program.

A link processing is performed when generating an execution program module from the object program by linking, by collecting the sections having the same section name into one aggregate to thereby arrange the instruction strings executed proximately time-wise over a plurality of files so that they may be approximate with each other space-wise.

Also, when optimization of arrangement is made based on static branch prediction, it comprises performing a compilation by generating an object program in a predetermined compilation unit from a source program made up of a plurality of files.

A simulation is performed by executing the object program generated by the compilation in a specific execution environment to thereby generate execution frequency information of the executed instructions.

A section name giving is performed, based on the execution frequency information from the simulation, by giving different section names to sections outputting branch-destination instruction strings having a higher execution frequency and sections outputting branch-destination instruction strings having a lower execution frequency for successful static branch prediction for deciding branching or non-branching predictably by observing the location relationship between branch destinations and branch sources when conditional branch instructions are executed.

A link processing is performed, when generating an execution program module from the object program, by arranging the above-mentioned branch-destination instruction strings in a descending order of the execution frequency based on the section names for successful static branch prediction.

Also, when all of a plurality of optimization functions are combined, it comprises performing a compilation by generating an object program in a predetermined compilation unit from a source program made up of a plurality of files.

A simulation is performed by executing the above-mentioned object program generated by the compilation in a specific execution environment to thereby generate execution information indicating executed instructions and unexecuted instructions, frequency information of executed instructions, and execution time information of the executed instructions.

A first section name giving is performed, based on the execution information from the simulation by giving, section names to sections outputting executed instructions and sections outputting unexecuted instructions of a plurality of files in the object program.

A second section name giving is performed based on the execution frequency information from the simulation, by giving section names to the sections outputting the executed instruction strings of the plurality of files in the object program according to the execution frequencies.

A third section name giving is performed based on the execution time information from the simulation, by giving the same section names to the sections outputting the instruction strings executed proximately time-wise of the plurality of files in the object program.

A fourth section name giving is performed based on the execution frequency information from the simulation, by giving different section names to the sections outputting branch-destination instruction strings having a higher execution frequency and the sections outputting branch-destination instruction strings having a lower execution frequency for successful static branch prediction for deciding branching or non-branching predictably by observing the location relationship between branch destination and branch sources when conditional branch instructions are executed.

A link processing is performed when generating an execution program module from the object program, by collecting the sections having the same section name of the plurality of files into one aggregate respectively to thereby divide them into execution portions and unexecution portions. The instruction strings having a higher execution frequency are gathered into a small range in order to arrange the time-wise proximately executed instruction strings over a plurality of files so that they may be approximate with each other space-wise. The above-mentioned branch-destination instruction strings are arranged in a descending order of the execution frequency so that the above-mentioned static branch prediction may come true.

(Optimization Method Based on External Reference Names)

When execution and unexecution are discriminated from each other in giving of external reference names, it comprises performing a compilation by generating an object program in a predetermined compilation unit from a source program made up of a plurality of source files.

A simulation is performed by executing the object program generated by the compilation in a specific execution environment to thereby generate execution information indicating executed instructions and unexecuted instructions.

A reference name giving is performed, based on the execution information from the simulation, by dividing a plurality of files in the object program into sections outputting executed instructions and sections outputting unexecuted instructions to thereby give them different external reference names. At the same time, an external reference name list is generated, that separates from each other the external reference names of the sections to which the executed instructions belong and the external reference names of the sections to which the unexecuted instruction strings belong.

A link processing is performed, when generating an execution program module from the object program by linking, by collecting the executed sections and the unexecuted sections in the plurality of files into one aggregate respectively based on the external reference name list to thereby divide them into execution portions and unexecution portions.

Also, to arrange the external reference names in a descending order when giving them, the invention comprises performing a compilation by generating an object program in a predetermined compilation unit from a source program made up of a plurality of files.

A simulation is performed by executing the object program generated by the compilation in a specific execution environment to thereby generate execution frequency information of executed instructions.

An external reference name giving is performed, based on the execution frequency information from the simulation by giving external reference names of a plurality of files in the object program according to the execution frequencies of the sections outputting the executed instruction strings and, at the same time, generating an external reference name list that sorts the names in a descending order of the execution frequency.

A link processing is performed when generating an execution program module from the object program, by collecting the executed sections of the plurality of files into one aggregate to thereby gather the instruction strings with a higher execution frequency into a small range.

Also, to re-arrange the time-wise approximate instructions so that they may be approximate space-wise in giving of external reference names, the invention comprises performing a compilation by generating an object program in a predetermined compilation unit from a source program made up of a plurality of files.

A simulation is performed by executing the object program generated by the compilation in a specific execution environment to thereby generate execution time information of executed instructions.

An external reference name giving is performed based on the execution time information from the simulation, by giving the same external reference name to sections outputting instruction strings executed proximately time-wise of a plurality of files in the object program and, at the same time, generating an external reference name list that lists the external reference names of the sections outputting the instruction strings executed proximately time-wise.

A link processing is performed when generating an execution program module from the object program, by arranging the instruction strings executed proximately time-wise over a plurality of files so that they may be approximate space-wise based on the external reference name list.

Further, to arrange them based on static branch prediction by giving of external reference names, the invention comprises performing a compilation by generating an object program in a predetermined compilation unit from a source program made up of a plurality files.

A simulation is performed by executing the above-mentioned object program generated by the compilation in a specific execution environment to thereby generate execution frequency information of executed instructions.

An external reference name giving is performed based on the execution frequency information from the simulation, by giving different external reference names to sections outputting branch-destination instructions having a higher execution frequency and sections outputting branch-destination instructions having a lower execution frequency for successful static branch prediction for deciding branching and non-ranching by observing the location relationship between branch destinations and branch sources when conditional branch instructions are executed and, at the same time generating therein said external reference names in a descending order of execution frequency.

A link processing is performed, when generating an execution program module from the object program, by arranging the above-mentioned branch-destination instruction strings in a descending order of the execution frequency so that the above-mentioned static branch prediction may come true based on the above-mentioned external reference name list.

Further, when all of the optimization functions are combined by giving of external reference names, the invention comprises performing a compilation by generating an object program in a predetermined compilation unit from a source program made up of a plurality of files.

A simulation is performed by executing the object program generated by the compilation in a specific execution environment to thereby generate execution information indicating executed instructions and unexecuted instructions, frequency information of the executed instructions, and execution time information of the executed instructions.

A first reference name giving is performed based on the execution information from the simulation, by dividing a plurality of files in the object program into sections outputting executed instruction strings and sections outputting unexecuted instruction strings. At the same time, an external reference name list is generated that separates from each other the external reference names of the sections to which the executed instruction strings belong and the external reference names of the sections to which the unexecuted instruction strings belong.

A second external reference name giving is performed based on the execution frequency information from the simulation, by giving external reference names to the sections outputting the executed instruction strings according to the execution frequencies of the plurality of files in the object program. At the same time, an external reference name list is generated that sorts the names in a descending order of the execution frequency.

A third external reference name giving is performed based on the execution time information from the simulation, by giving the same external reference name to the sections outputting the instruction strings executed proximately time-wise. At the same time, an external reference name list is generated that lists the external reference names of the sections outputting the instruction strings executed proximately time-wise;

A fourth external reference name giving is performed based on the execution frequency information from the simulation, by giving different external reference names to the sections outputting branch-destination instruction strings having a higher execution frequency and the sections outputting branch-destination instruction strings having a lower execution frequency. At the same time, generating an external reference name list is generated that lists the names in a descending order of the execution frequency.

A link processing is performed, when generating an execution program module from the object program, by collecting the executed sections and the unexecuted sections in a plurality files into an aggregate respectively, based on the external reference name list, to thereby divide them into execution portions and unexecution portions and gather the higher-execution frequency into a small range in order to arrange the instruction strings executed proximately time-wise over a plurality of files so that they may be approximate from each other space-wise, and also arrange the above-mentioned branch-destination instruction strings in a descending order of the execution frequency so that static branch prediction may come true.

(Optimization Method by Discrimination Between Referenced Data and Unreferenced Data)

In this case, the optimization method comprises performing a compilation by generating an object program in a predetermined compilation unit from a source program made up of a plurality of source files.

A simulation is performed by executing the object program generated by the compilation in a specific execution environment to thereby generate data reference information indicating data referenced and data not referenced during execution.

A section name giving is performed based on the data reference information from the simulation, by giving different section names to data referenced and data not referenced during execution of a plurality of files in said object program.

A link processing is performed when generating an execution program module from the object program, by collecting the data having the same section names into one aggregate to thereby adjacently arranging the referenced data and the unreferenced data separately from each other space-wise. (Optimization Method by Re-arrangement of Time-wise Approximate Data Into Space-wise Approximate Data)

In this case, the optimization object generating method comprises performing a compilation by generating an object program in a predetermined compilation unit from a source program made up of a plurality of files.

A simulation is performed by executing the object program generated by the compilation in a specific execution environment to thereby generate reference time information of referenced data.

A section name giving is performed based on the reference time information from the simulation by giving, the same section name to sections outputting the data referenced proximately time-wise of a plurality of files in the object program.

A link processing is performed, when generating an execution program module from the object program by linking, by collecting the sections having the same section name into one aggregate to thereby arrange the time-wise proximately referenced data so that it may be proximate space-wise.

The details of this optimization object generating method correspond to the configuration of the apparatus.

BRIEF DESCRIPTION OF DRAWINGS

FIG. 9 is a flowchart indicating in subroutines processing for discriminating between referenced and unreferenced states of data in the optimization processing of FIG. 8;

FIGS. 10A–10D are illustrations respectively explaining specific examples of a source program, an object with execution information, an object provided with a section name, and an execution module when the optimization processing of FIG. 8 is applied;

FIGS. 11A–11E are illustrations respectively explaining specific examples of a source program, an object with execution information, an object separated into an execution portion and an unexecution portion for each file, an object provided with a section-name, and an execution module when the optimization processing of FIG. 8 is applied;

FIGS. 13A and 13B are illustrations respectively explaining an object with execution frequencies and an execution module arranged in an order of execution frequencies in the optimization processing of FIG. 12;

FIG. 15 is a flowchart for indicating in subroutines processing for re-arranging time-wise approximate data into space-wise approximate data in the optimization processing of FIG. 14;

FIGS. 18A–18D are illustrations respectively explaining a switch statement in a source program, an object, and an execution program module in switch-statement optimization processing of FIG. 17;

FIGS. 22A–22C are illustrations explaining an object provided with an external reference name, an external reference name list, and an execution program module in a case where the optimization processing of FIG. 21 is applied;

BEST MODES FOR CARRYING OUT OF THE INVENTION (Functional Configuration of Apparatus)

Figure 1:
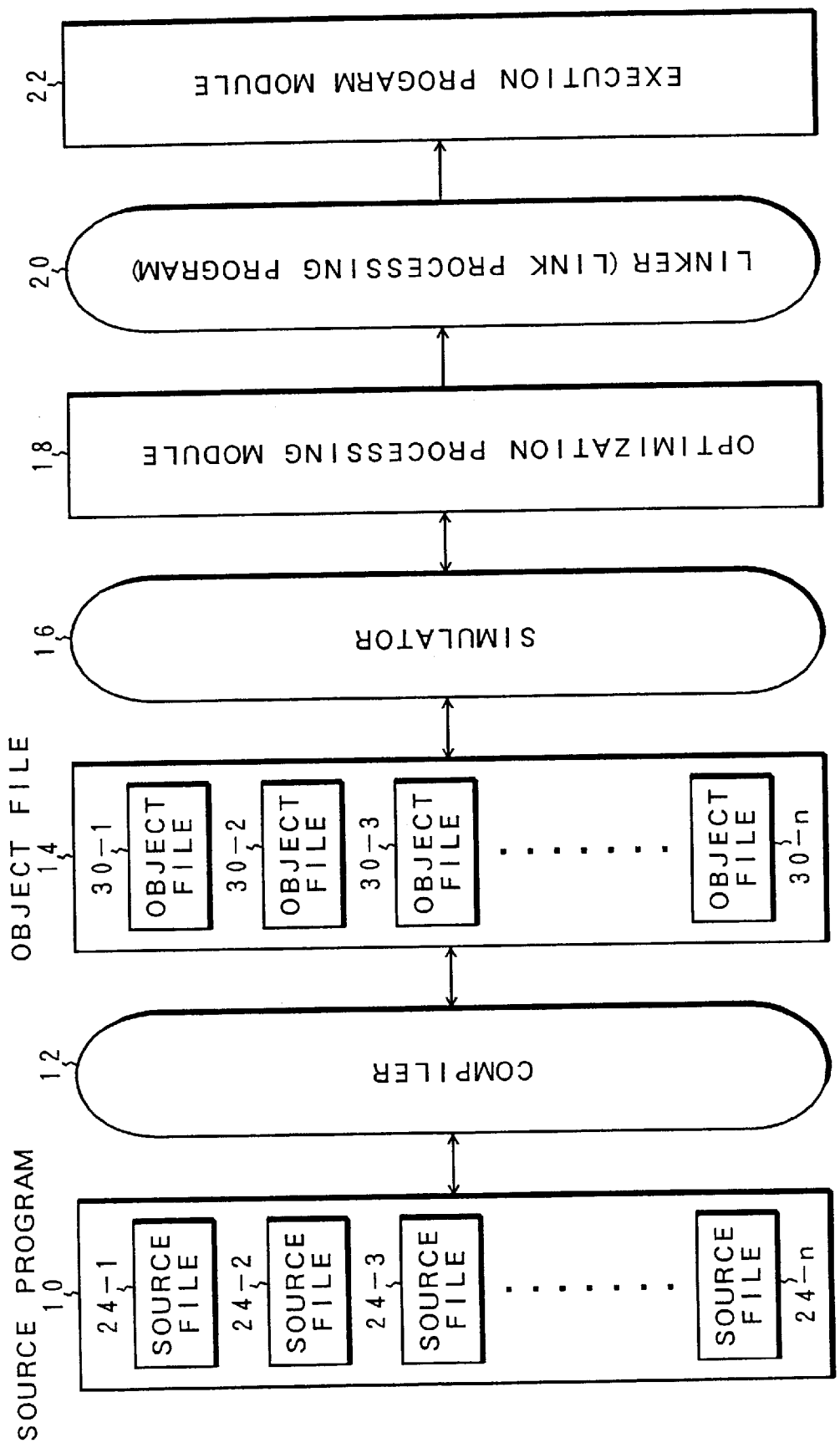
FIG. 1 is an illustration explaining a processing procedure according to the invention.

FIG. 1 is a functional block diagram of an optimization object generating apparatus according to the invention. By the invention, a source program 10 is compiled by a compiler 12 to generate an object program 14, which is experimentally executed in a specific execution environment by a simulator 16 to collect execution information. Based on this execution information, a novel optimization processing module 18 according to the invention executes optimization processing, so that finally a linker 20 which is a link processing program executes link processing on thus optimized object program 14 to optimized execution program module 22. Although this example used the linker 20 as a link processing program, it may be assembler. Also, the source program 10 is coded in a human-friendly high-level language such as C, so that in a case of a database processing program, for example, the source program 10 is made up of an aggregate of a plurality of source files 26-1 through 26-n. The source files 26-1 through 26-n each come in an aggregate typically consisting of about 100 to less than 10000 instruction strings. The compiler 12 compiles the source program 10 in a predetermined compilation unit of, for example, 26-1 through 26-n to thereby generate the object program 14. Accordingly, the object program 14 is an aggregate of object files 30-1 through 30-n which are compiled corresponding to the source files 26-1 through 26-n. Although the above-mentioned example has employed a compilation unit of the source files 26-1 through 26-n of the source program 10 for compilation by the compiler 12, it may be subroutines, functions, or even smaller portions of instruction strings contained in the source files 26-1 through 26-n. The simulator 16 sets a specific execution environment for the object program 14 to operate it experimentally so as to generate execution information of executed/unexecuted states, execution frequencies, execution time, etc. of the instruction strings and then post it to the optimization processing module 18. Based on the execution information of the object program 14 obtained from simulator 16, the optimization processing module 18 utilizes some of the following functions of the linker 20 as a link processing program:

I. function of aggregating sections with the same name; and

II. function of controlling the jointing order in the modules according to the external reference name list;

So that link processing by the linker 20 may realize optimization processing whereby instruction strings and data can be arranged for speed-up of execution over more than one unit of program compilation by the compiler 12. This optimization by the optimization processing module 18 based on giving of section names or external reference names involves the following four processes of the instruction strings:

I. execution/unexecution discrimination;

II. classification based on execution frequencies;

III. translation from time-wise approximate execution into space-wise approximate execution; and IV. adjustment of front-and-rear relationship for successful static branch prediction.

Also, for data arrangement over more than one compilation unit, the following two processes are executed:

I. referenced/unreferenced state discrimination; and

II. translation from time-wise approximate referencing to space-wise approximate referencing.

Figure 2:
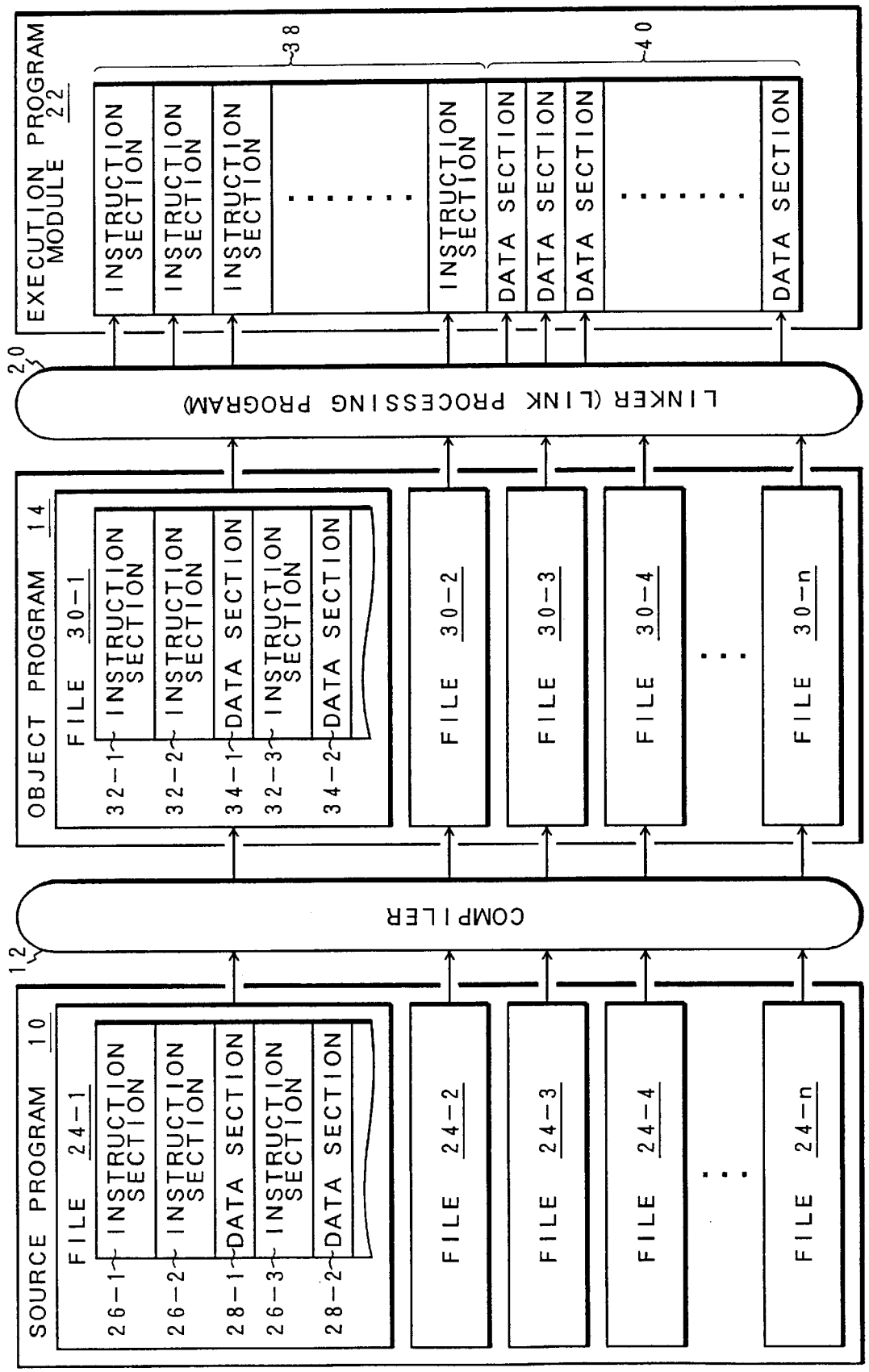
FIG. 2 is an illustration explaining processing by the linker for generating an execution module except an optimization processing module of FIG. 1 into an execution portion and an unexecution portion separately from each other.

FIG. 2 shows optimization processing of an object program except the optimization processing module 18 peculiar to the invention interposed between the simulator 16 and the linker 20 in FIG. 1. The source program 10 for database processing programs is an aggregate, for example, comprising 100 to 1000 source files 24-1 through 24-n. As represented by the first source file 24-1, these source files 24-1 through 24-n contains instruction sections 26-1, 26-2, 26-3, . . . each being an aggregate of instruction strings and data sections 28-1, 28-2, . . . each being an aggregate of a plurality of data pieces.

Figure 3:
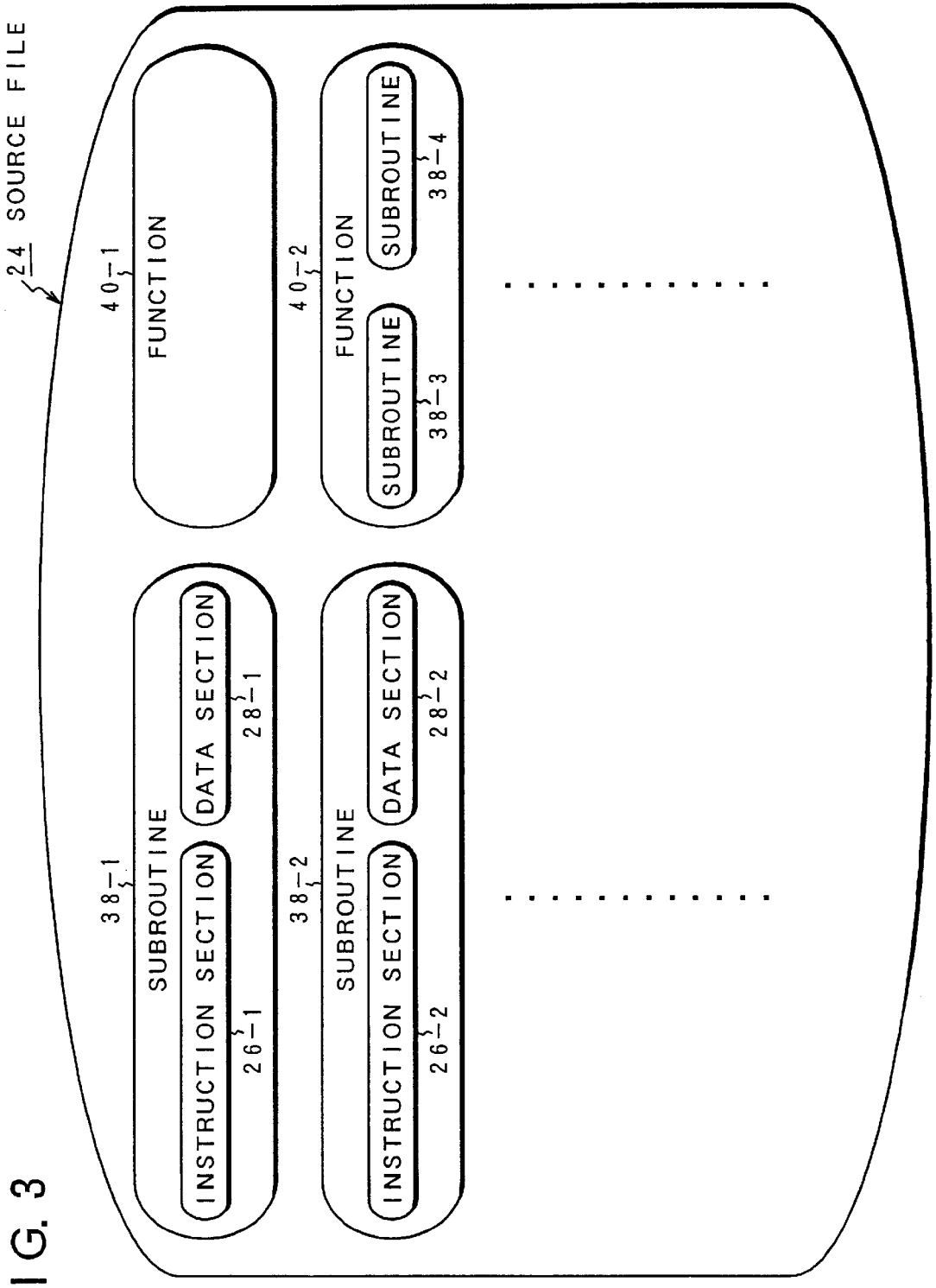
FIG. 3 is an illustration explaining a construction of a source program of FIG. 2.

FIG. 3 simply shows the configuration of the source files in the source program 10. The source file 24 contains for example subroutines 38-1, 38-2, . . . each having instruction sections 26-1, 26-2, . . . and data sections 28-1, 28-2, . . . respectively. Also, the source file 24 contains functions 40-1, 40-2, . . . , each having one aggregate equivalent to the subroutines 38-1, 38-2, . . . . As represented by the function 40-2, these functions 40-1, 40-2, . . . may sometimes contain the subroutines 38-3, 38-4, . . . in themselves. Such source program 10 is actually compiled by the compiler 12 for each source file 24 or a smaller area of subroutines or functions.

Now back to FIG. 2 again, the object program 14 compiled by the compiler 12 is translated to an execution program module (application program) by linking by the linker 20 functioning as a link processing program. In this case, the linker 20 separates the instruction sections 32-1, 32-2, 32-3, . . . and the data sections 34-1, 34-2, . . . in the object program 14 from each other, to discriminate between an instruction portion 38 and a data portion 40 as shown in an execution program module 22. Such function of the existing linker 20 for discriminating between the instruction portion and the data portion us widely typical in the environment of creating computer programs for generating an object program from a source program, originally aiming at roughly discriminating between an instruction region and a data region or between a read-out dedicated region and write-in region in a program. Such a function of the existing linker 20, however, cannot collect instruction portions and data portions, for example, in a range of files over more than one program compilation unit intended by optimization object generating processing according to the invention.

Figure 4:
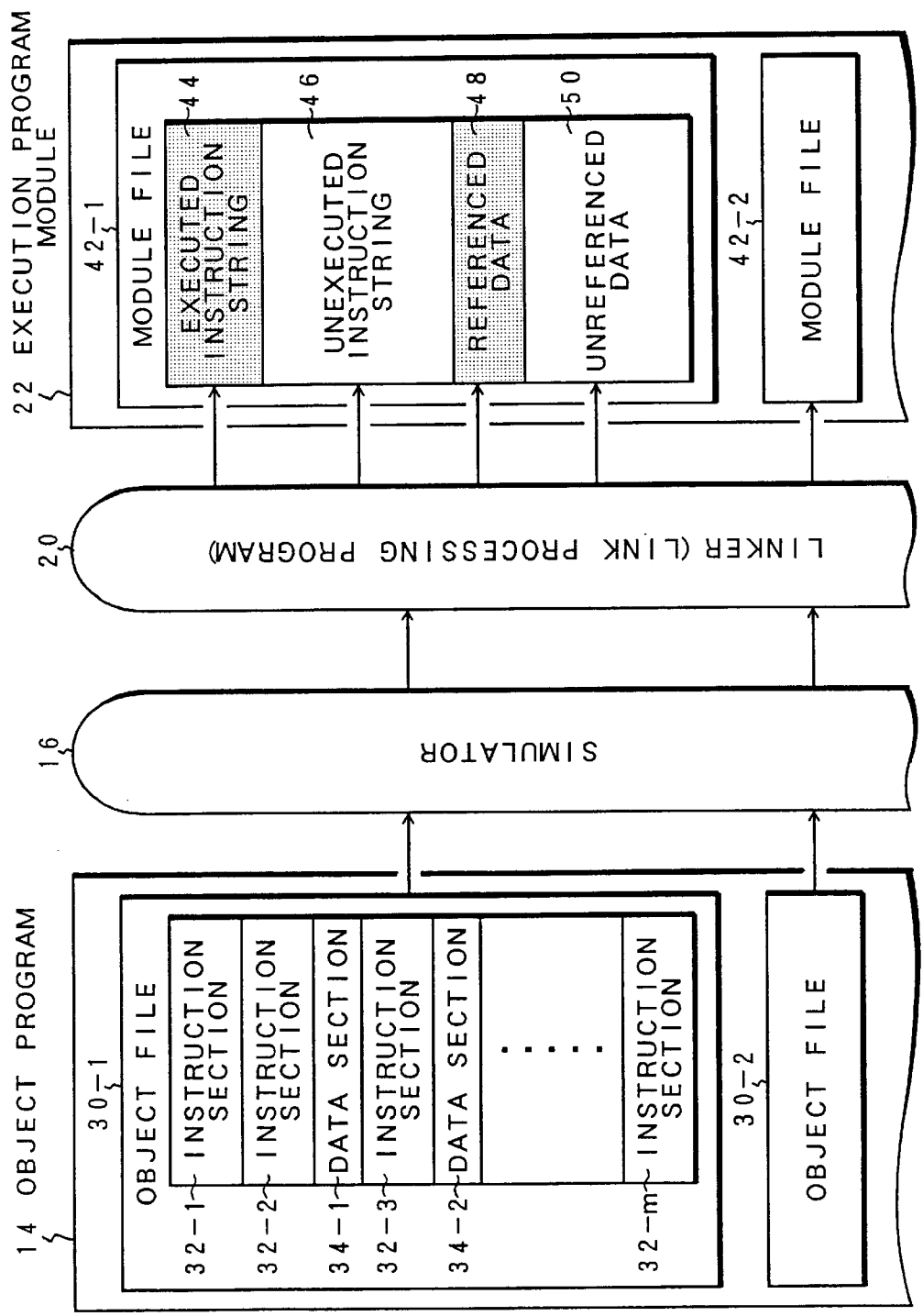
FIG. 4 is an illustration explaining processing by the linker for generating the execution module except an optimization module generating portion according to the invention into an execution portion and an unexecution portion for each files in FIG. 1.
Figure 5:
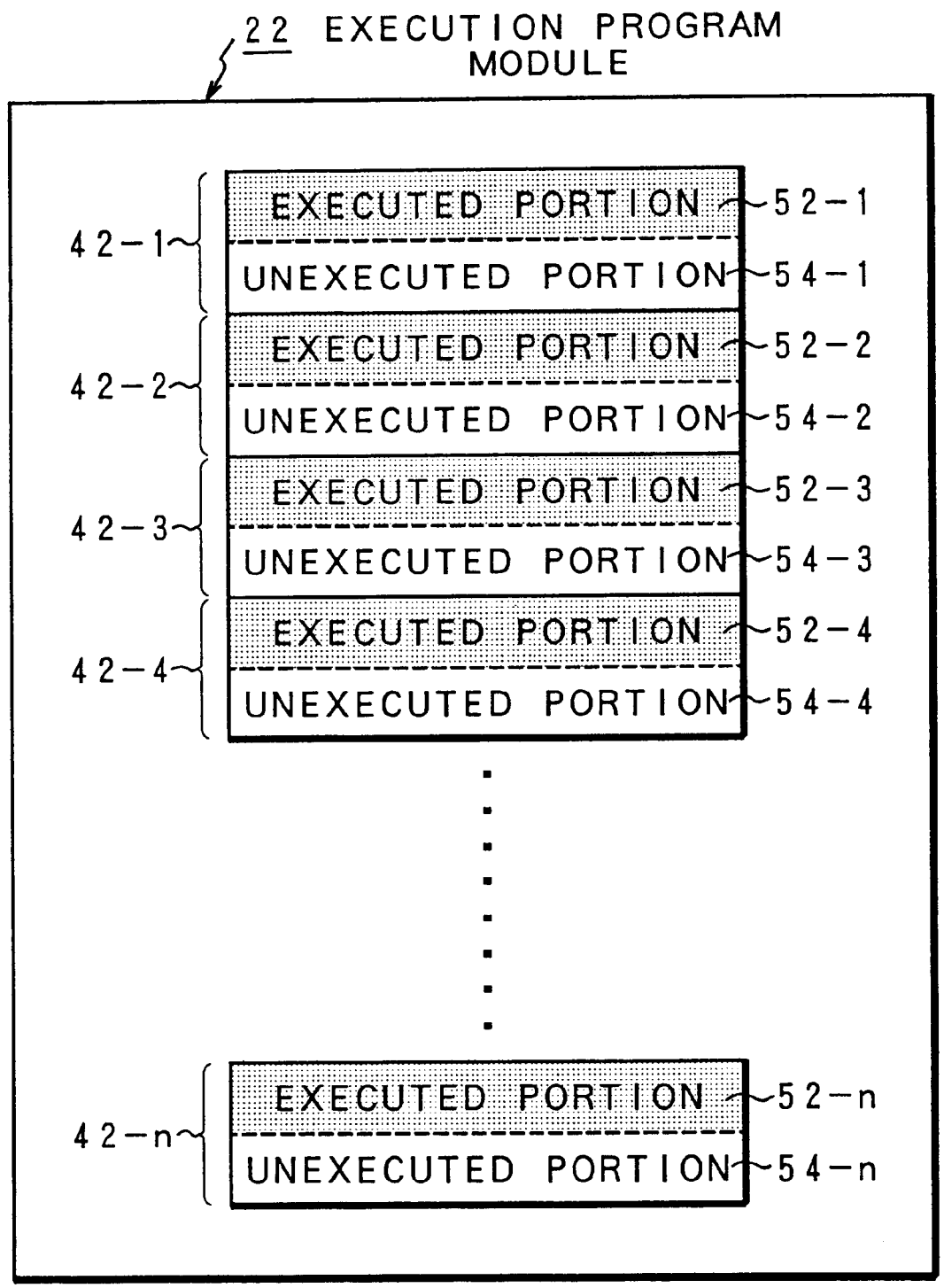
FIG. 5 is an illustration explaining an overall arrangement of the execution portion and the unexecution portion of the execution module generated by the processing of FIG. 4.
Figure 6:
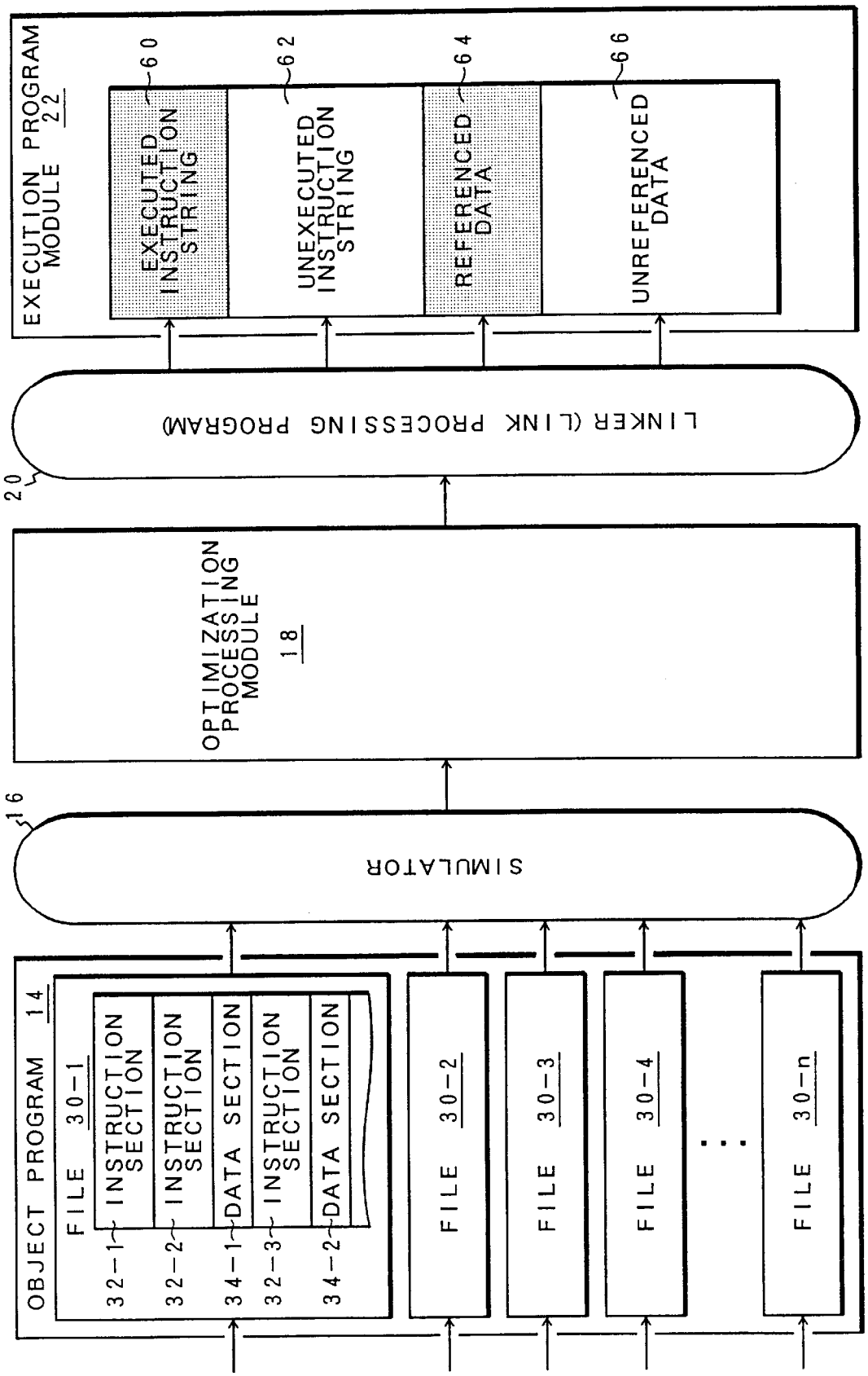
FIG. 6 is an illustration explaining a case where the linker generated an execution modules of a processing result by the optimization module generating portion according to the invention in FIG. 2.

FIG. 4 shows another example of the linking function of the existing linker of FIG. 1 except the optimization processing module 18 peculiar to the invention. The simulator 16 experimentally executes the object program 14 generated by the compiler 12 in a specific execution environment to collect execution information indicating executed and unexecuted instruction strings for the instruction sections 32-1, 32-2, 32-3, . . . , 32-n in, for example, the object file 30-1. Similarly, for the data sections 34-1, 34-2, . . . in the object file 30, the execution information is generated indicating referenced data and unreferenced data during experimental execution by the simulator 16. Based on such execution information of the object file 30-1 obtained from the simulator 16, the linker 20 can divide instruction strings into an executed instruction string 44 and an unexecuted instruction string 46 in a compilation unit module file 42-1 and, at the same time, divide data into referenced data 48 and unreferenced data 50 as shown in the execution program module 22. However, when the instruction strings and the data are divided into executed and unexecuted strings and referenced and unreferenced data respectively for each compilation unit of files based on the execution information of the object program 14 by the linker 20, in the execution program module 20 generated by the linker 20 as shown in FIG. 5, execution portions 52-1, 52-2, . . . , 52-n and unexecution portions 54-1, 54-2, . . . , 54-n are sporadically arranged for each compilation unit of the module files 42-1, 42-2, . . . , 42-n. Accordingly, even if the linker has a function of discriminating between an execution portion and an unexecution portion, this function works only for each program compilation unit, so that in the generated execution program module 22 such as shown in FIG. 5, a TLB provided to a cache memory apparatus of a computer is updated at a high frequency because of the sporadic arrangement of the execution portions 52-1 through 52-n, thus prohibiting high-speed execution. When the optimization processing module 18 peculiar to the invention is provided as shown in FIG. 1, however, as shown in FIG. 6, the compiled object program 14 is experimentally executed by the simulator 16 in a specific operation environment to obtain execution information of executed/unexecuted states and unexecuted states of the instruction strings and referenced/unreferenced states of the data during the execution of the instruction strings and post it to the optimization processing module 18. Based on the execution information of the object program 14 sent from the simulator 16, the optimization processing module 18, for example, discriminates between sections outputting the executed instruction strings and sections outputting the unexecuted instruction strings to thereby give them different names. The linker 20 executes link processing on this object program 14 in which the different section names are given for the executed/unexecuted instruction strings. In this case, since the linker 20 originally has a function of collecting the instruction strings having the same section names into one aggregate, as shown in execution program module 22, the instruction strings having the same section name indicating executed instruction strings over the object files 30-1 through 30-n which is a compilation unit of the object program 14 are collected and arranged as an executed instruction string 60. At the same time, the instruction strings having the same section name indicating unexecuted instruction strings are collected in one aggregate and arranged as an unexecuted instruction string 62. Also, the linker 20 has used the optimization processing module 18 to give different section names to referenced data and unreferenced data over the object files 30-1 through 30-n which is a compilation unit of the object program 14, so that the data having a section name of referenced data can be collected into one aggregate to thereby be collectively arranged as employed data 64 in the execution program module 22 and, at the same time, the data having the same section name given to unemployed data can be collected to thereby be arranged collectively as unreferenced data 66.

(Optimization by Giving Section Names)

Figure 7:
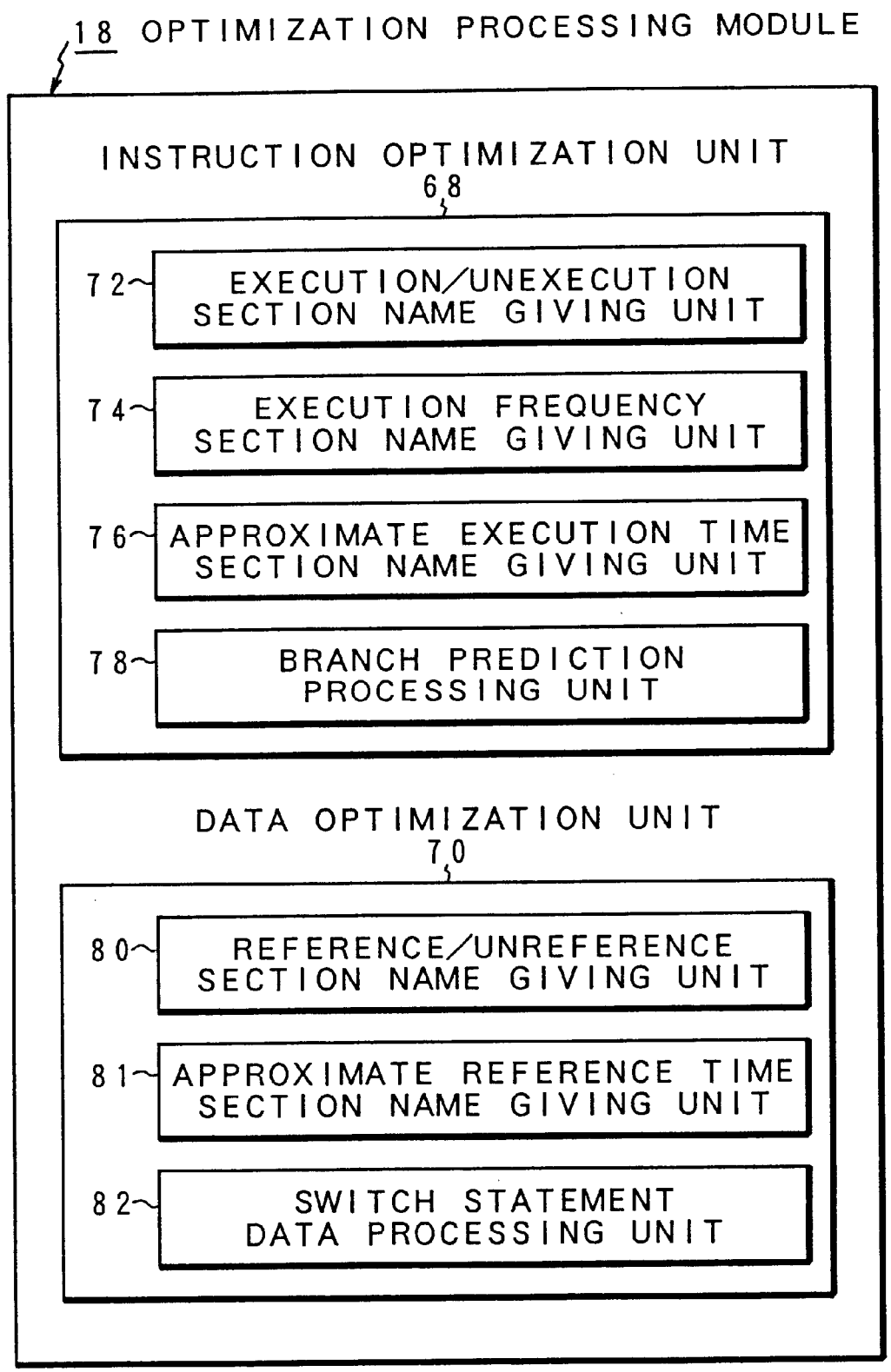
FIG. 7 is a functional block diagram of the optimization module generating portion of FIG. 1 for optimizing an execution module based on giving of section names.

FIG. 7 is a functional block diagram of a first embodiment of the optimization processing module 18 of FIG. 1. This first embodiment features that the simulator 16 gives section names based on the execution information of the object program 14 to thereby arrange the instructions and data optimally over more than one compilation unit when the linker 20 generates an execution program module. The optimization processing module 18 comprises an instruction optimization unit 68 and a data optimization unit 70. The instruction optimization unit 68 is provided with an execution/unexecution section name giving unit 72, an execution frequency section name giving unit 74, an approximate execution time section name giving nit 76, and a branch prediction processing unit 78. Also, the data optimization unit 70 is provided with a reference/unreference section name giving unit 80, an approximate reference time section name giving unit 81, and a switch statement data processing unit 82. The execution/unexecution section name giving unit 72 of the instruction optimization unit 68 divides a plurality of files in the object program 14 into sections outputting executed instructions and sections outputting unexecuted instruction based on the execution information from the simulator indicating the executed and unexecuted instructions and then gives them different section names. The execution frequency section name giving unit 74 of the instruction optimization unit 68 gives, based on the execution frequency information of the executed instructions from the simulator, section names according to the execution frequency to the sections outputting the executed instruction strings of the plurality of files in the object program 14. The approximate execution time section name giving unit 76 gives, based on the execution time information of the executed instructions from the simulator 16, the same section name to the sections outputting instruction strings executed proximately time-wise of the plurality of files in the object program 14. Further, the branch prediction processing unit 78 gives, based on the execution frequency information if the executed instruction from the simulator, different section names to sections outputting pre-branch instruction strings having a higher execution frequency and sections outputting pre-branch instruction strings having a lower execution frequency so that static branch prediction may come true for deciding branching or non-branching by observing the location relationship between the pre-branch and branch-source locations when conditional branch instructions are executed. Also, the reference/unreference section name giving unit 80 of the data optimization unit 70 gives, based on the data reference information from the simulator 16 indicating the data referenced and unreferenced during execution, different section names to the data referenced and data unreferenced during the execution for the plurality of files in the object program 12. The approximate reference time section name giving unit 81 of the data optimization unit 70 gives, based on the data reference time information from the simulator 16, the same section name to sections outputting data referenced proximately time-wise for the plurality of files in the object program 14. Further, since this embodiment exemplifies a program coded in C as the source program 10 and so instruction strings and data table data strings are mixed in the object program 14 when a C-language switch statements are compiled by the compiler 12 and cannot be separated from each other by the linker 20, the switch statement data processing unit 82 gives section names so as to discriminate the data portion from an object file peculiar to the switch statement.

Figure 8:
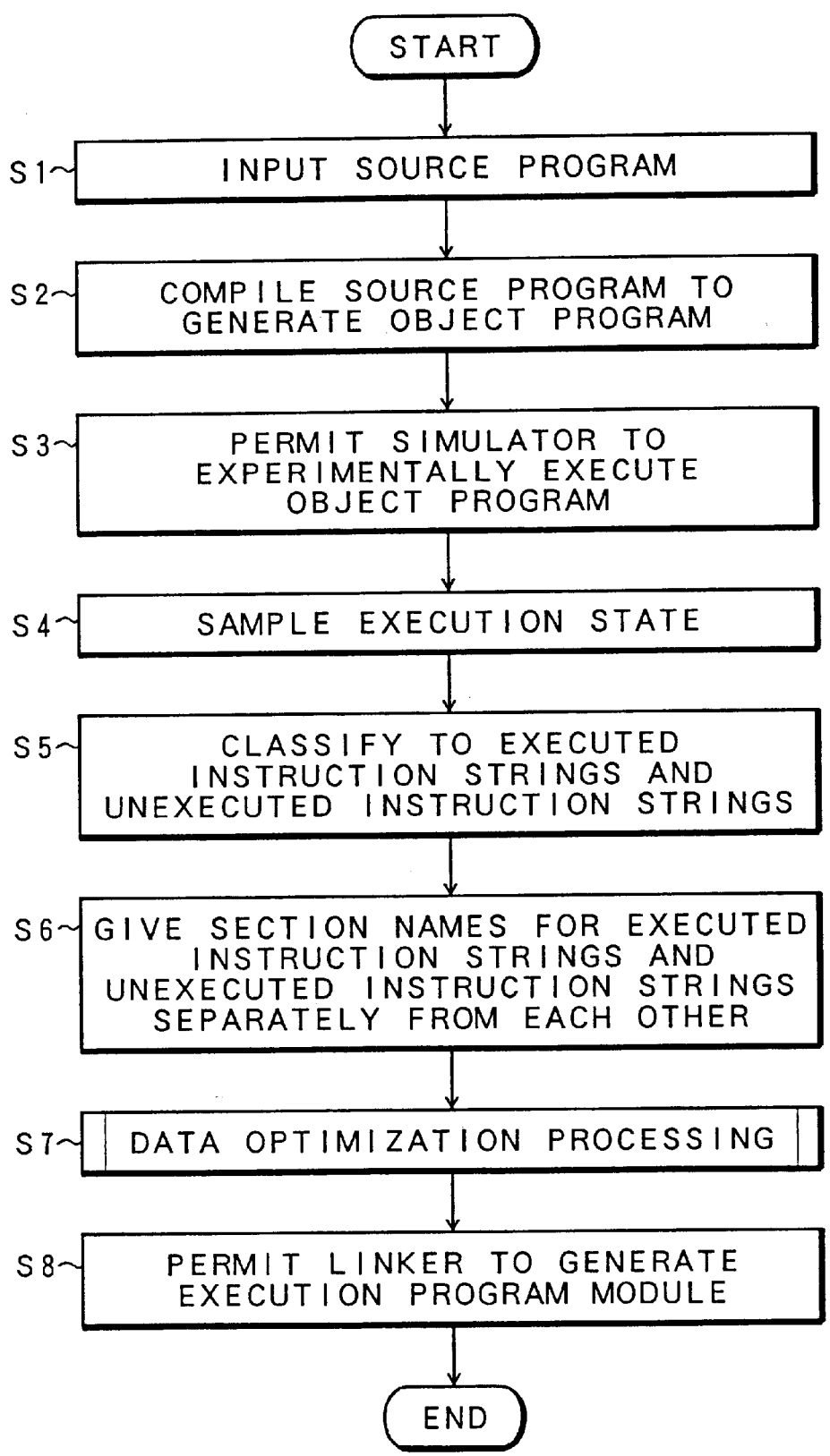
FIG. 8 is a flowchart for optimization processing according to the invention by the linker for classification into an execution portion and an unexecution portion by giving of a section name.

FIG. 8 is a flowchart for optimization object generation processing by the invention by use of the execution/unexecution section name giving unit 72 of the instruction string optimization unit 68 of FIG. 7. First, at step S1 the source program 10 is read in and, at step S2, compiled by the compiler 12 in, for example, a file unit. Then, at step S3 the object program is experimentally executed by the simulator 16 in a specific execution environment to provide a service of execution information at step S4. At the following step S5, based on the execution information obtained by the execution/unexecution section name giving unit 72 of FIG. 7, executed instruction strings and unexecuted instruction strings are separated from each other to then divide at step S6 the sections into sections outputting the executed instruction strings and sections outputting the unexecuted instruction strings and give them different section names. At the following step S7, the data undergoes processing by the data optimization unit 70 of FIG. 7 and, at step S8, when the linker 20 generates an execution program module, the section names given to the instruction strings at step S6 are divided into the section names indicating the executed instruction strings and the section names indicating the unexecuted instruction strings and, as shown in FIG. 6, arranged in two aggregates of the executed instruction string 60 and an unexecuted instruction string 62 in the optimization execution module 22. Also, by the data processing at step S7, as shown in the execution program module 22 of FIG. 6, the data is arranged in two aggregates of referenced data 64 and unreferenced data 66 with the section name of the referenced data and the section name of the unreferenced data respectively.

FIG. 9 shows in subroutines the data optimization processing at step S7 in FIG. 8. This data optimization processing is executed by the reference/unreference section name giving unit 80 of the data optimization unit 70 of FIG. 7. That is, at step S1, based on obtained execution states, the data of the object program is divided into data referenced and data unreferenced during execution to give them different section names at step S2.

Figure 10C:
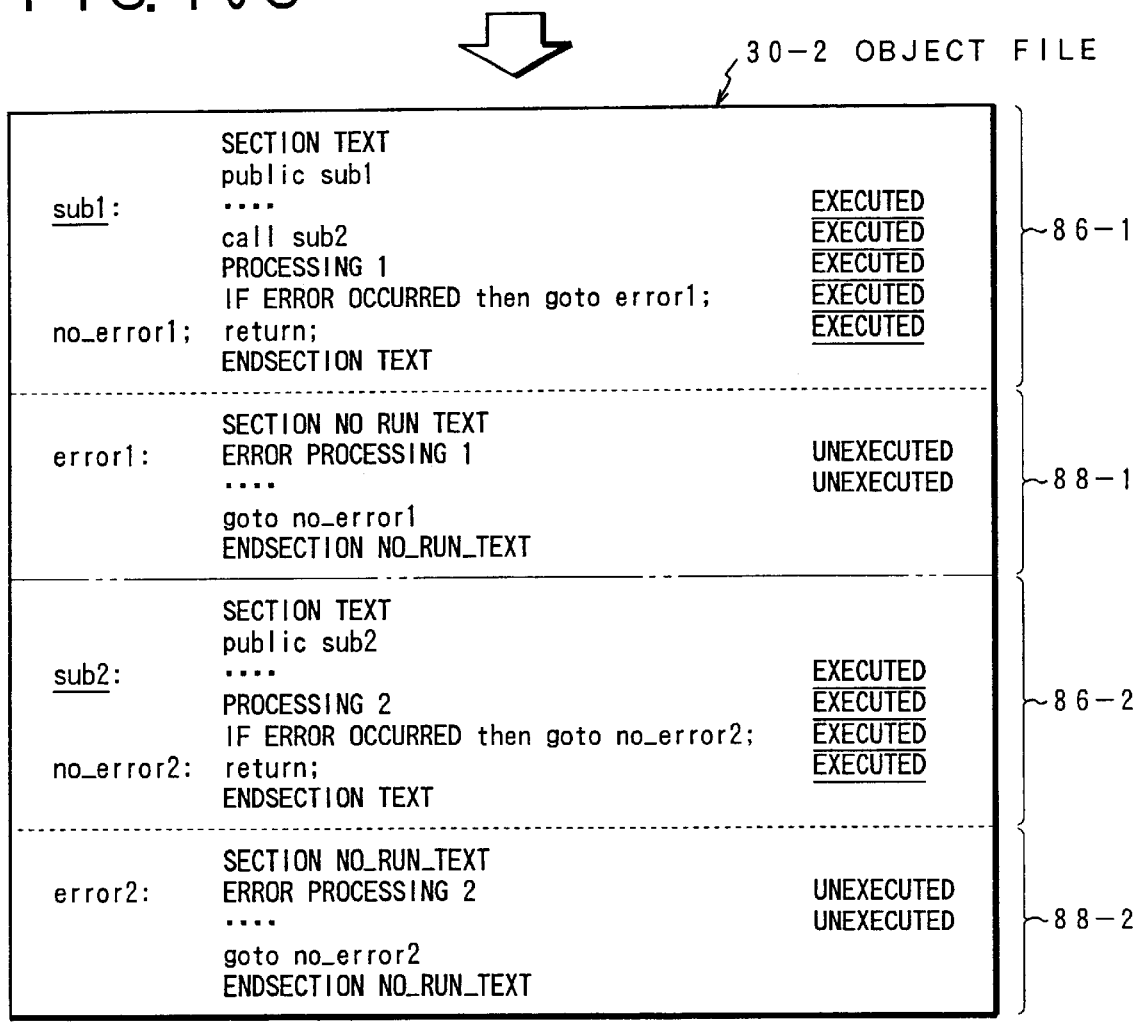
Figure 10D:
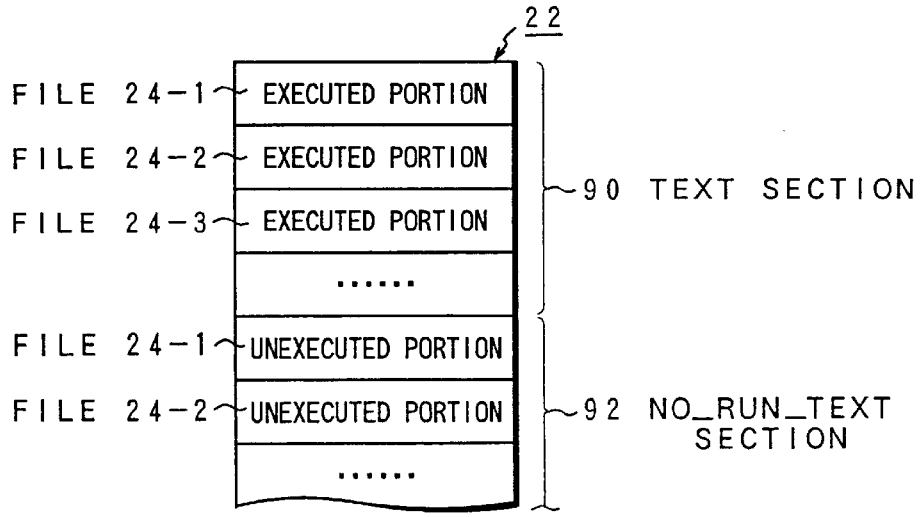

FIGS. 10A–10D show specifically exemplify as a source program coded in C the optimization processing according to the invention for giving section names to executed instruction strings and unexecuted instruction strings of FIG. 8 to thereby arrange them separately from each other. FIG. 10A shows the source file 24, which comprises subroutines 38-1 and 38-2. The source file 24 is complied by the compiler 12 for each of the subroutines to generate an object file 30-1 shown in FIG. 10B. Then, thus generated object file 30-1 is experimentally executed by the simulator 16 in a specific execution environment to thereby obtain execution/unexecution state information for each instruction given to the right side of the object file 30-1. The object file 30 having such execution information indicating executed/unexecuted states is processed by the execution/unexecution section name giving unit 72 of the instruction optimization unit 68 given in FIG. 7 to thereby obtain an object file 30-2 shown in FIG. 10C. In this object file 30-2, a subroutine 84-1 is divided into an execution portion 86-1 and an unexecution portion 88-1 and a subroutine 84-2, into an execution portion 86-2 and an unexecution portion 88-2. In the subroutine 84-1, the execution portion 86-1 uses a section name "TEXT" written in the first row as it is, while the unexecution portion 88-1 is given a new another section name "NO-RUN-TEXT." In the next subroutine 84-2, the execution portion 86-2 is given in its first row the same section name "TEXT" as that of the execution portion 86-1 in the subroutine 84-1, while the following unexecuted portion 88-3 is given a different section name "NO-RUN-TEXT" which is the same as that of the unexecution portion 88-1 in the subroutine 84-1. The object file 30-2 of FIG. 10C thus given different section names at its execution portion and unexecution portion undergoes link processing by the linker 20 to generate the execution program module 22, in order to collectively arrange as an execution region 90 the execution portions of, for example, files 24-1, 24-2, 24-3, . . . having the section name "TEXT" indicating an execution portion and also arrange as an unexecution region 92 the unexecution portions of the files 24-1, 24-2, . . . having the section name "NO-RUN-TETX" of the unexecuted portions, thus generating the execution program module 22 as shown in FIG. 10D.

In this case, when the linker generates the execution program module 22 from the objet file 30-2 given the section names at its executed instruction string and unexecuted instruction string separately from each other of, for example, FIG. 10C, the branch prediction processing unit 78 of the instruction optimization unit 68 of FIG. 7 controls the linker so as to arrange the module portion of the unexecuted portion 88-1 of the unexecuted section "NO-RUN-TEXT" to the end of the module portion of the executed portion 86-1 of the executed section "TEXT" in the execution program module of FIG. 10D so that, for example, prediction of a branch from the execution portion 86-1 which provide a section to be executed to the unexecution portion 88-1 which provides a section not to be executed may come negative.

Figure 11C:
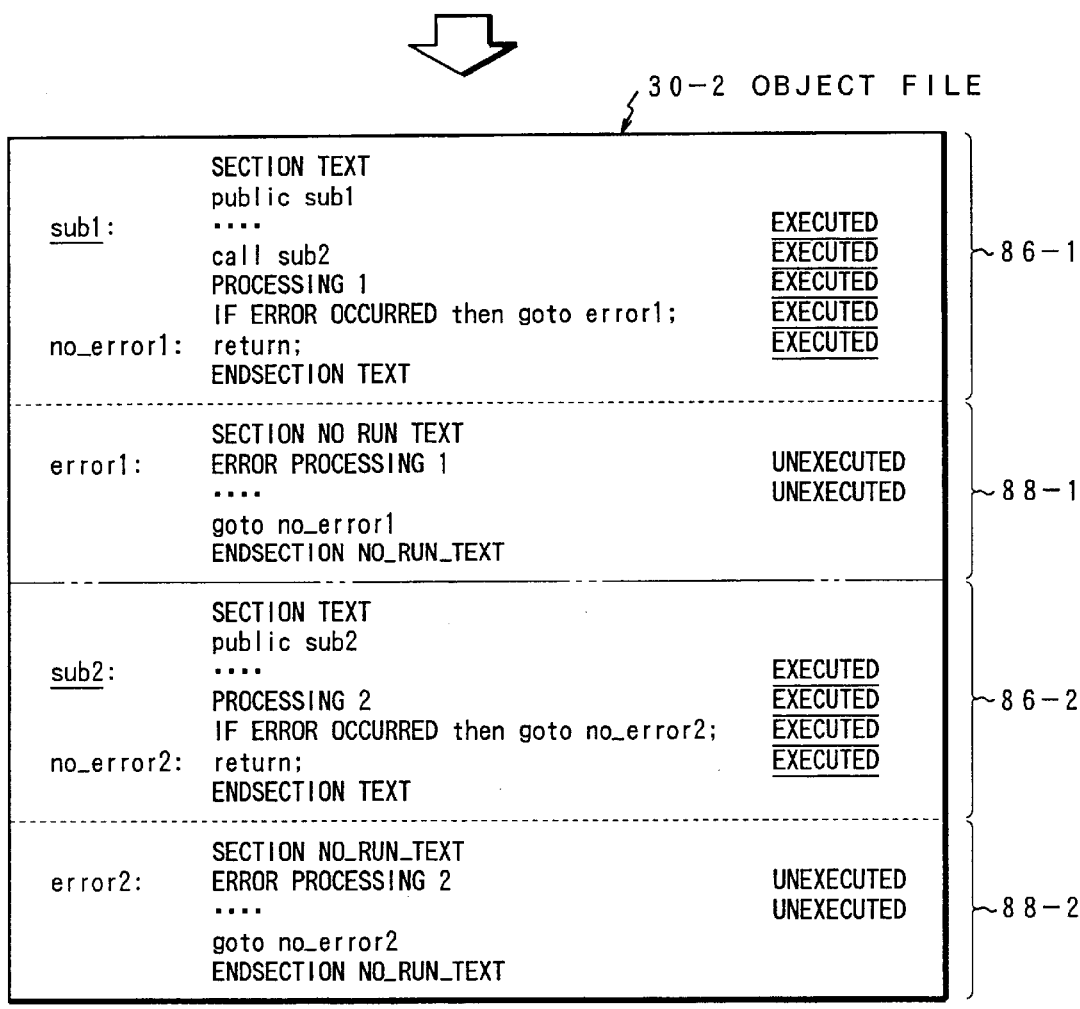
Figure 11D:
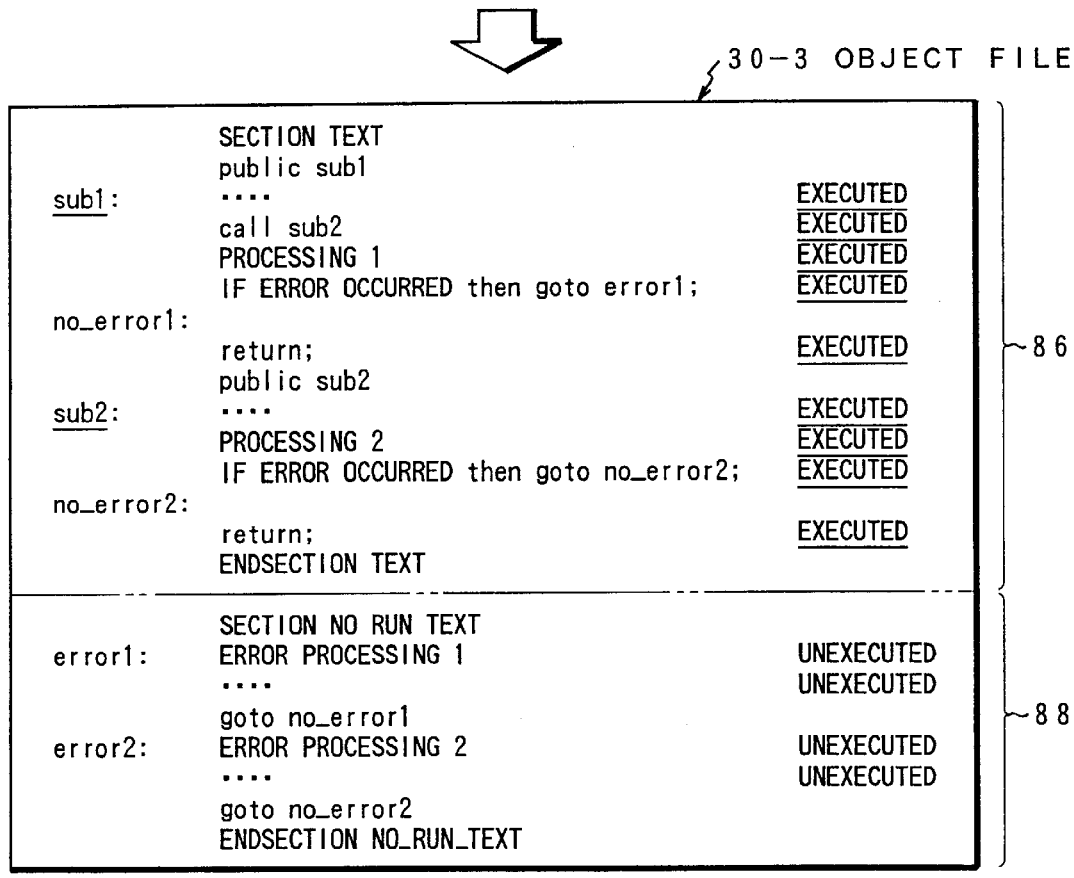
Figure 11E:
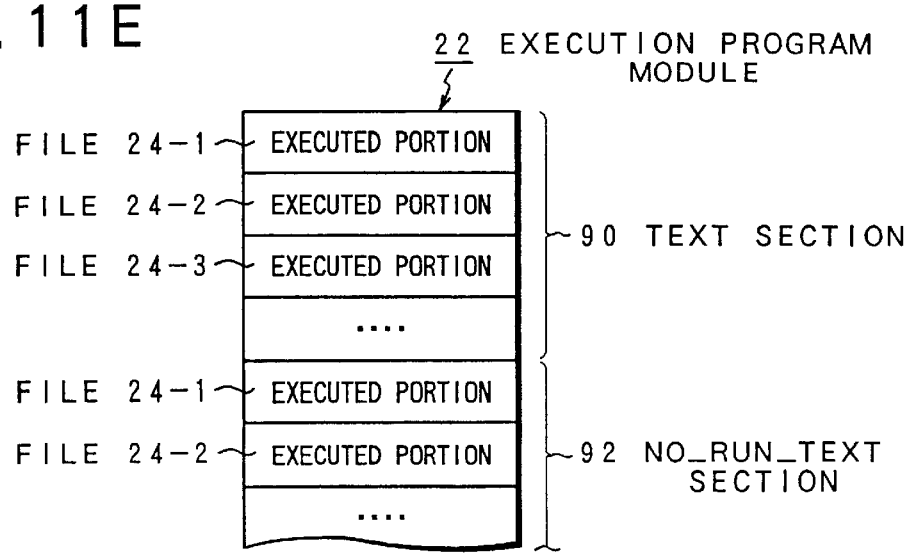

FIGS. 11A–11E show another specific processing example on a C-language source program for arranging an execution portion and an unexecution portion separately from each other according to the section names as indicated in the flowchart of FIG. 9. FIG. 11A shows the same source file 24 as that shown in FIG. 10A, which comprises the same subroutines 38-1 and 38-2. This source file 24 is compiled by the compiler 12 for each of the subroutines to provide an object file 30-1 of FIG. 11B, which is then experimentally executed by the simulator 16 in a specific execution environment to give execution information indicating execution/unexecution states shown to the right side. The object file 30-1 thus given the execution/unexecution state information undergoes processing by the execution/unexecution section name giving unit 72 of the instruction optimization unit 68 of FIG. 7 to thereby generate an object file 30-2 in which an execution portion and an unexecution portion are given different section names as shown in FIG. 11C. Alternatively, if the compiler is an optimization compiler that collectively arrange execution portions of a plurality of functions, as shown in FIG. 1D, it generates such an object file 30-3 in which an execution portion and an unexecution portion are given different section names. That is, the execution portion 86-1 of the object file 30-2 or the execution portion 86 of the object file 30-3 is given on their first row a section name "TEXT" indicating a section outputting executed instruction strings, while the following unexecution portion 88-1 or 88-2 is given a section name "NO-RUN-TEXT" indicating a section outputting unexecuted instruction strings. In this case, as for the execution portion 86-1 or 86, the section name "TEXT" is used as it is which is written at a generation position for the object file 30-1 of FIG. 11B. If translation from such a source file as shown in FIGS. 11A–11C or such a source file as shown in FIGS. 11A, 11B, and 11D to an object file is conducted similarly on, for example, a plurality of files 1, 2, and 3 to thereby generate from this translation result an execution program module by use of the linker 20, an execution program module 22 is generated in which the execution portions of the files 24-1, 24-2, 24-3, . . . having the section name "TEXT" such as shown in FIG. 11E are collected into one execution region as a text section 90 and the unexecuted portions of the files 24-1, 24-2, . . . having the section name "NO-RUN-TEXT" indicating the unexecuted instruction strings are collectively arranged into one unexecution region 2 as a non-run-text section 92.

Figure 12:
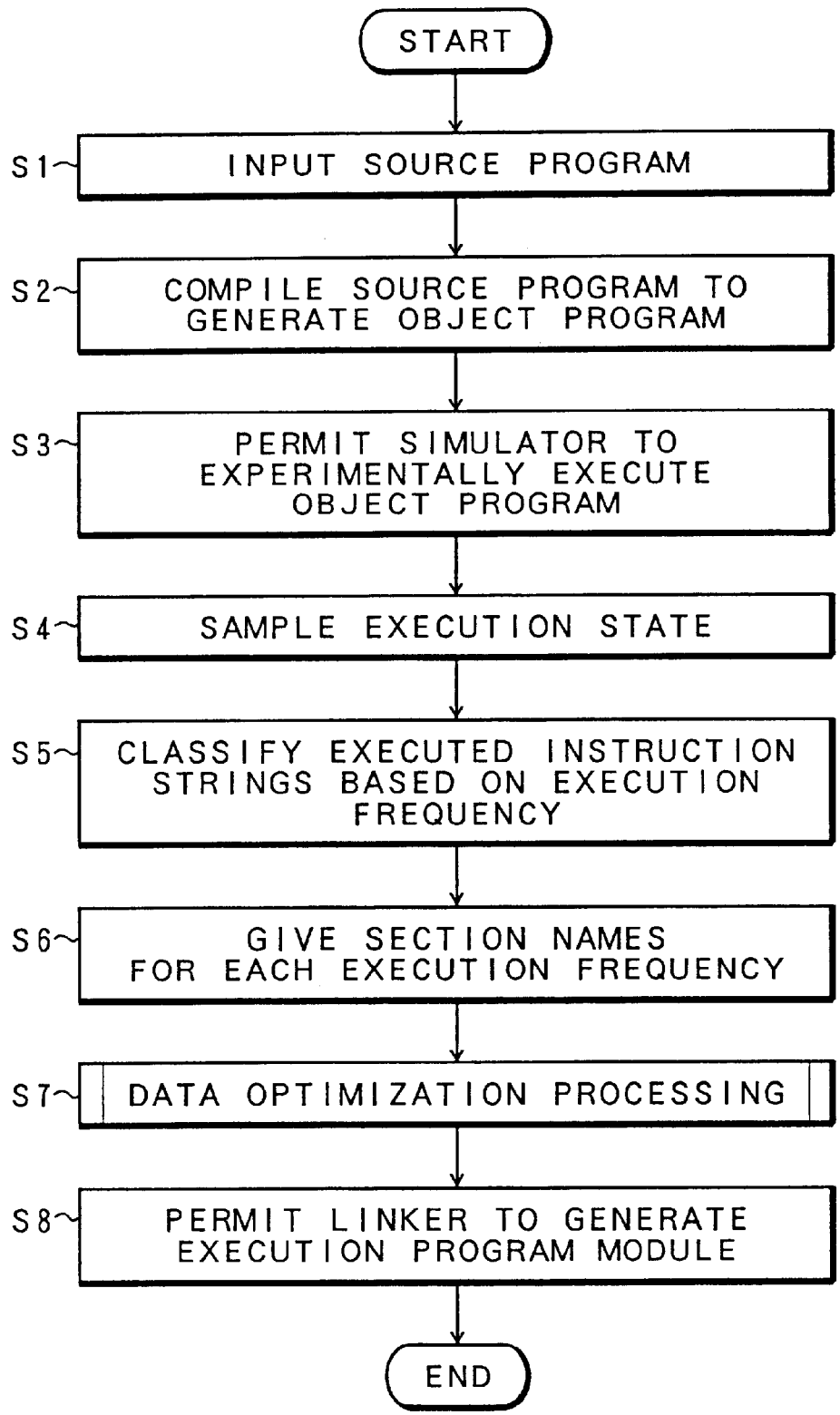
FIG. 12 is a flowchart for optimization processing according to the invention based on giving of section names and execution frequencies.

FIG. 12 is a flowchart of optimization processing according to the invention for arranging executed instruction strings according to their execution frequencies by use of a function of the execution frequency section name giving unit 74 of the instruction string optimization unit 68 of FIG. 7. First, at step S1 the source program 10 is input as shown in FIG. 1, which is then compiled by the compiler 12 to generate the object program 14 at step S2. Next, at step S3, the program is experimentally executed by the simulator 16 in a specific execution environment to collect execution states at step S4. These execution states thus collected contains execution frequency information of the executed instructions. Next, at step S5, the execution frequency section name giving unit 74 of the instruction optimization unit 68 of FIG. 7 classifies the executed instructions in three categories of high, medium, and low execution frequencies. Next, at step S6, different section names are given according to the three categories of the high, medium, and low execution frequencies classified at step S5. Next, at step S7, for example, the reference/unreference section name giving unit 80 of the data optimization unit 70 of FIG. 7 gives different section names to referenced data and unreferenced data. This step S7 has the same subroutine contents as those of FIG. 9. Finally at step S8 the linker 20, when generating by linking the execution program module 22 from the object program 14 thus given the section names according to the execution frequencies, collects those sections into each aggregate of the section names given for the high, medium, and low execution frequencies respectively to thereby collectively arrange the instruction strings into a small range in a descending order of the execution frequency.

Figure 13B:
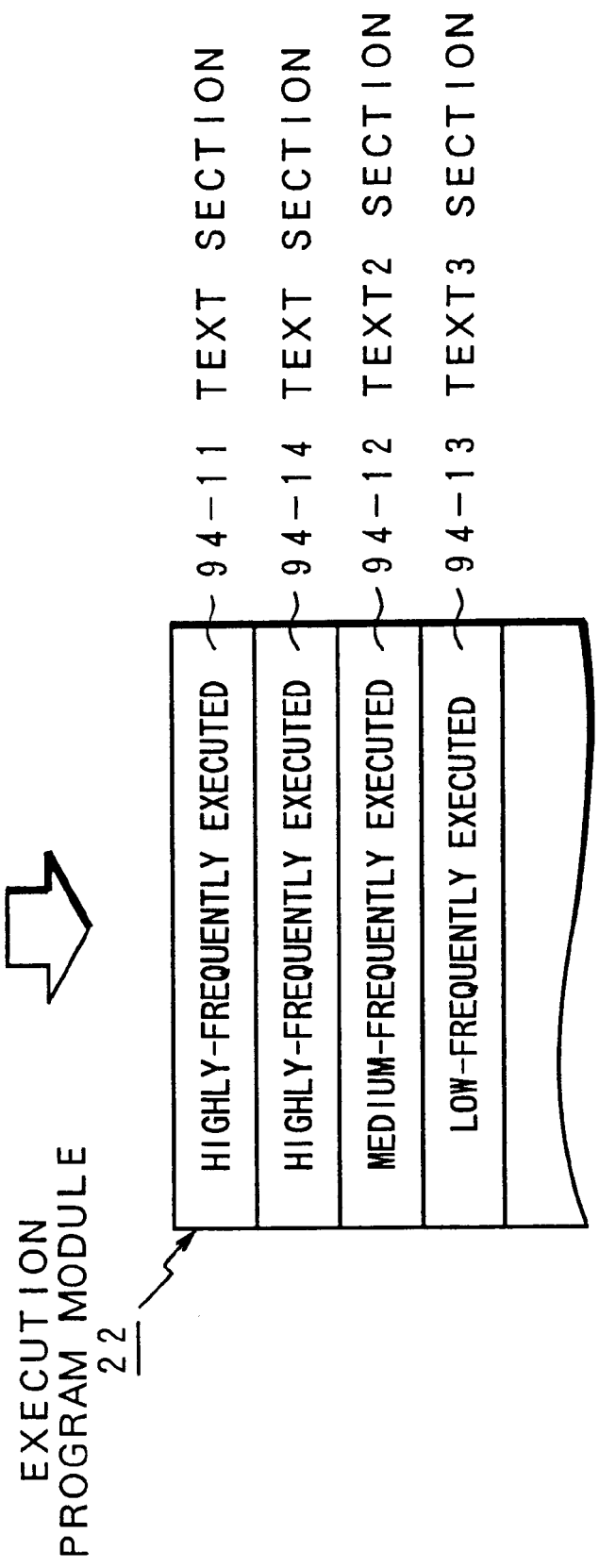

FIGS. 13A and 13B show specific example of arranging instruction strings by giving them section names according to the execution frequencies shown in FIG. 12. FIG. 13A shows the object file 30 provided with execution frequency information obtained in experimental execution of the object program of step S3 in FIG. 12. This object file 30 is divided into sections 94-1, 94-2, 94-3, and 94-4 as sections outputting executed instructions, among which the first section 94-1 and fourth section 94-4 are of higher frequencies in execution as indicated by the execution frequency information of these four sections 94-1 through 94-4 and so provided with the same section name "TEXT". The section 94-2 has the second highest execution frequency and so is provided with a section name "TEXT2". The section 94-3 of the lowest execution frequency is provided with a section name "TEXT3". As for the object file 30 of FIG. 13A in which the section names are provided according to the high, medium, and low execution frequencies, when the linker 20 generates an execution program module from the object file by linking, its "function of aggregating sections with the same name" is utilized to collect module files 94-11 and 94-12 generated from the section name "TEXT" of the sections 94-1 and 94-4 having the highest execution frequency into one aggregate as shown in FIG. 13B. Next, section modules 94-14 containing the section-name "TEXT2" of the object module 94-2 of FIG. 13A having the medium execution frequency into one aggregate as shown in FIG. 13B and then gathered with other module sections having the same medium frequency in arrangement. Further, modules files of the section name "TEXT3" containing the section module 94-13 generated from the object module 94-3 having the lowest execution frequency of FIG. 13A are collectively arranged in one aggregate as shown in FIG. 13B. Thus, the "function of aggregating sections with the same name" of the linker 20 is utilized to collect instruction strings with a higher execution frequency sporadically present in a plurality of regions over more than one compilation unit into a small range without changing the program compilation unit such as a file, subroutine, or function and also without creating a link processing program for batch processing of the system as a whole, to largely reduce the frequency of updating the instruction TLB provided in the cache memory apparatus, thus speeding up program execution.

Figure 14:
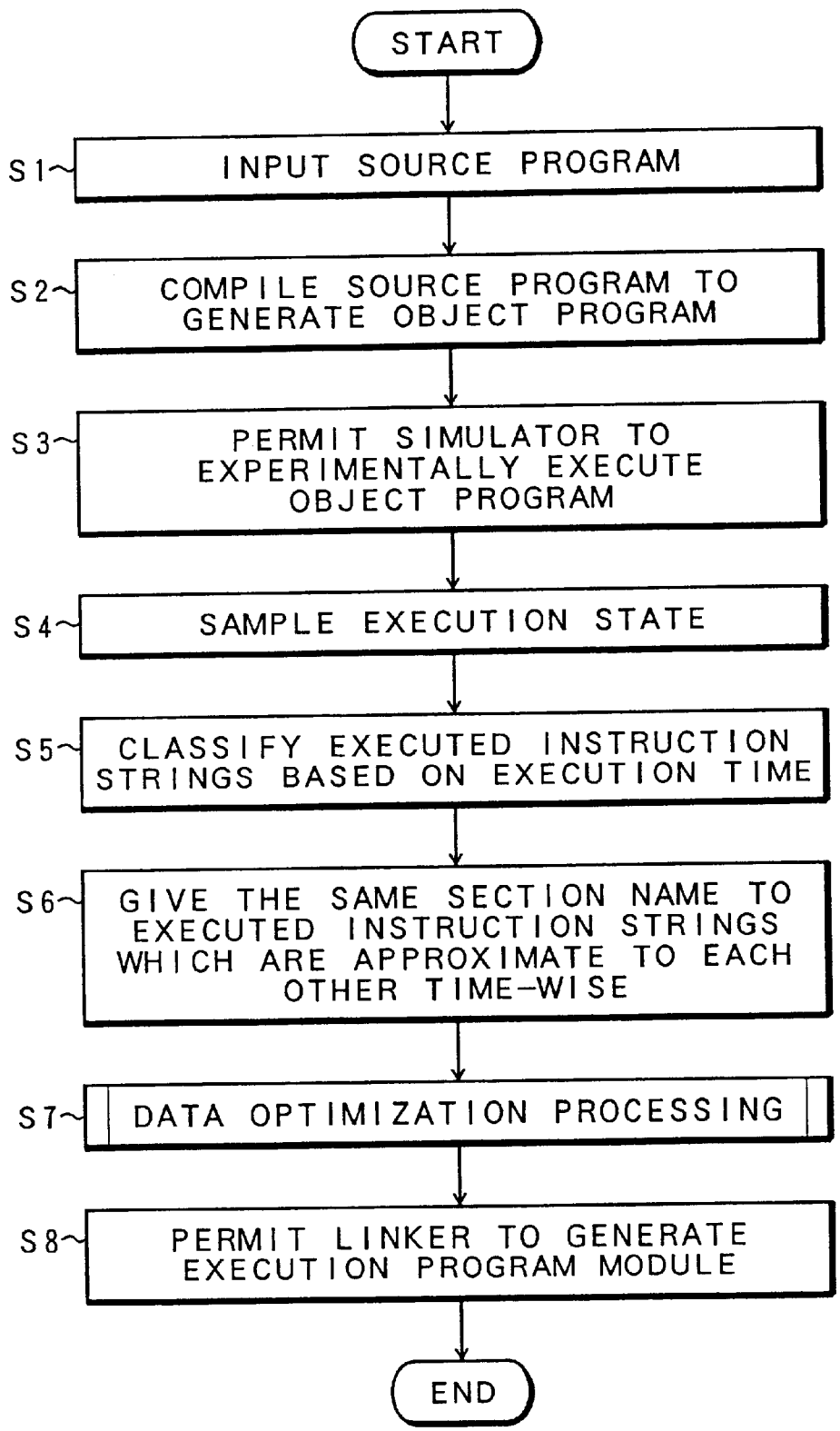
FIG. 14 is a flowchart for optimization processing according to the invention for re-arranging time-wise approximate execution portions into space-wise approximate execution portion by giving them section names.

FIG. 14 is a flowchart of optimization processing according to the invention for utilizing the function of the approximate execution time section name giving unit 76 of the instruction optimization unit 68 of FIG. 7. First, at step S1 the source program 10 is input, which is then compiled at step S2 by the compiler 12, for example, for each file to generate the object program 14. Next, at step S3, the simulator 16 executes the object program 14 experimentally to then collect execution states at step S4. In this case, as the execution state, time information is collected of the execution time of the executed instructions. Next, at step S4, the approximate execution time section name giving unit 76 of the instruction optimization unit 68 of FIG. 7 is used for classification into instruction strings having approximate execution time to then give the same section name to those time-wise proximately executed instruction strings at step S6. Next, at step S7, the data is divided into data referenced and data not referenced by the subroutine of FIG. 9 to give them section names respectively in order to subsequently generate at step S8 an execution program module from the object program in which the same section name is given to the instruction strings executed proximately time-wise by the linker 20. When this linker 20 generates the execution object program by linking, the instruction strings provide with the same section name at step S6 are collected into one aggregate by use of the "function of aggregating sections with the same name" of the linker 20, to arrange the instruction strings time-wise proximately executed over a plurality of files such that they may be approximate space-wise also in the execution program. Therefore, such instruction strings with a higher execution frequency that have a space-wise approximate updating frequency of an instruction TLB provided in the cache memory apparatus are loaded as one aggregate, to thereby reduce the updating frequency largely, thus speeding up program execution.

FIG. 15 shows another embodiment of the subroutines in data processing at step S7 of FIG. 14, illustrating a processing function by the approximate reference time section name giving unit 81 of the data optimization unit 70 of FIG. 7. That is, as for the subroutines related to the data of FIG. 15 also, like in the case of the instruction strings of FIGS. 13A and 13B, the data referenced proximately time-wise during program execution is optimized so as to be arranged proximately space-wise. By this processing, specifically, at step S1, the data is classified according to the time information indicating the data reference time in sampling of execution states by experimental execution of the program. Next, at step S2, the same section name is given to the data referenced proximately time-wise. As for the object program with thus processed data of the subroutines of FIG. 7, at step S8 in FIG. 14, the linker 20, when generating an execution module by linking, collectively arranges the data provided with the same section name into one aggregate. Accordingly, the time-wise proximately referenced data sporadically present in a plurality of regions is also arrange proximately space-wise in an execution program module corresponding to the memory space, to thereby largely reduce the frequency of updating the TLB for data in the cache memory apparatus, thus speeding up program execution.

Figure 16A:
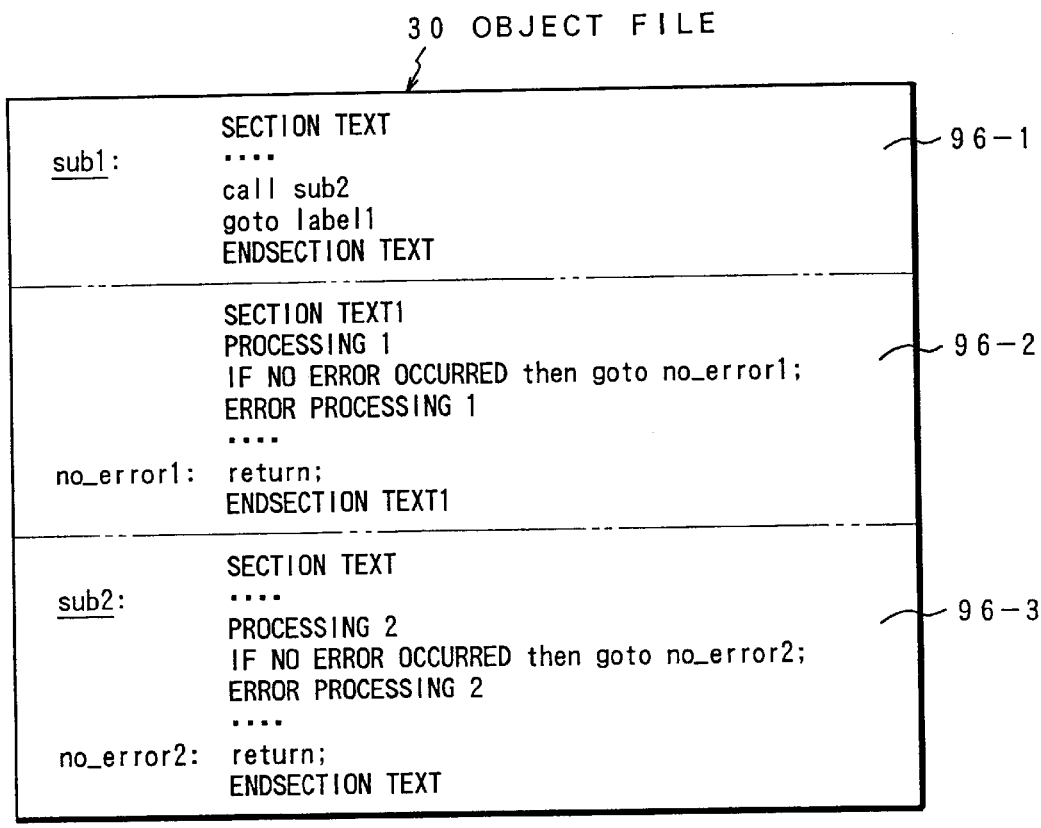
FIGS. 16A and 16B are illustrations respectively explaining an object having time-wise approximate execution portions and an execution module having space-wise approximate ones in the optimization processing of FIG. 14.
Figure 16B:
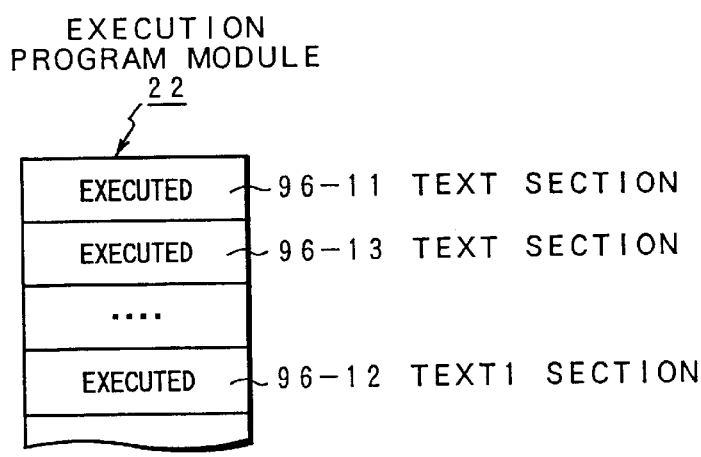

FIGS. 16A and 16B show a specific example of optimization processing for translating time-wise proximately executed instruction strings of FIG. 14 into space-wise approximate instruction strings. FIG. 16A shows an object file 30 of the object program executed experimentally at step S3, which comprises three sections 96-1, 96-2, and 96-3. It is supposed to have been observed that of these the object sections 96-1 and 96-3 provided with external reference names of, for example, subroutines "sub1" and "sub2" are time-wise proximately executed in the experimental execution of the object program. With this, these object sections 96-1 and 96-3 observed to be executed proximately time-wise are provided with the same section name "TEXT" as indicated in their first row. When the linker 20 generates the execution program module 22 by linking from the object file 30 of FIG. 16A, its function of aggregating the same section names is utilized to arrange the object sections 96-1 and 96-3 of FIG. 16A observed to be executed proximately time-wise as shown in FIG. 16B in such a manner that they may be given as space-wise approximate module sections 96-1 and 96-3 each collected by the same section name "TEXT" as one aggregate respectively as shown in FIG. 16B. As a result, the object section 96-2 interposed between the object sections 96-1 and 96-3 at a level of the object file 30 of FIG. 16A is arranged at the third location space-wise in the execution program module 22 of FIG. 16B.

Figure 17:
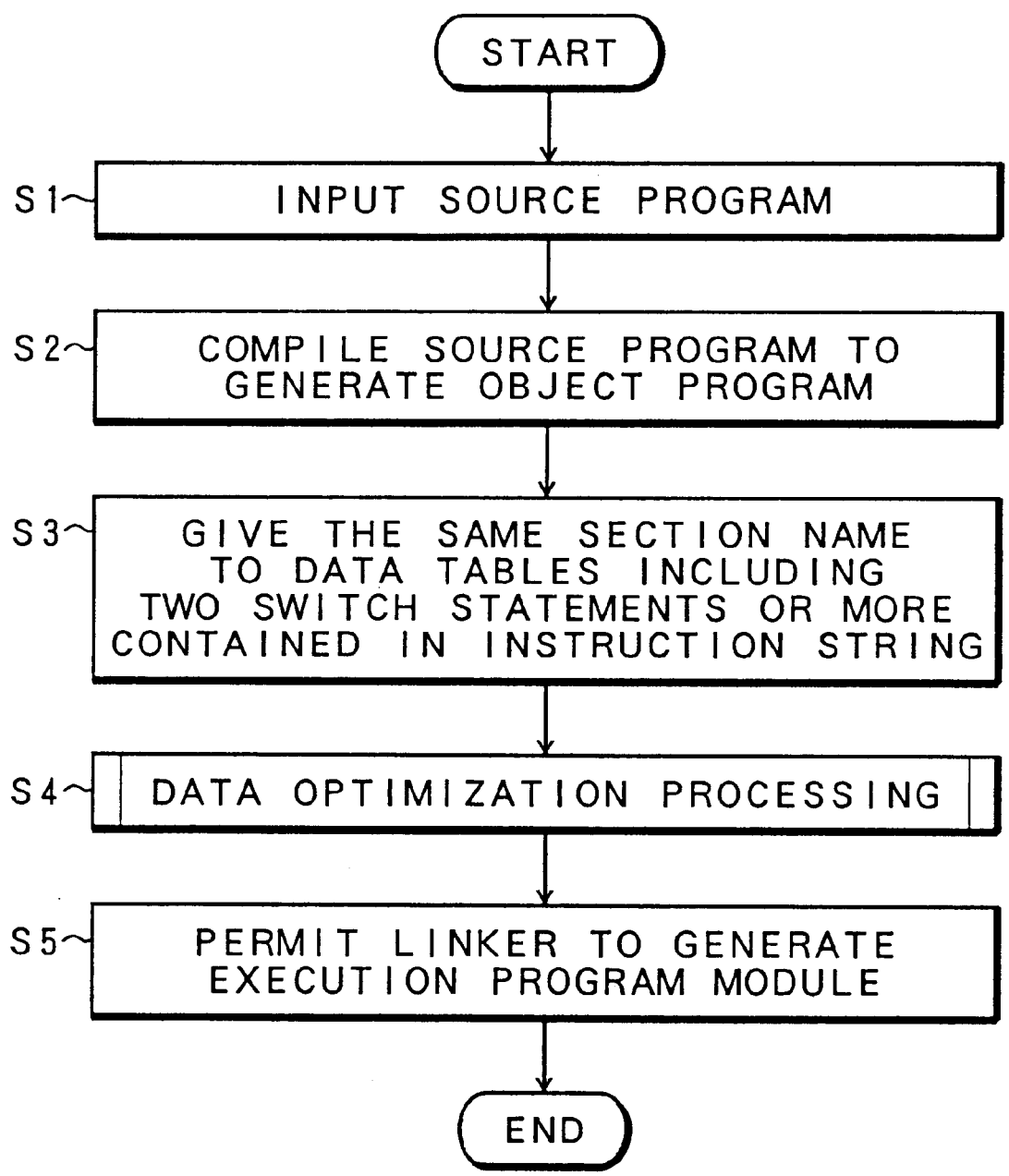
FIG. 17 is a flowchart for optimization processing according to the invention for a switch statement obtained by giving of section names.

FIG. 17 is a flowchart for processing by the switch statement data processing unit of the data optimization unit 70 of FIG. 7. The C language known as a high-level language uses a switch statement, which is used for multi-directional separation based on a variable value. As a result, an instruction string of the switch statement typically contains a data table, so that if the existing linker generates an execution program module from an object program having this switch statement, instructions and data are mixed in an instruction string of the switch statement in the execution program module. To guard against this, in processing of a switch statement in the object program shown in FIG. 17, a data table contained in the switch statement are separated from each other during linking for generating an execution program module.

In FIG. 17, at step S1 the source program 10 is input as shown in FIG. 1 and, at step S2, is compiled by the compiler 12 to generate the object program 14. Next, at step S3, data tables of two or more of switch statements contained in an instruction string of the object program 14 are given the same section name. Next, at step S4, processing is executed by the reference/unreference name giving unit 80 and/or the approximate reference time section name giving unit 81 of FIG. 7 shown in a subroutine of FIG. 9 and/or those of FIG. 15 to then generate an execution program module by the linker 20 from the object program at step S5. In this case, since the data tables mixed over a plurality of switch statements have the same section name, the function of the linker 20 for aggregating the same section names can be utilized to separate the data tables from among the instruction strings of the switch statements in order to arrange them collectively into one aggregate.

Figure 18A:
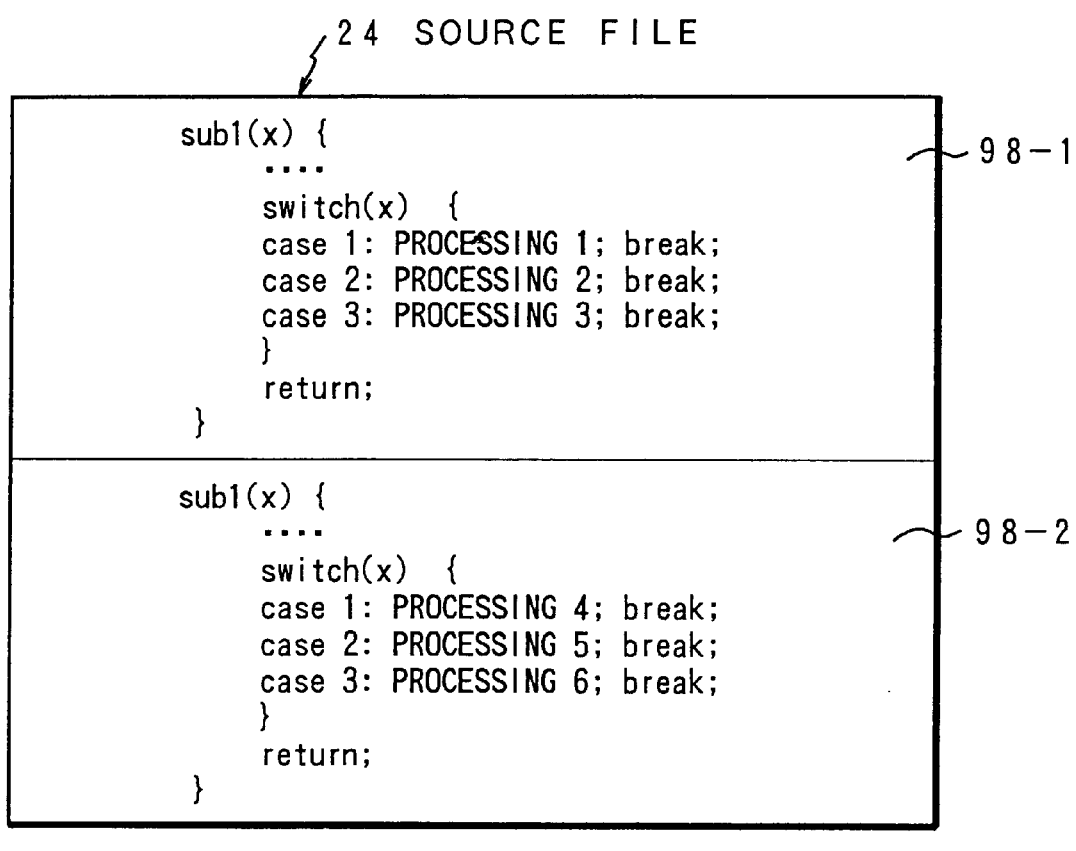
Figure 18C:
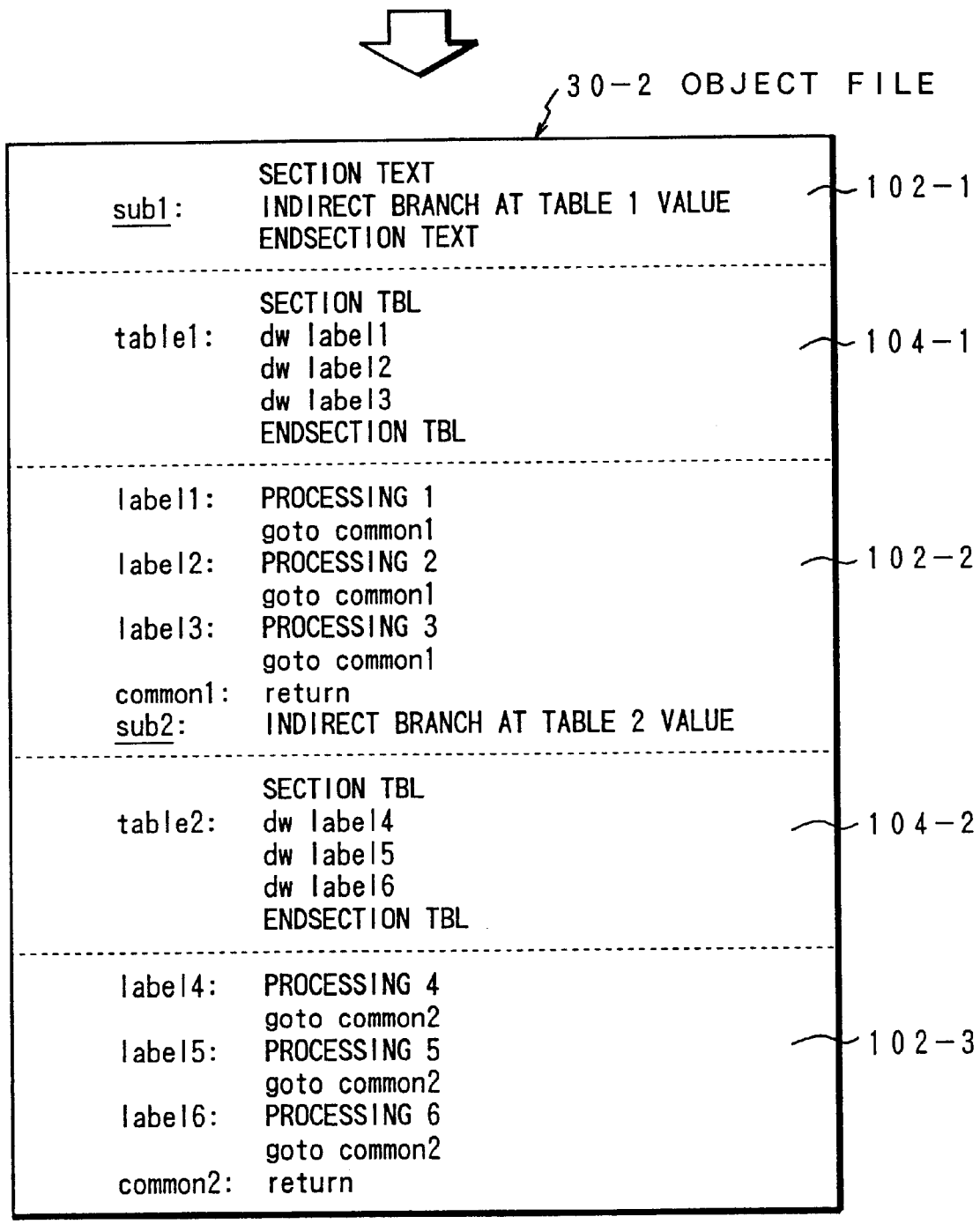
Figure 18D:
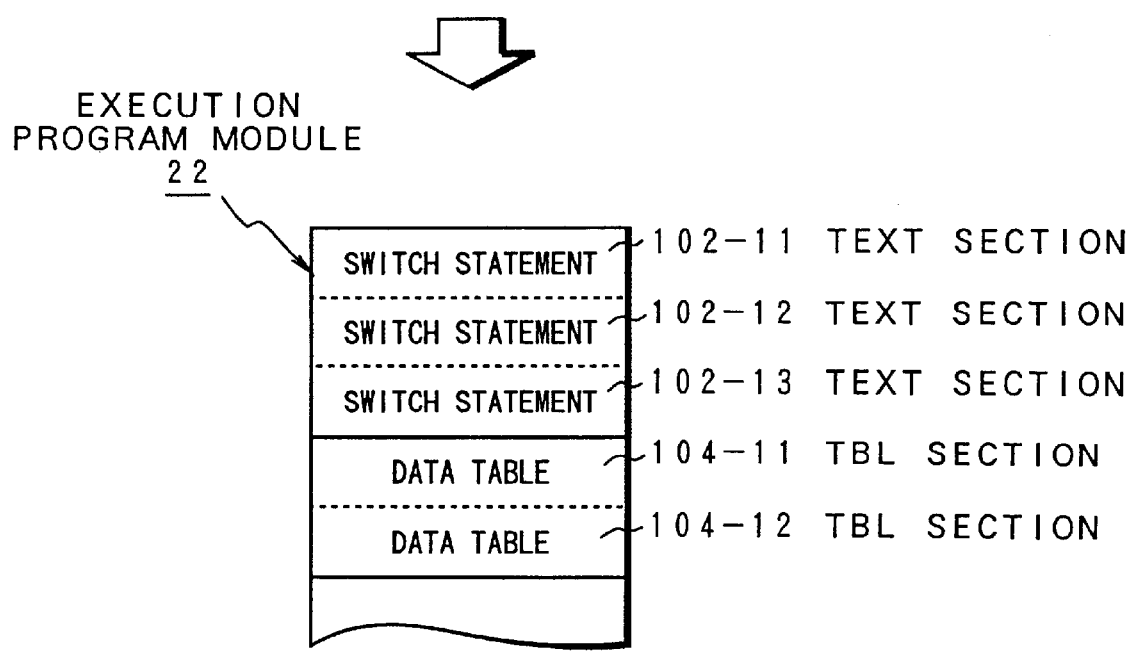

FIGS. 18A–18D show a specific example of optimization processing for the switch statement of FIG. 17. FIG. 18A shows the source file 24 of the source program, which comprises two switch statements of subroutines 98-1 and 98-2. This source file 24 is compiled by the compiler 12 for each of the subroutines to generate the object file 30-1 of FIG. 18B. The object file 30-1 is divided into two subroutines 100-1 and 100-2, each comprising data tables "dw label1," "dw label2", and "dw label3" indicated by an external reference name "table1" and data tables "dw label4", "dw label5", and "dw label6" indicated by an external reference name "table2". Even if such an object file 30-1 is given to the existing linker 20, the respective data tables cannot be separated from the instruction string to eventually generate such an execution program that has instruction strings and data mixed therein. To guard against this, by the invention, as shown in FIG. 18C, the object file 30-1 of FIG. 18B is divided into instruction sections 102-1, 102-2, and 102-3 and data sections 104-1 and 104-2 of which the data sections 104-1 and 104-2 are given the same section name "TLB" as indicated in their respective first row. When the object file 30-2 thus provided with the section name "TLB" at the data sections of switch statements is linked by the linker 20 to generate the execution program module 22, as shown in FIG. 18D, module sections 102-11 through 102-13 corresponding to the instruction sections 102-1 through 102-3 of FIG. 18C respectively are collected in one aggregate of the switch statement instruction strings, following which are arranged as one aggregate module sections 104-11 and 104-12 corresponding to the data sections 104-1 and 104-2 of FIG. 18C provided with the same section name "TLB". If the data portion can be thus arranged separately from the switch statement instruction strings and this switch statement had been executed during experimental execution by the simulator 16, the executed switch statements of FIG. 18D can be collectively arranged in a referenced data portion and the data portions of the switch statement can be collectively arranged in a referenced data portion. Therefore, a C-language switch statement also can be divided into instruction strings and data, to then arrange the instruction strings and the data collectively into an execution portion or an unexecution portion and a reference portion or unreference portion respectively as a whole module over more than one compilation unit, e.g. one file.

Figure 19A:
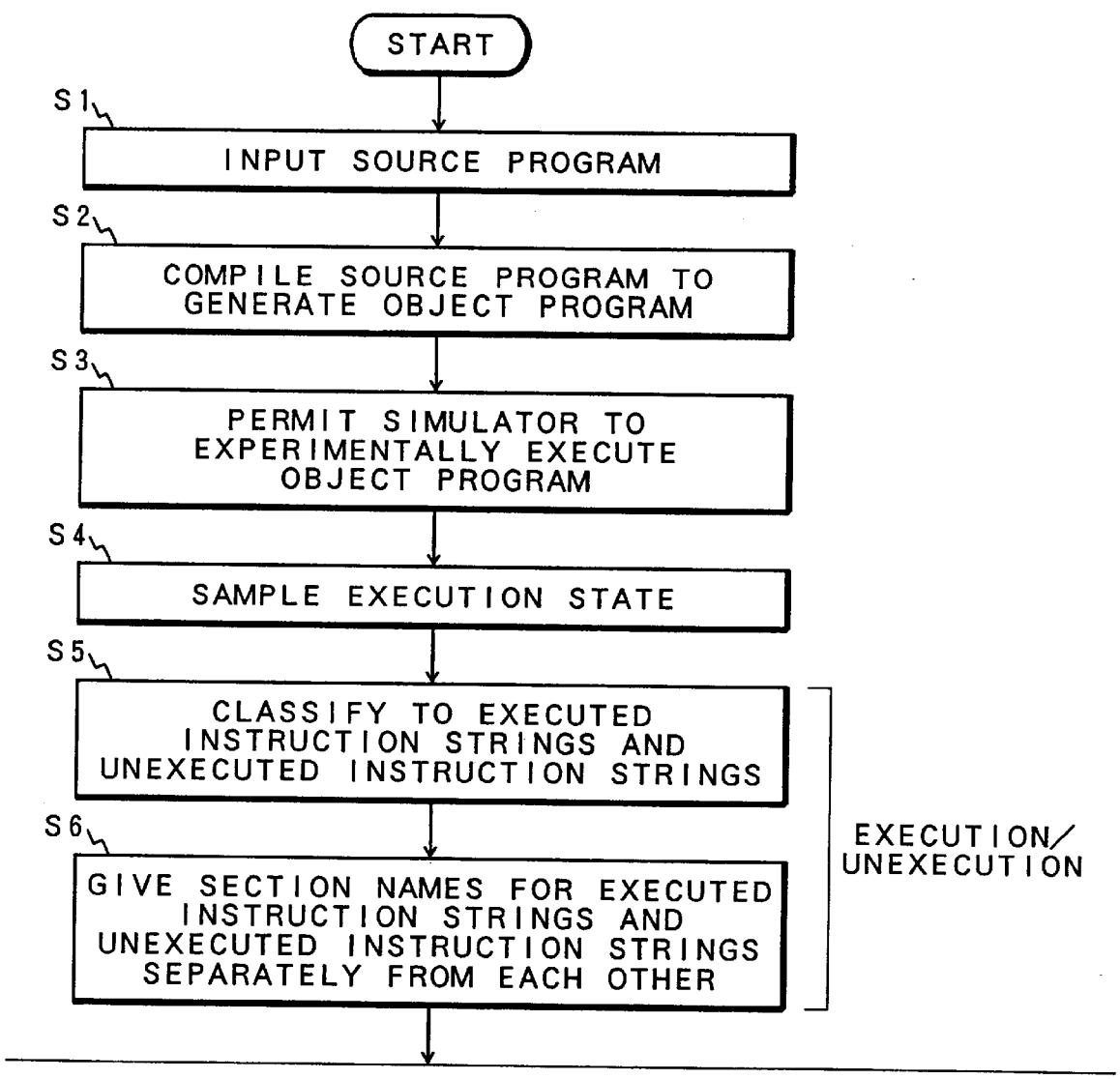
FIGS. 19A and 19B are flowcharts for another embodiment of the invention for optimizing an execution module by such functions as execution/unexecution discrimination by giving of section names, execution frequency, translation from execution time-wise proximity into space-wise proximity, and referenced/unreferenced states of data.
Figure 19B:
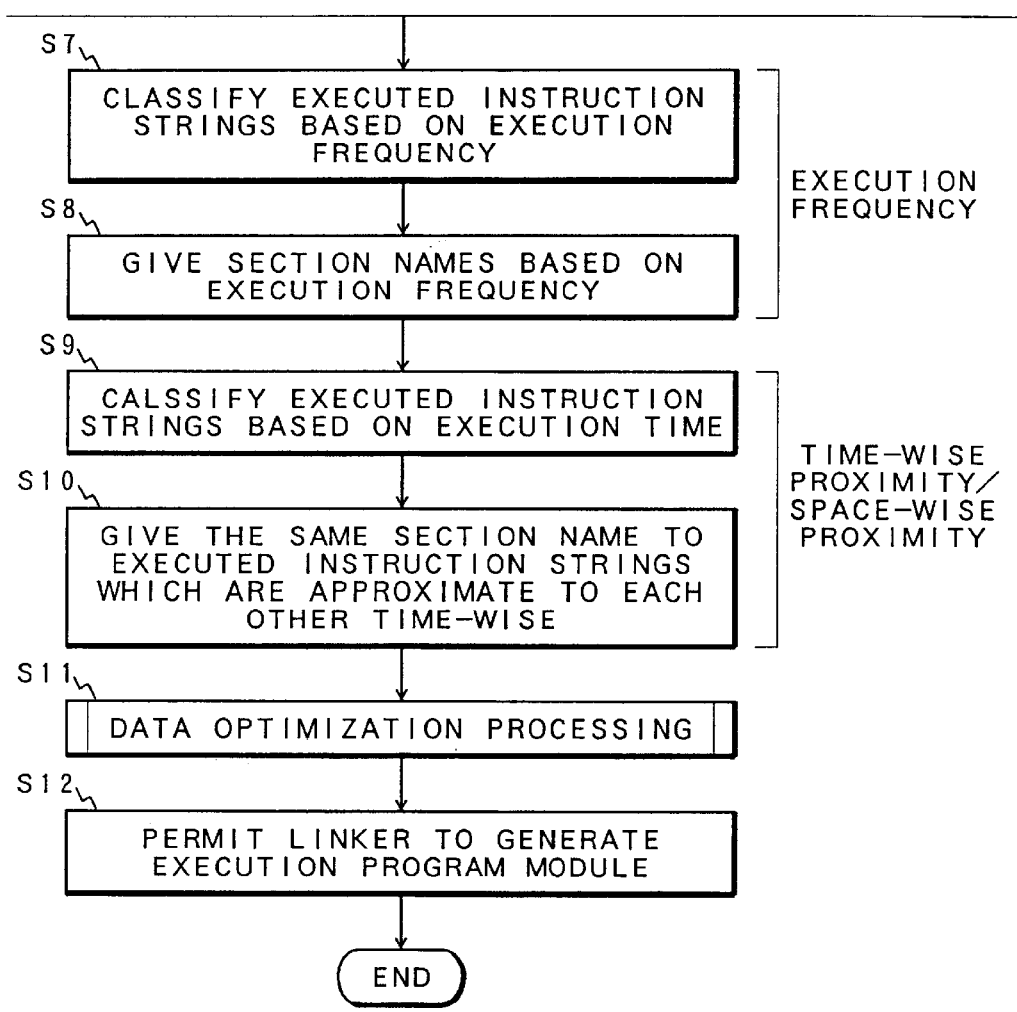

FIG. 19 is a flowchart for optimization processing according to the invention that combines all of the processing functions of the instruction optimization unit 68 and the data optimization unit 70 which utilize a function of the linker 20 shown in FIG. 7 of collecting instruction strings having the same section name into one aggregate. First, at step S1, the source program 10 is input as shown in FIG. 1 and, at step S2, is compiled by the compiler 12 for, e.g. each file to generate the object program 14. Then, at step S3 the simulator 16 executes the program experimentally to sample execution states at step S4. Then, at steps S5 and S6, processing is conducted by the execution/unexecution section name giving unit 72 of FIG. 7. That is, different section names are given to the executed instruction strings and the unexecuted instruction strings. Next, at steps S7 and S8, processing is conducted by the execution frequency section name giving unit 74 of FIG. 7. That is, the instruction strings are classified according to their execution frequency, e.g. high, medium, and low frequencies, to then given them a section name for each category of the execution frequencies. Next, at steps S9 and S10, processing is conducted by the approximate execution time section name giving unit 76 of FIG. 7. That is, the instruction strings are classified according to the execution time to then give the same section name to the instruction strings executed proximately time-wise. Next, at step S11, processing is conducted by the data optimization unit 70. This processing by this data optimization unit 70 is supposed to be a combination of processing of subroutines of FIG. 8 by the reference/unreference section name unit 80, processing of subroutines of FIG. 15 by the approximate reference time section name giving unit 81, and even processing corresponding to step S3 of FIGS. 16A and 16B by the switch statement data processing unit 82. And finally, at step S12, when the linker 20, when generating an execution program module from the object module provided with a section name based on steps S5–S11, its function of collecting the same section name into one aggregate to realize the following in the execution program module:

I. discrimination between executed instruction strings and unexecuted instruction strings;

II. collection of instruction strings in accordance with execution frequencies;

III. translation of time-wise approximate instruction strings into space-wise approximate instruction strings;

IV. isolation in arrangement of referenced data and unreferenced data;

V. translation of time-wise proximately referenced data into space-wise proximate data in arrangement;

VI. discrimination of data contained in switch statement; and

VII. arrangement of instruction strings having a higher execution frequency and those having a lower execution frequency for successful static branch prediction.

(Optimal Arrangement by Giving External Reference Names)

Figure 20:
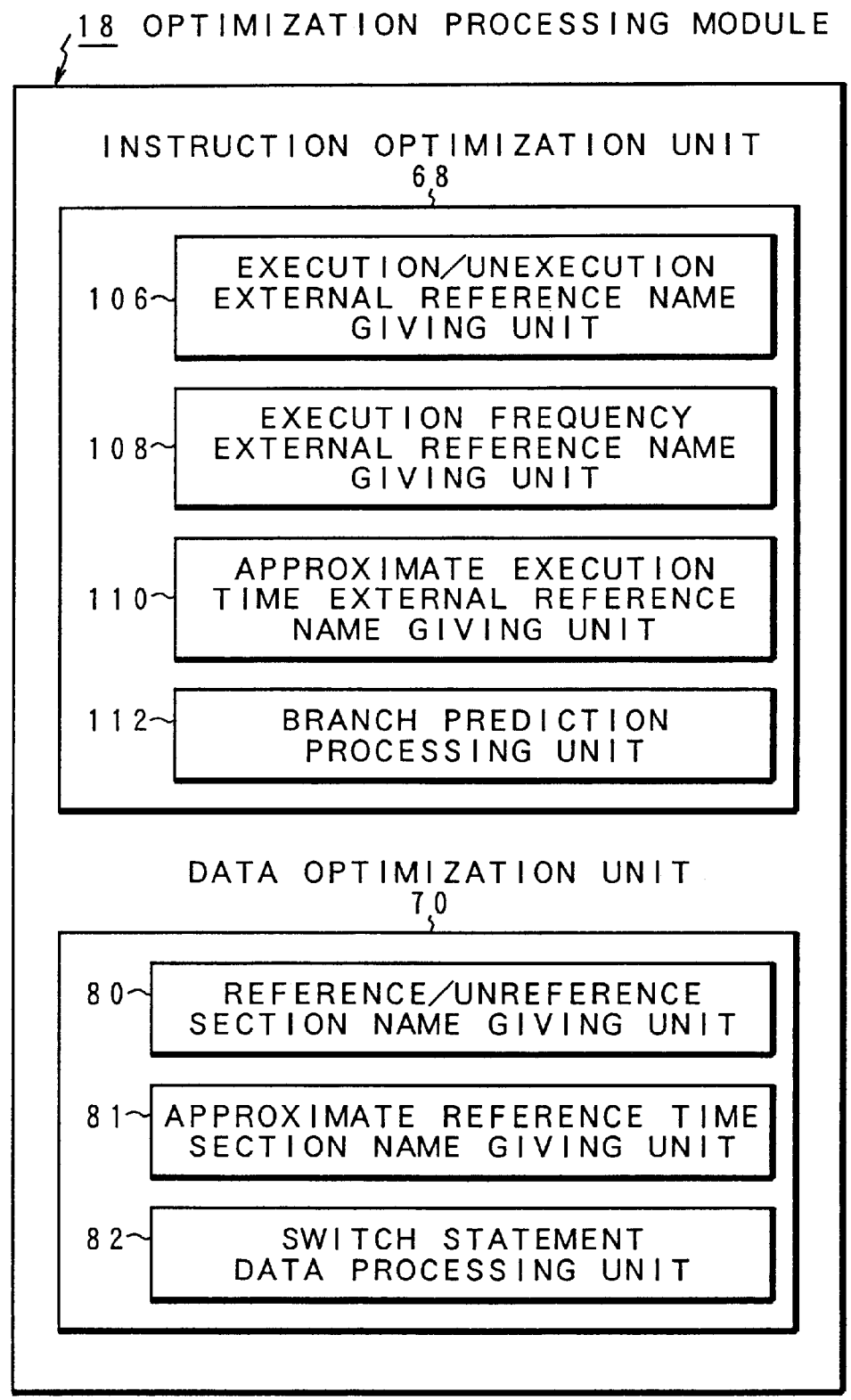
FIG. 20 is a functional block diagram of the optimization module generating portion of FIG. 1 for optimizing an execution module based on giving of external reference names.

FIG. 20 shows a second embodiment of the optimization processing module 18 of FIG. 1, in which the "function of controlling the jointing order in the modules according to the external reference name list" of the linker 20 is utilized in optimization to collect executed instruction strings and unexecuted instruction strings separately from each other or referenced data and unreferenced data from each other over more than one compilation unit without changing the program compilation unit such as a file, subroutine, or function and also without creating a link processing program (linker) for batch processing of the system as a whole. The optimization processing module 18 according to this second embodiment comprises the instruction optimization unit 68 and the data optimization unit 70. The instruction optimization unit 68 is provided with an execution/unexecution external reference name giving unit 106, an execution frequency external reference name giving unit 108, an approximate execution time external reference name giving unit 110, and a branch prediction processing unit 112. Also, the data optimization unit 70 is provided with, like in the case of the first embodiment of the optimization processing module 18 of FIG. 7, the reference/unreference section name giving unit 80, the approximate reference time section name giving unit 81, and the switch statement data processing unit 82. The execution/unexecution external reference name giving unit 106 of the instruction optimization unit 68 divides a plurality of files in the object program 14 into sections outputting executed instruction strings and sections outputting unexecuted instruction strings based on execution information indicating executed instructions and unexecuted instructions obtained from experimental execution of the object program by the simulator, to then give these sections other external reference names respectively. Accordingly, based on an external reference name list created by the execution/unexecution external reference name giving unit 106, the linker 20 can, when generating an execution program module by linking, collect each of the executed sections and the unexecuted sections into one aggregate, thus discriminating between an execution portion and an unexecution portion. Based on the execution frequency information of the executed instructions obtained in the experimental execution by the simulator 16, the execution frequency external reference name giving unit 108 gives unique external reference names to the sections outputting the executed instruction strings for the plurality of files in the object program according to the execution frequencies, e.g. high, medium, and low frequencies and then generates an external reference name list which sorts the names in a descending order of the execution frequency. Accordingly, based on the external reference name list generated by the execution frequency external reference name giving unit 108, the linker 20 can, during linkage, collect the instruction strings of higher execution-frequency sections in the plurality of files into a small range. Based on the execution time information of the executed instruction strings in the object program 14 obtained in the experimental execution by the simulator 16, the approximate execution time external reference name giving unit 110 gives the same external reference name to the sections outputting time-wise proximately executed instruction strings and, at the same time, generates an external reference name list which lists the external reference names of the sections outputting the time-wise proximately executed instruction strings. To this end, based on the external reference name provided by the approximate execution time external reference name giving unit 110, the linker 20 arranges the instructions executed proximately time-wise over a plurality of files such that they may be approximate space-wise. Further, based on the execution frequency information of the executed instructions in the object program 14 experimentally executed by the simulator 16, the branch prediction processing unit 112 gives external reference names to sections outputting branch-destination instruction strings having a higher execution frequency and sections outputting branch-destination instruction strings having a lower execution frequency so that static branch prediction may come true for deciding branching and non-branching predictably by observing the location relationship between the branch destination and the branch source when conditional branch instructions are executed and, at the same time, generates an external reference name list which lists the names in a descending order of the execution frequency. To this end, based on the external reference name list generated by the branch prediction processing unit 112, the linker 20, during linkage, arranges branch-destination instruction strings in a descending order of the execution frequency so that static branch prediction may come true.

Figure 21:
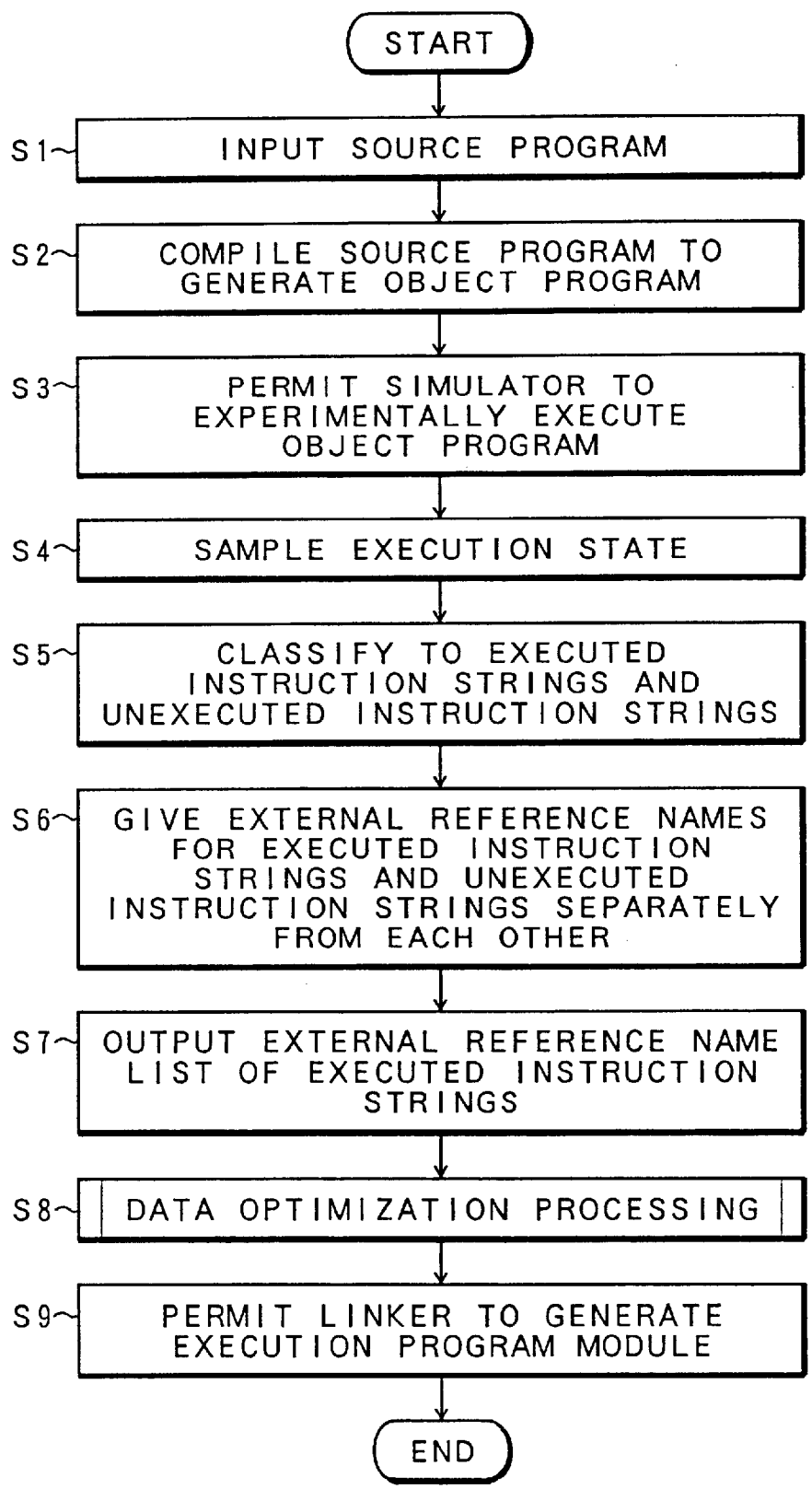
FIG. 21 is a flowchart for optimization processing according to the invention for processing by the linker for classification into an execution portion and an unexecution portion by giving of external reference names.

FIG. 21 shows optimization processing by the execution/unexecution external reference name giving unit 106 of the instruction optimization unit 68 of FIG. 20. Steps S1–S5 are the same as those for giving section names. At the next step S6, the execution/unexecution external reference name giving unit 106 of FIG. 20 gives unique external reference names to executed instruction strings and unexecuted instruction strings respectively to output an external reference name list of, for example, executed instruction strings at step S7. This external reference name list may include external reference names for executed instruction strings which follow the external reference names of the executed instruction strings. Next, at step S8, processing is conducted by the data optimization unit 70 of FIG. 20 and, at step S9, based on the external reference name list for the executed instruction strings output at step S7, the linker 20 arranges the executed instruction strings and the unexecuted instruction strings separately from each other in the execution program module.

Figure 22B:
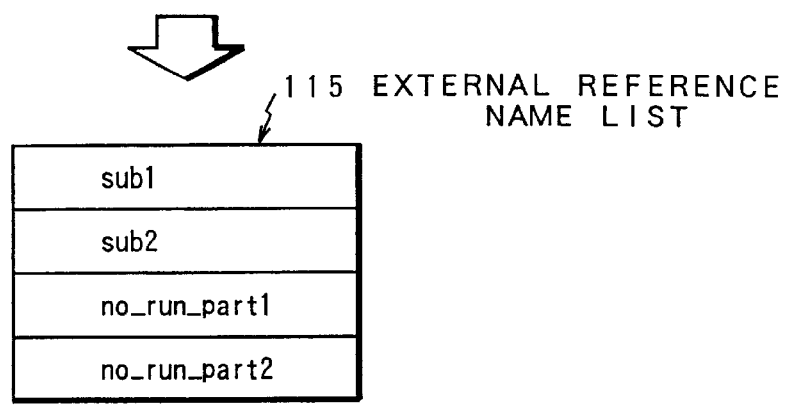
Figure 22C:
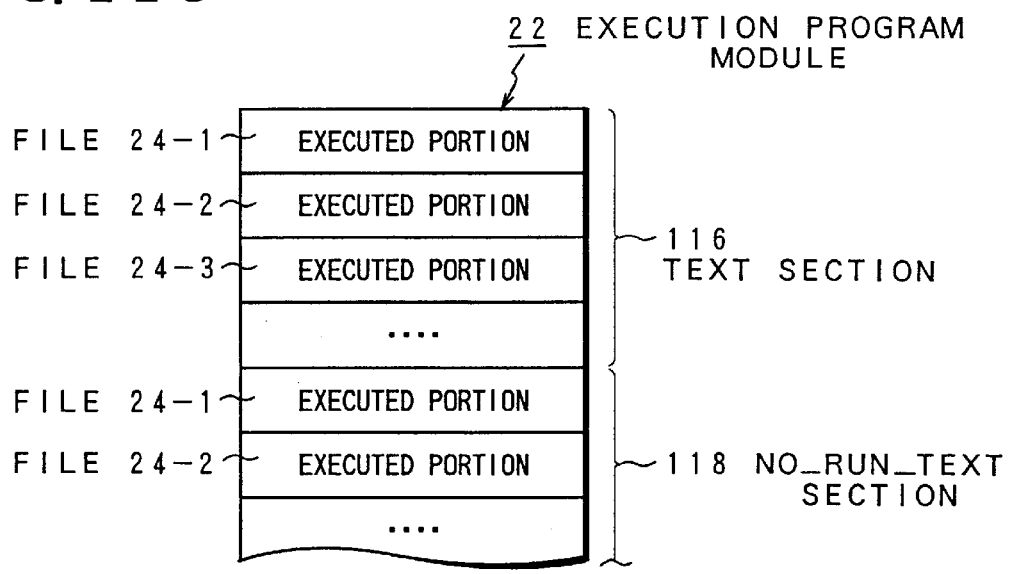

FIGS. 22A–22C show a specific example of optimization processing for separately arranging the executed instruction strings and the unexecuted instruction strings by giving the external reference names of FIG. 21. FIG. 22A shows the files 30-1 and 30-2 of the object program 14 generated by the compiler 12 of FIG. 1, of which the file 30-1 indicates the details of instruction strings. These object files 30-1 and 30-2 are provided with information of "execution" and "unexecution" as shown to the right side of the object file 30-1 as the execution information due to experimental execution by the simulator 16. Also, the file 30-1 is divided into an object section 114-1 of execution portions and an object section 114-2 of unexecution portions. Specifically, the contents of one file are collected into an execution portion and an unexecution portion 80 after undergoing the same processes as those of FIGS. 11A–11C. The following object file 30-2 is also divided into an object section 114-3 of execution portions and an object section 114-4 of unexecution portions. Those object files 30-1 and 30-2 undergo processing at step S6 of FIG. 21 such that an external reference name "sub1" is given to the execution section 114-1 and an external reference name "no-run-part1" is given to the unexecution section 114-2 of the object file 30-1. In this case, the external reference name "sub1" of the execution object section 114-1 is used as it is given when the object file is generated. As for the following file 30-2 also, external reference names "sub3" and "no-run-part2" are given to the execution object sections 114-3 and 114-2 respectively. In this case, the external reference name "sub3" of the execution object section 114-3 is also used as it is given when the object file is generated. Next, processing is conducted at step S7 of FIG. 21 so as to generate and output a list 116 of FIG. 22B. To FIG. 22A, the list 116 of FIG. 22B is generated and output. This list 116 arranges therein the external reference names "sub1" and "sub3" of the respective execution object sections 114-1 and 114-3 side by side and the subsequent external reference names "no-run-part1" and "no-run-part2" of the respective unexecution object sections 114-2 and 114-4 side by side. Finally at step S9 of FIG. 19, based on the external reference name list 116 output as shown in FIG. 22, the linker 20 collects into one aggregate the execution portion 116 containing the module sections 114-11 and 114-13 respectively corresponding to the execution object sections 114-1 and 114-3 for the files 30-1 and 30-2 of FIG. 22A over more than one file and also collectively arranges into one unexecution portion 118 the module sections 114-12 and 114-14 respectively corresponding to the execution object sections 114-2 and 114-4 of FIG. 22A, to generate the execution program module 22 of FIG. 22C which discriminates between the execution portion 116 and the unexecution portion 118 over more than one file.

Figure 23:
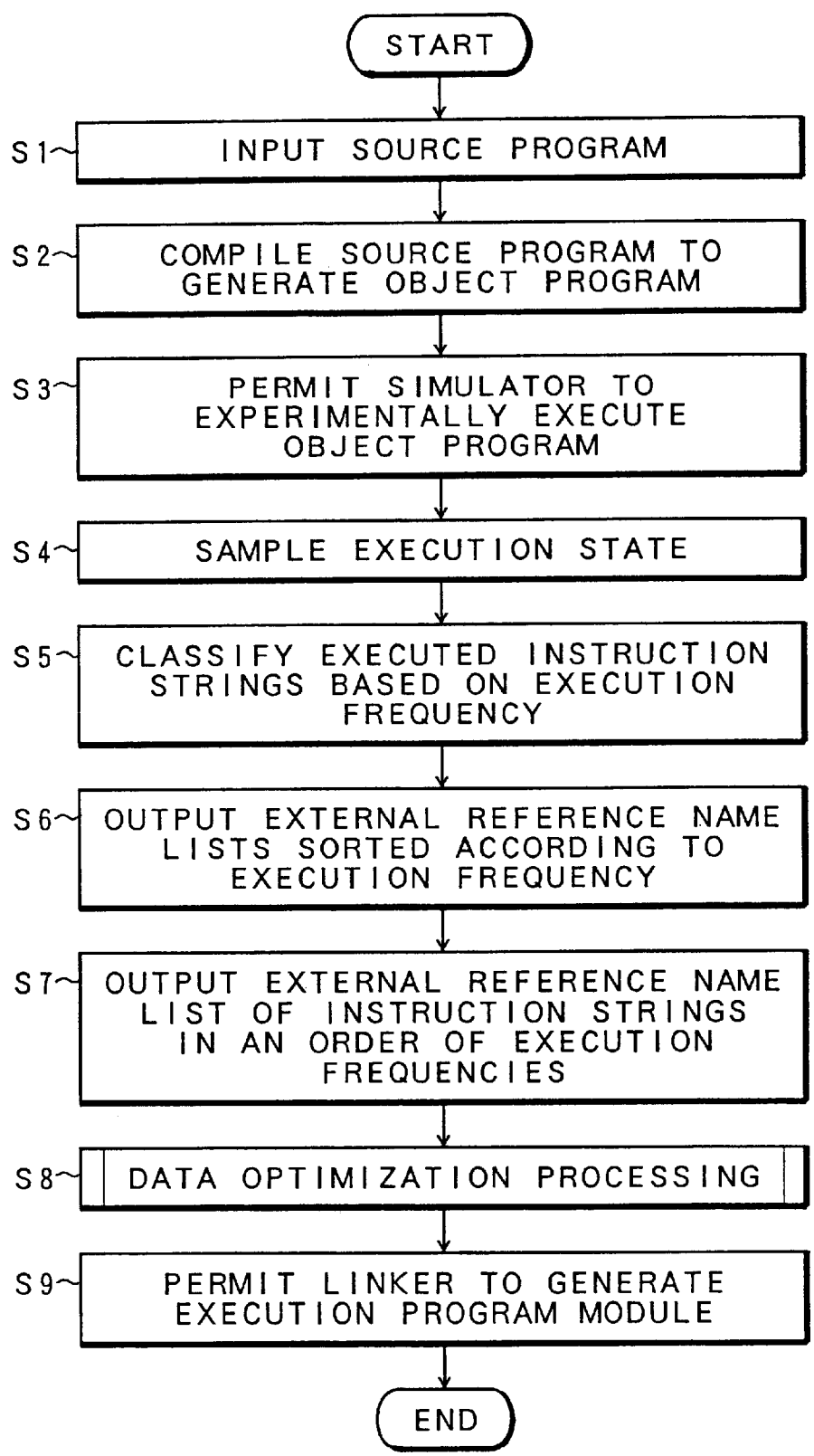
FIG. 23 is a flowchart for optimization processing according to the invention based on giving of external reference names and execution frequencies.

FIG. 23 is a flowchart for optimization processing by the execution frequency external reference name giving unit 108 of FIG. 20. Steps S1–S5 are the same as those of FIG. 12 based on giving of section names. At the next step S6, the execution frequency external reference name giving unit 108 of FIG. 20 gives for each category of, for example, high, medium, and low execution frequencies and, at step S7, an external reference name list is output which sorts these names in a descending order of the execution frequency. Next, at step S8 the data optimization unit 70 gives section names to referenced/unreferenced data or give section names for translation from time-wise proximity to space-wise proximity of data and then, at step S9, according to the external reference name list output at step S7, the linker arranges the instruction strings in the execution program module in such a manner that the instruction strings having a higher execution frequency may be collected into one range.

Figures 24B, 24C:
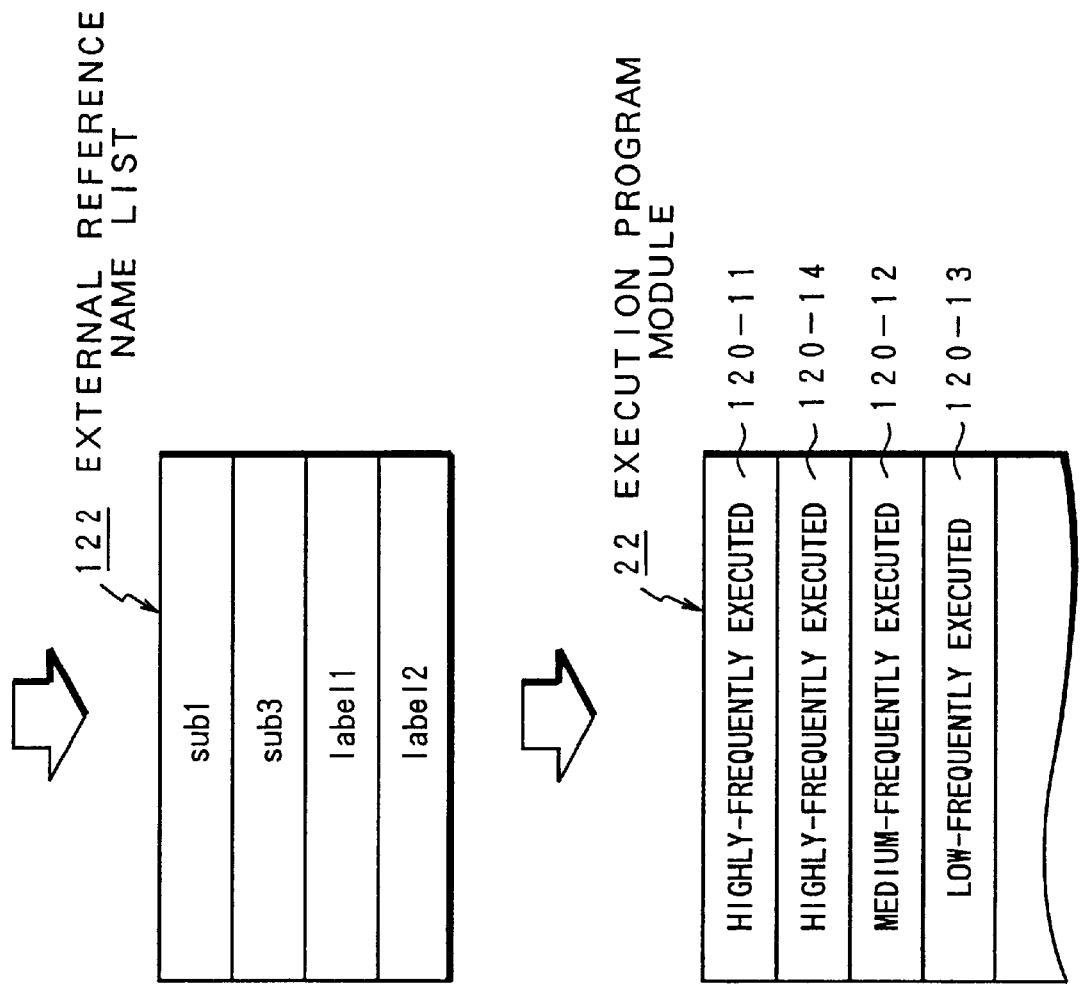
FIG. 24 is an illustration explaining an object provided with external reference names according to execution frequencies, an external reference name list based on execution frequencies, and an execution module with an arrangement based on an order of execution frequencies in the optimization processing of FIG. 28.

FIGS. 24A–24C show a specific example of optimization processing by giving of external reference names based on the execution frequency in accordance with FIG. 23. FIG. 24A shows the object file 30 of an object program, which us divided into object sections 120-1 through 120-4 based on the execution frequency information. Those object sections 120-1 through 120-4 are provided with the frequency information of high, medium, and low frequencies in accordance with frequency information due to experimental execution. With this, based on the frequency information, the object sections 120-1 through 120-4 are given external reference names "sub1", "label1", "label2", and "sub2" respectively. Those external reference names are used as they are given when the object file is generated, so that if no external reference name is given, a specific external reference name is newly given. Next, as shown in FIG. 24B, a list 122 is generated which sorts and stores therein the external reference names in a frequency order of the object sections 120-1 through 120-4. The list 122 arranges first the external reference names "sub1" and "sub2" of the respective object sections 120-1 and 120-4 having a high frequency, the external reference name "label1" of the medium-frequency object section 120-2, and the external name "label2" of the low-frequency object section 120-3 in this order. As shown at step S9 of FIG. 21, based on the external reference name list 122 of FIG. 24, the linker 20 arranges the module sections 120-11, 120-14, 120-12, and 120-13 in this order which correspond to the object sections 120-1, 120-4, 120-2, and 120-3 respectively as shown in the execution program module 22 of FIG. 24C.

Figure 25:
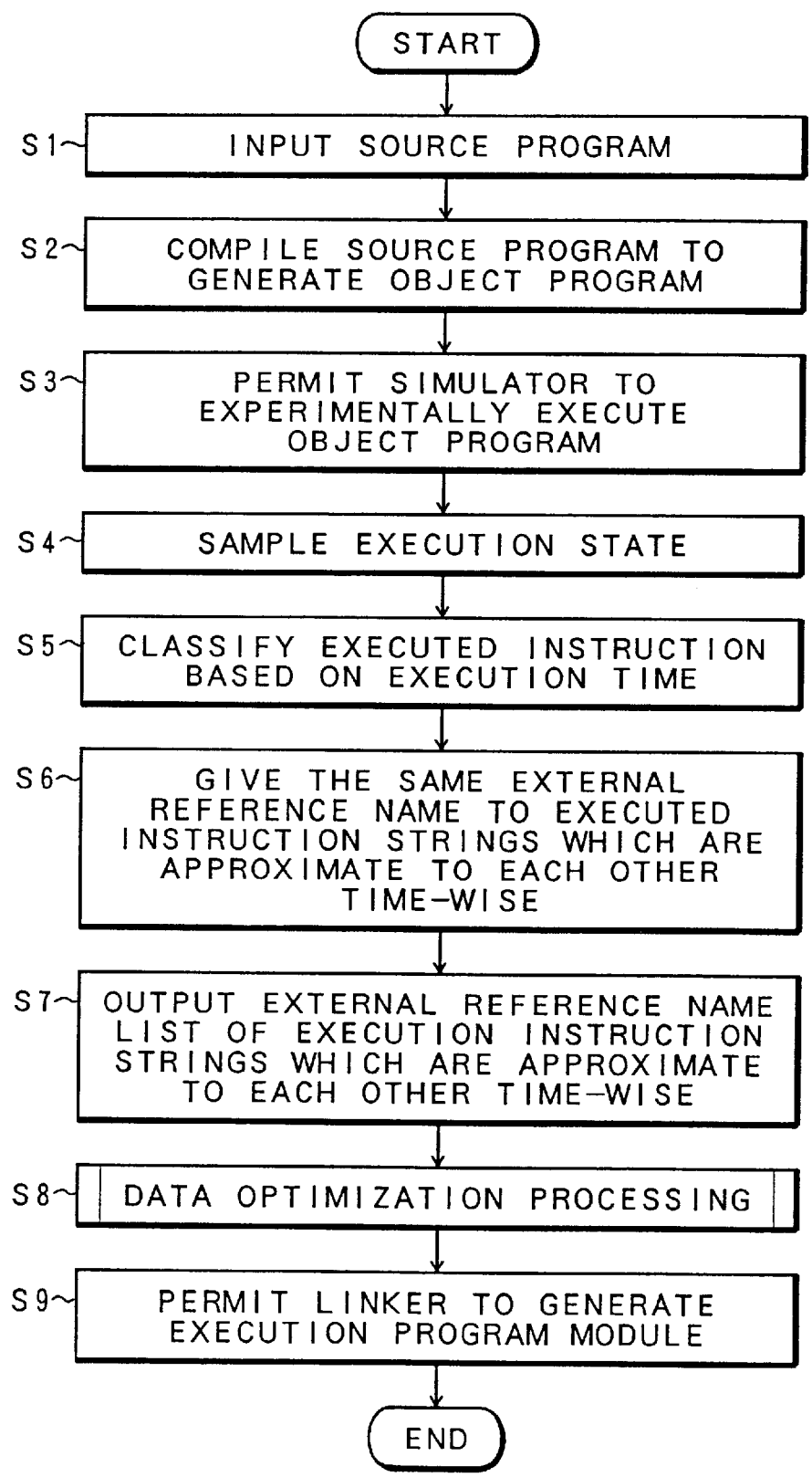
FIG. 25 is a flowchart for optimization processing according to the invention for re-arranging time-wise approximate execution portions into space-wise approximate ones by giving them external reference names.

FIG. 25 shows a flowchart for optimization processing by the approximate execution time external reference name giving unit 110 of FIG. 20. Processing at steps S1–S5 is the same as that for optimization processing by giving of section names of FIG. 14. At the next step S6, the approximate execution time external reference name giving unit 110 of FIG. 20 gives external reference names to the instructions executed proximately time-wise and, at step S7, outputs their external reference name list. At the next step S8, the data optimization unit 70 of FIG. 20, for example, gives names to referenced data and unreferenced data and translates time-wise proximity to space-wise proximity of the data and, finally at step S9, the linker 20 generates an execution program module in which the instruction strings are arranged according to the external reference name list output at step S7.

Figure 26A:
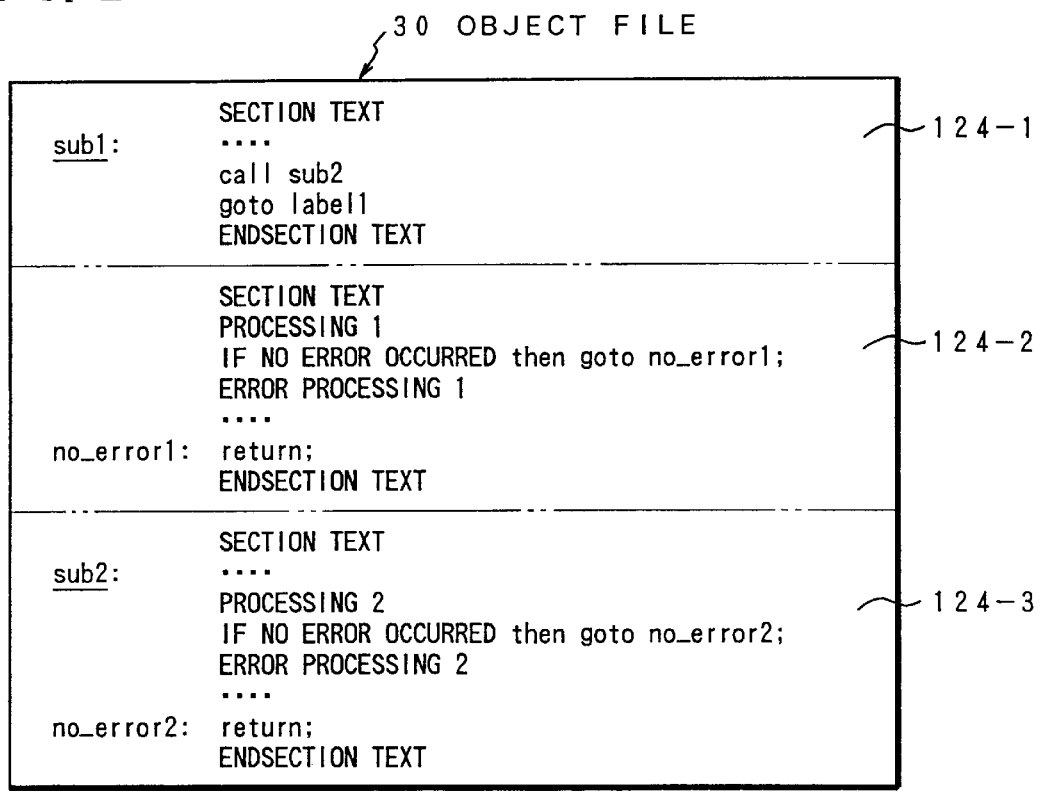
FIGS. 26A–26C are illustrations explaining an object having time-wise approximate execution portions and an execution module having a space-wise approximate arrangement in the optimization processing of FIG. 25.
Figure 26B:
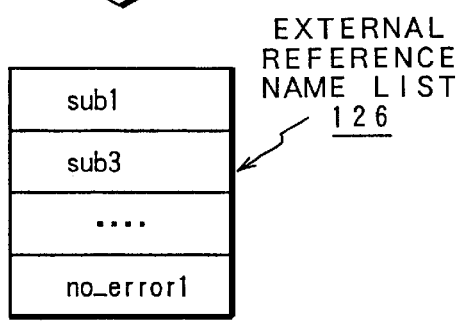
Figure 26C:
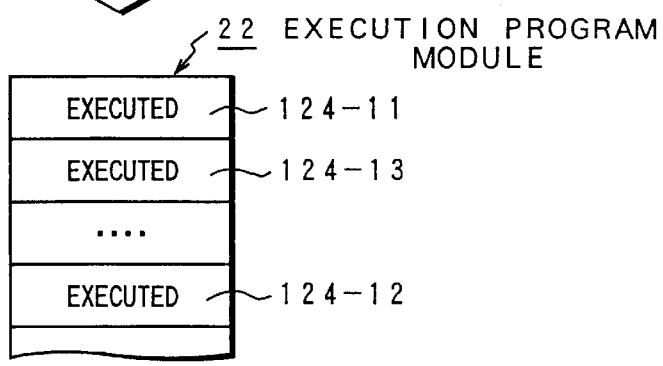

FIGS. 26A–26C show a specific example of translating time-wise approximate instruction strings into space-wise approximate instruction strings based on the external reference name list of FIG. 25. FIG. 26A shows the object file 30 of the object program, which is divided into three instruction-outputting object sections 124-1, 124-2, and 124-3. Of these, the first object section 124-1 and the third object section 124-3 are to be executed and the middle object section 124-2 is not to be executed. As for such an object file 30 of FIG. 26A, respective external section names are given at step S6 of FIG. 25 and then, at step S7, as shown in FIG. 26B, an external reference name list 126 is generated and output which arranges therein the time-wise proximately executed object files 124-1 and 124-3 side by side. Accordingly, at step S9 of FIG. 27, based on the external reference names in the external reference name list 126 of FIG. 26B, the linker 20 arranges side by side the module sections 124-11 and 124-13 of the respective object sections 124-1 and 124-3 approximate time-wise of the object file 30 of FIG. 26A, so that the time-wise approximate instruction strings are translated into space-wise approximate instruction strings. The unexecuted object section 124-2 of FIG. 26A is, of course, divided in arrangement into unexecution portions of the execution program module 22.

Figure 27A:
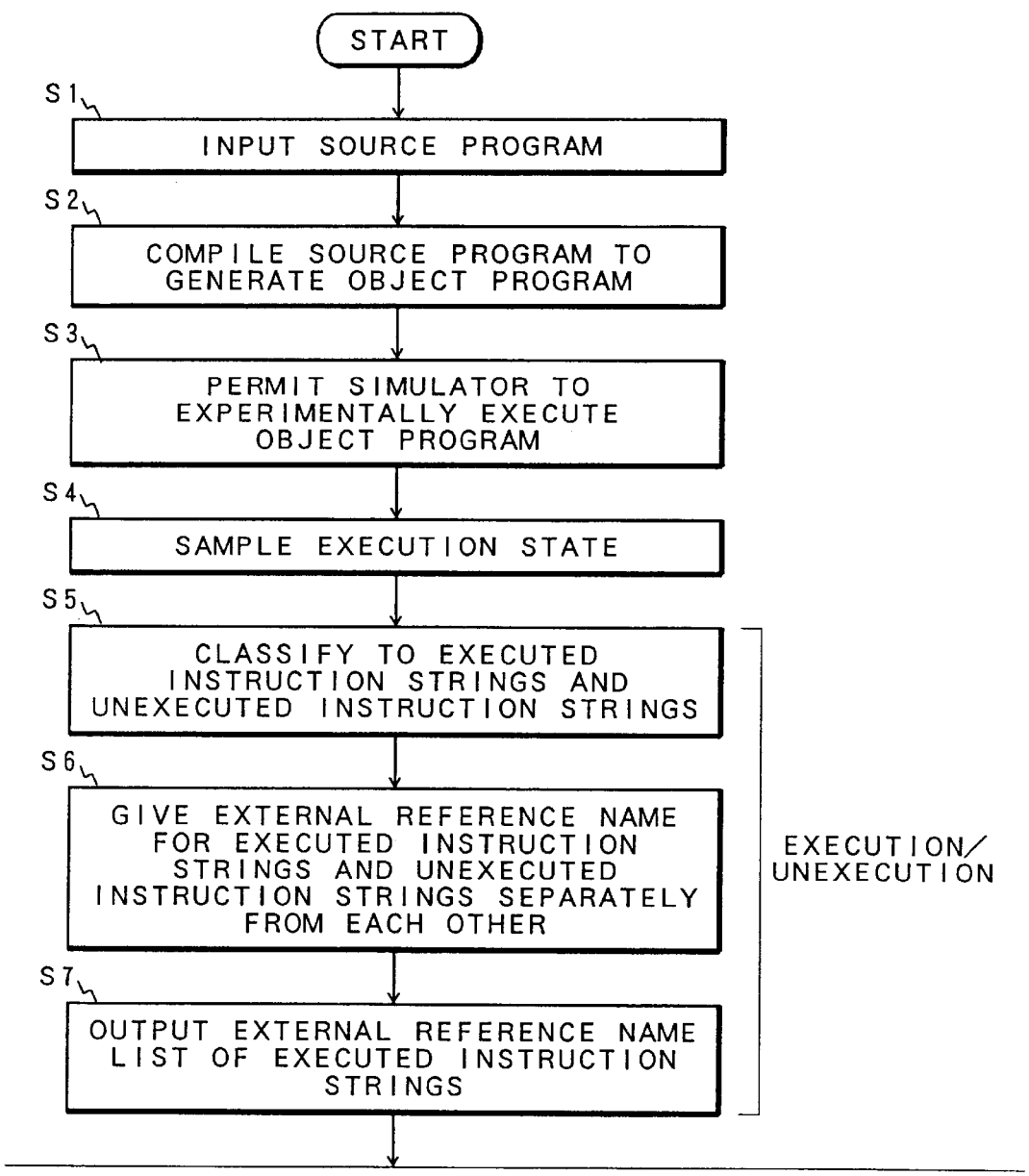
FIGS. 27A and 27B are flowcharts for further another embodiment of the invention for optimizing an execution module by use of such functions as execution/unexecution discrimination by giving of external reference names, execution frequency, translation from execution time-wise proximity into space-wise proximity, and referenced/unreferenced state discrimination for data.
Figure 27B:
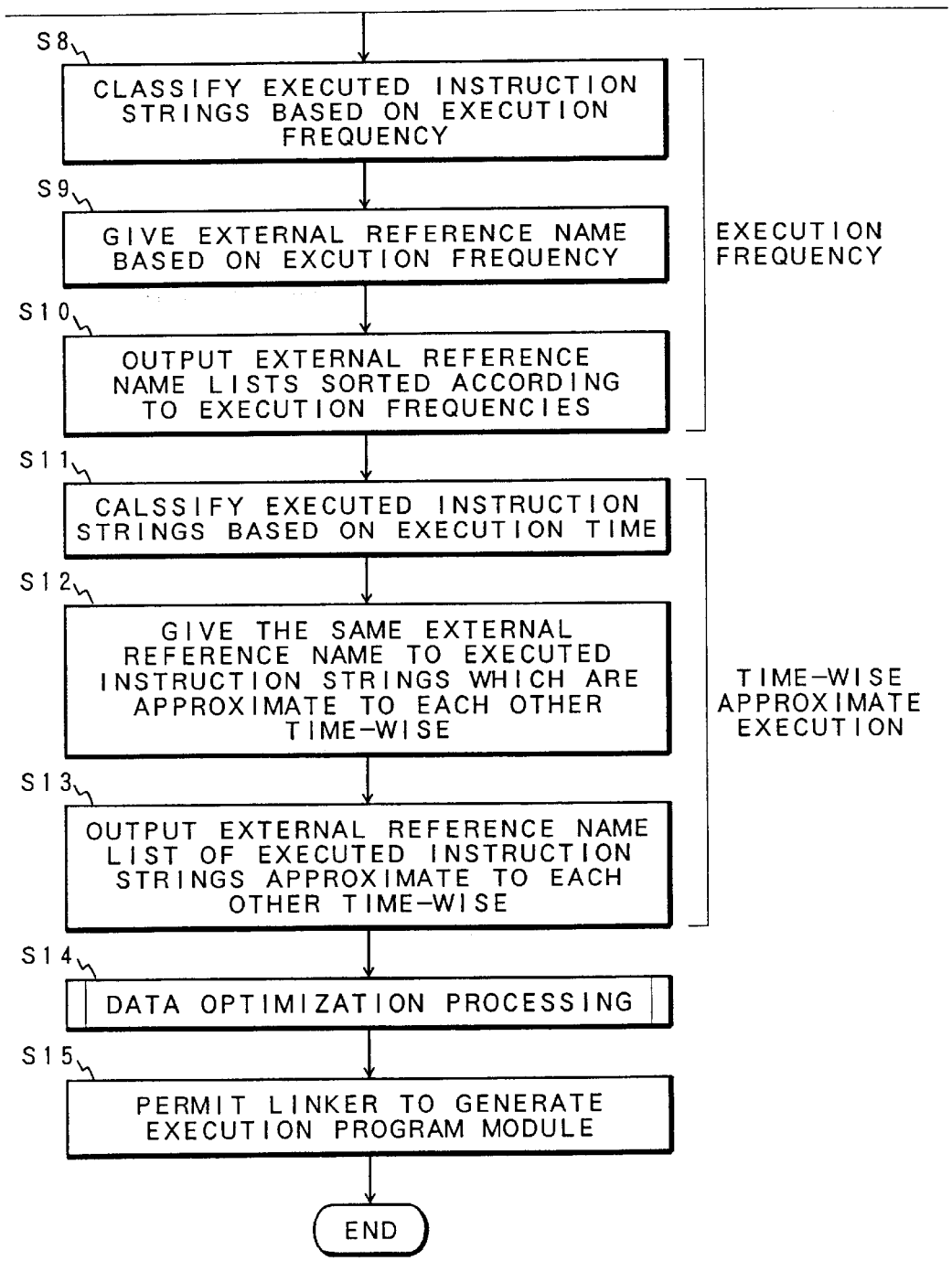

FIGS. 27A and 27B show a flowchart of optimization processing based on giving of external reference names in a case where all of the function provided to the optimization processing module 18 of FIG. 20 are combined. In this optimization processing based on giving of external reference names when all of the functions are combined, contents of steps S1–S4 are the same as those when all functions are combined based on giving of section names shown in FIG. 19. The following steps S5–S7 give processes to be conducted by the execution/unexecution external reference name giving unit 106 of FIG. 20. The further following steps S8–S10 are processes to be conducted by the execution frequency external reference name giving unit 108 of FIG. 24. Also, processes of steps S11–S13 are to be conducted by the approximate execution time external reference name giving unit 110 of FIG. 24. Further, step S14 provides a process to be conducted by the data optimization unit 70 of FIG. 20. Finally at step S15, the linker 20 conducts execution/unexecution, execution frequency, approximate execution, and also separate arrangement of instruction strings and data in accordance with the external reference name list of the data, to thereby generate an execution program module. Also, as for optimal arrangement of the instruction strings and the execution program module in the execution program module by giving of the external reference names of FIG. 20, not only combining of all the functions but also combining of one or more of these functions may be possible for the instruction string optimization unit 68 and the data optimization unit 70. This holds true also of the first embodiment of the optimization processing module 18 by giving of the section names of FIG. 7.

Although the above-mentioned embodiments have employed the C language to code source programs, other languages such as C++ or human-friendly high-level languages may be employed to code the programs. Also, although the above-mentioned embodiments have exemplified a files as the compilation unit, an even smaller compilation unit such as a subroutine or function may be employed to provide the same effects.

INDUSTRIAL APPLICABILITY

As mentioned above, in contrast to the conventional optimization which involves concentration of instruction strings or data pieces into one compilation unit, the invention can use the existing linker or assembler to thereby control arrangement of the instruction or data over a plurality of compilation units, thus improving the speed of executing the instructions.

What is claimed is:

1. An optimization object generating apparatus comprising:

a compiler generating an object program in a predetermined compilation unit from a source program made up of a plurality of files;

a simulator executing said object program generated by said compiler in a specific execution environment to thereby generate execution information indicating executed instructions and unexecuted instructions;

a section name giving unit dividing, based on said execution information from said simulator, a plurality of files in said object program into sections outputting executed instruction strings and sections outputting unexecuted instruction strings and then giving different section names to said sections; and a link processing unit collecting sections having an executed section name and sections having an unexecuted section name in said plurality of files into one aggregate to thereby discriminate between an executed portion and an unexecuted portion when generating an execution program module from said object program.

2. An optimization object generating apparatus comprising:

a compiler generating an object program in a predetermined compilation unit from a source program made up of a plurality of files;

a simulator executing said object program generated by said compiler in a specific execution environment to thereby generate execution frequency information of executed instructions;

a section name giving unit giving, based on said execution frequency information from said simulator, section names according to an execution frequency of sections outputting executed instruction strings, of a plurality of files in said object program; and a link processing unit collecting sections having the same section name into one aggregate to thereby gather instruction strings having a high execution frequency into a small range when generating an execution program module from said object program by linking.

3. An optimization object generating apparatus comprising:

a compiler generating an object program in a predetermined compilation unit from a source program made up of a plurality of files;

a simulator executing said object program generated by said compiler in a specific execution environment to thereby generate execution time information of executed instructions;

a section name giving unit giving, based on said execution time information, the same section name to sections outputting time-wise proximately executed instruction strings, of a plurality of files of the object program; and a link processing unit collecting sections having the same section name into one aggregate when generating an execution program module from said object program, to thereby arrange instruction strings executed proximately time-wise over a plurality of files in such a manner that the instruction strings may be approximate space-wise.

4. An optimization object generating apparatus comprising:

a compiler generating an object program in a predetermined compilation unit from a source program made up of a plurality of files;

a simulator executing the object program generated by said compiler in a specific execution environment to thereby generate execution frequency information of executed instructions;

a section name giving unit giving different section names to sections outputting branch-destination instruction strings having a higher execution frequency and sections outputting branch-destination instruction strings having a lower execution frequency based on said execution frequency information from said simulator, so that static branch prediction may come true for deciding branching and non-branching predictably by observing a location relationship between a branch destination and a branch source when a conditional branch instruction is executed; and a link processing unit arranging said branch-destination instruction strings in a descending order of execution frequency when generating an execution program module from said object program by linking, so that said static branch prediction may come true, based on the section names.

5. An optimization object generating apparatus comprising:
- a compiler generating an object program in a predetermined compilation unit from a source program made up of a plurality of files;
- a simulator executing the object program generated by said compiler in a specific execution environment to thereby generate execution frequency information indicating executed instructions and unexecuted instructions, execution frequency information of executed instructions, and execution time information of executed instructions;
- a first section name giving unit giving section names to sections outputting executed instruction strings and sections outputting unexecuted instruction strings based on said execution information from said simulator, of a plurality of files in the object program;
- a second section name giving unit giving, section names according to an execution frequency to sections outputting executed instruction strings based on said execution frequency information from said simulator, of a plurality of files in the object program;
- a third section name giving unit giving the same section name to sections outputting time-wise proximately executed instruction strings based on said execution time information from said simulator;
- a fourth section name giving unit giving different section names to sections outputting branch-destination instruction strings having a higher execution frequency and sections outputting branch-destination instruction strings having a lower execution frequency based on said execution frequency information from said simulator, so that static branch prediction may come true for deciding branching and non-branching predictably by observing a location relationship between a branch destination and a branch source when a conditional branch instruction is executed; and
- a link processing unit collecting sections having each same section name in a plurality of files into one aggregate to thereby arrange instruction strings into an execution portion and an unexecution portion separate from each other when generating an execution program module from said object program, so as to gather instruction strings having a higher instruction strings into a small range in order to translate instruction strings executed proximately time-wise over a plurality of files into space-wise approximate instruction strings and also arrange said branch-destination instruction strings in a descending order of execution frequency so that said static branch prediction may come true.

6. An optimization object generating apparatus comprising:
- a compiler generating an object program in a predetermined compilation unit from a source program made up of a plurality of files;
- a simulator executing the object program generated by said compiler in a specific execution environment to thereby generate execution information indicating executed instructions and unexecuted instructions;
- a reference name giving unit dividing a plurality of files in said object program into sections outputting executed instruction strings and sections outputting unexecuted instruction strings separately from each other based on said execution information from said simulator, to thereby give different external reference names to said sections respectively and, at the same time, generating an external reference name list which discriminates between external reference names of sections to which executed instruction strings belong, and external reference names of sections to which unexecuted instruction strings belong; and
- a link processing unit collecting executed sections and unexecuted sections in a plurality of files into one aggregate each based on the external reference name list when generating an execution program module from said object program by linking, to thereby discriminate between an execution portion and an unexecution portion.

7. An optimization object generating apparatus comprising:
- a compiler generating an object program in a predetermined compilation unit from a source program made up of a plurality of files;
- a simulator executing the object program generated by said compiler in a specific execution environment to thereby generate execution frequency information of executed instructions;
- an external reference name giving unit giving external reference names to sections outputting executed instruction strings according to an execution frequency thereof based on said execution frequency information from said simulator, of a plurality of files in said object program, and, at the same time, generating an external reference name list which sorts the external reference names in a descending order of execution frequency; and
- a link processing unit collecting instruction strings of sections having a higher execution frequency in a plurality of files into a small range when generating an execution program module from said object program by linking.

8. An optimization object generating apparatus comprising:
- a compiler generating an object program in a predetermined compilation unit from a source program made up of a plurality of files;
- a simulator executing said object program generated by said compiler in a specific execution environment to thereby generate execution time information of executed instructions;
- an external reference name giving unit giving the same external reference name to sections outputting instruction strings executed proximately time-wise of a plurality of files in said object program based on said execution time information from said simulator, and, at the same time, generating an external reference name list which collects external reference names of sections outputting instruction strings executed proximately time-wise; and
- a link processing unit arranging instruction strings executed proximately time-wise over a plurality of files when generating an execution program module from said object program by linking, in such a manner that said instruction strings may be proximate space-wise, based on said external reference name list.

9. An optimization object generating apparatus comprising:
- a compiler generating an object program in a predetermined compilation unit from a source program made up of a plurality of files;

a simulator executing said object program generated by said compiler in a specific execution environment to thereby generate execution frequency information of executed instructions;

an external reference name giving unit giving different external reference names to sections outputting branch-destination instruction strings having a higher execution frequency and sections outputting branch-destination instruction strings having a lower execution frequency based on said execution frequency information from said simulator, so that static branch prediction may come true for deciding branching or non-branching predictably by observing a location relationship between a branch destination and a branch source when a conditional branch instruction is executed and, at the same time generating an external reference name list which arranges therein the external reference names in a descending order of execution frequency; and a link processing unit arranging said branch-destination instruction strings in a descending order of execution frequency when generating an execution program module from said object program, so that the static branch prediction may come true, based on the external reference name list.

10. An optimization object generating apparatus comprising:

a compiler generating an object program in a predetermined compilation unit from a source program made up of a plurality of files;

a simulator executing the object program generated by said compiler in a specific execution environment to thereby generate execution information indicating executed instructions and unexecuted instructions, execution frequency information of executed instructions, and execution time information of executed instructions;

a first external reference name giving unit dividing, a plurality of files in said object program into sections outputting executed instruction strings and sections outputting unexecuted instructions based on said execution information from said simulator, to thereby give different external reference names to said sections and, at the same time, generating an external reference name list which discriminates between external reference names of sections to which executed instruction strings belong and external reference names of sections to which unexecuted instruction strings belong;

a second external reference name giving unit giving external reference names according to an execution frequency to sections outputting executed instruction strings based on said execution frequency information from said simulator, of a plurality of files in said object program, and, at the same time, generating an external reference name list which sorts the external reference names in a descending order of execution frequency;

a third external reference name giving unit giving the same external reference name to sections outputting instruction strings executed proximately time-wise of a plurality of files in the object program based on said execution time information from said simulator, and, at the same time, generating an external reference name list which collects therein external reference names of sections outputting instruction strings executed proximately time-wise;

a fourth external reference name giving unit giving different external reference names to sections outputting branch-destination instruction strings having a higher execution frequency and sections outputting branch-destination instruction strings having a lower execution frequency based on said execution frequency information from said simulator, so that static branch prediction may come true for deciding branching or non-branching predictably by observing a location relationship between a branch destination and a branch source when a conditional branch instruction is executed and, at the same time generating an external reference name list which arranges therein the external reference names in a descending order of execution frequency; and a link processing unit collecting executed sections and unexecuted sections in a plurality of files into one aggregate when generating an execution program module from said object program, based on said external reference name list, each to thereby discriminate between an execution portion and an unexecution portion, so as to gather the executed sections in said plurality of files into one aggregate and gather instruction strings having a higher execution frequency into a small range in order to arrange instruction strings executed proximately time-wise over a plurality of files, so that the instruction strings may be approximate space-wise and further collectively arranging said branch-destination instruction strings in a descending order of execution frequency so that the static branch prediction may come true.

11. An optimization object generating apparatus comprising:

a compiler generating an object program in a predetermined compilation unit from a source program made up of a plurality of files;

a simulator executing said object program generated by said compiler in a specific execution environment to thereby generate data reference information indicating data referenced and data unreferenced during execution;

a section name giving unit giving, based on said data reference information from said simulator, different section names to data referenced and data unreferenced during execution, of a plurality of files in said object program; and a link processing unit collecting data having the same section name into one aggregate to thereby space-wise separate referenced data and unreferenced data from each other adjacently when generating an execution program module from said object program.

12. An optimization object generating apparatus comprising:

a compiler generating an object program in a predetermined compilation unit from a source program made up of a plurality of files;

a simulator executing said object program generated by said compiler in a specific execution environment to thereby generate reference time information of referenced data;

a section name giving unit giving, based on said reference time information from said simulator, the same section name to sections outputting data referenced proximately time-wise, of a plurality of files in said object program; and a link processing unit collecting sections having the same section name into one aggregate to thereby space-wise proximate data referenced proximately time-wise when generating an execution program module from said object program.

13. A method for generating an optimization object, comprising:
- performing a compilation by generating an object program in a predetermined compilation unit from a source program made up of a plurality of files;
- performing a simulation by executing said object program generated by said compilation in a specific execution environment to thereby generate execution information indicating executed instructions and unexecuted instructions;
- performing a section name giving by dividing, based on said execution information from said simulation, a plurality of files in said object program into sections outputting executed instruction strings and sections outputting unexecuted instruction strings to thereby give said sections different section names; and
- performing a link processing by collecting sections having an executed section name and sections having an unexecuted section name in a plurality of files into one aggregate each to thereby discriminate between an execution portion and an unexecution portion when an execution program module is generated from said object program by linking.

14. A method for generating an optimization object, comprising:
- performing a compilation by generating an object program in a predetermined compilation unit from a source program made up of a plurality of files;
- performing a simulation by executing said object program generated by said compilation in a specific execution environment to thereby generate execution frequency information indicating executed instructions;
- performing a section name giving by giving, based on said execution frequency information from said simulation, a section name according to an execution frequency to sections outputting executed instruction strings, of a plurality of files in said object program; and
- performing a link processing by collecting sections having the same section name into one aggregate to thereby gather instruction strings having a higher execution frequency into a small range when an execution program module is generated from said object program.

15. A method for generating an optimization object, comprising:
- performing a compilation by generating an object program in a predetermined compilation unit from a source program made up of a plurality of files;
- performing a simulation by executing said object program generated by said compilation step in a specific execution environment to thereby generate execution time information indicating executed instructions;
- performing a section name giving by giving, based on said execution time information from said simulation, the same section name to sections outputting instruction strings executed proximately time-wise; and
- performing a link processing by collecting sections having the same section name into one aggregate to thereby arrange instruction strings executed proximately time-wise over a plurality of files so that said instruction strings may be approximate space-wise when an execution program module is generated from said object program by linking.

16. A method for generating an optimization object, comprising:
- performing a compilation by generating an object program in a predetermined compilation unit from a source program made up of a plurality of files;
- performing a simulation by executing said object program generated by said compilation in a specific execution environment to thereby generate execution frequency information indicating executed instructions;
- performing a section name giving by giving different section names to sections outputting branch-destination instruction strings having a higher execution frequency and sections outputting branch-destination instruction strings having a lower execution frequency based on said execution frequency information from said simulation, so that static branch prediction may come true for deciding branching or non-branching predictably by observing a location relationship between a branch destination and a branch source when a conditional branch instruction is executed; and
- performing a link processing based on said section names by arranging said branch-destination instruction strings in a descending order of execution frequency so that said static branch prediction may come true when an execution program module is generated from said object program by linking.

17. A method for generating an optimization object, comprising:
- performing a compilation by generating an object program in a predetermined compilation unit from a source program made up of a plurality of files;
- performing a simulation by executing said object program generated by said compilation in a specific execution environment to thereby generate execution information indicating executed instructions and unexecuted instructions, frequency information of executed instructions, and execution time information of executed instructions;
- performing a first section name giving by outputting executed instruction strings and sections outputting unexecuted instruction strings, of a plurality of files in said object program based on said execution information from said simulation;
- performing a second section name giving by giving a section name according to an execution frequency to sections outputting executed instruction strings, of a plurality of files in said object program based on said execution frequency information from said simulation;
- performing a third section name giving by giving the same section name to sections outputting instruction strings executed proximately time-wise, of a plurality of files in said object program based on said execution time information from said simulation;
- performing a fourth section name giving by giving different section names to sections outputting branch-destination instruction strings having a higher execution frequency and sections outputting branch-destination instructions strings having a lower execution frequency based on said execution frequency information from said simulation, so that static branch prediction may come true for deciding branching and non-branching predictably by observing a location relationship between a branch destination and a branch source when a conditional branch instruction is executed; and
- performing a link processing by collecting sections having each of the same section names in a plurality of files into one aggregate when an execution program module is generated from said object program by linking, to thereby discriminate between an execution portion and an unexecution portion so as to gather instruction strings having a higher execution frequency into a small range in order to arrange instruction strings executed proximately time-wise in such a manner that said instruction strings may be approximate space-wise and also arranging said branch-destination instruction strings in a descending order of execution frequency so that said static branch prediction may come true.

18. A method for generating an optimization object, comprising:

performing a compilation by generating an object program in a predetermined compilation unit from a source program made up of a plurality of files;

performing a simulation by executing said object program generated by said compilation in a specific execution environment to thereby generate execution information indicating executed instructions and unexecuted instructions;

performing external reference name giving by dividing a plurality of files in said object program into sections outputting executed instruction strings and sections outputting unexecuted instruction strings based on said execution information from said simulation to thereby give different external reference names to said sections and, at the same time, generating an external reference name list which discriminates between external reference names of sections to which executed instruction strings belong and external reference names of sections to which unexecuted instruction strings belong; and performing a link processing by collecting executed sections and unexecuted sections in a plurality of files into one aggregate each to thereby discriminate between an execution portion and an unexecution portion when an execution program module is generated from said object program by linking, based on said external reference name list.

19. A method for generating an optimization object, comprising:

performing a compilation by generating an object program in a predetermined compilation unit from a source program made up of a plurality of files;

performing a simulation by executing said object program generated by said compilation in a specific execution environment to thereby generate execution frequency information executed instruction;

performing an external reference name giving by giving, based on said execution frequency information from said simulation, an external reference name according to an execution frequency to sections outputting executed instruction strings, of a plurality of files in said object program, and, at the same time, generating an external reference name list which sorts external reference names in a descending order of execution frequency; and performing a link processing by collecting executed sections n a plurality of files into one aggregate to thereby gather instruction strings having a higher execution frequency into a small range when an execution program module is generated from said object program by linking, based on said external reference name list.

20. A method for generating an optimization object, comprising:

performing a compilation by generating an object program in a predetermined compilation unit from a source program made up of a plurality of files;

performing a simulation by executing said object program generated by said compilation in a specific execution environment to thereby generate execution time information of executed instruction;

performing an external reference name giving by giving the same external reference name to sections outputting instruction strings executed proximately time-wise of a plurality of files in said object program based on said execution time information from said simulation and, at the same time, generating an external reference name list which collects external reference names of sections outputting instruction strings executed proximately time-wise; and performing a link processing by arranging instruction strings executed proximately time-wise over a plurality of files in such a manner that said instruction strings may be approximate space-wise when an execution program module is generated from said object program by linking, based on said external reference name list.

21. A method for generating an optimization object, comprising:

performing a compilation by generating an object program in a predetermined compilation unit from a source program made up of a plurality of files;

performing a simulation by executing said object program generated by said compilation in a specific execution environment to thereby generate execution frequency information of an executed instruction;

performing an external reference name giving by giving different external reference names to sections outputting branch-destination instruction strings having a higher execution frequency and sections outputting branch-destination instruction strings having a lower execution frequency based on said execution frequency information from said simulation, so that static branch prediction may come true for deciding branching or non-branching predictably by observing a location relationship between a branch destination and a branch source when a conditional branch instruction is executed and, at the same time, generating an external reference name list which arranges external reference names in a descending order of execution frequency; and performing a link processing by arranging said branch-destination instruction strings in a descending order of execution frequency when an execution program module is generated from said object program by linking, based on said external reference name list so that said static branch prediction may come true.

22. A method for generating an optimization object, comprising:

performing a compilation by generating an object program in a predetermined compilation unit from a source program made up of a plurality of files;

performing a simulation by executing said object program generated by said compilation in a specific execution environment to thereby generate execution information indicating executed instructions and unexecuted instructions, frequency information of executed instructions, and execution time information of executed instruction;

performing a first external reference name giving by dividing a plurality of files in said object program into sections outputting executed instruction strings and sections outputting unexecuted instruction strings based on said execution information from said simulation, to thereby give different external reference names to said sections and, at the same time, generating an external reference name list which discriminates between external reference names of sections to which executed instruction strings belong and external reference names of sections to which unexecuted instruction strings belong;

performing a second external reference name giving by giving, based on said execution frequency information from said simulation, an external reference name according to an execution frequency to sections outputting executed instruction strings, of a plurality of files in said object program;

performing a third external reference name giving by giving, based on said execution time information from said simulating, the same external reference name to sections outputting instruction strings executed proximately time-wise, of a plurality of files in said object program and, at the same time, generating an external reference name list which collects therein external reference names of sections outputting instruction strings executed proximately time-wise;

performing a fourth external reference name giving by giving, based on said execution frequency information from said simulation, different external reference names to sections outputting branch-destination instruction strings having a higher execution frequency and sections outputting branch-destination instructions strings having a lower execution frequency so that static branch prediction may come true for deciding branching and non-branching predictably by observing a location relationship between a branch destination and a branch source when a conditional branch instruction is executed at the same time generating an external reference name list which arranges therein said external reference names in a descending order of execution frequency; and performing a link processing by collecting executed sections and unexecuted sections in a plurality of files into one aggregate each when an execution program module is generated from said object program by linking, based on said external reference name list, to thereby discriminate between an execution portion and an unexecution portion so as to gather instruction strings having a higher execution frequency into a small range in order to arrange instruction strings executed proximately time-wise over a plurality of files in such a manner that said instruction strings may be approximate space-wise and also arranging said branch-destination instruction strings in a descending order of execution frequency so that said static branch prediction may come true.

23. A method for generating an optimization object, comprising:

performing a compilation by generating an object program in a predetermined compilation unit from a source program made up of a plurality of files;

performing a simulation by executing said object program generated by said compilation in a specific execution environment to thereby generate data reference information indicating referenced data and unreferenced data during execution;

performing a section name giving by giving, based on said data reference information from said simulation, different section names to data referenced and data unreferenced during execution, of a plurality of files in said object program; and performing a link processing by collecting data having the same section name into one aggregate to thereby space-wise arrange referenced data and unreferenced data separately from each other adjacently when an execution program module is generated from said object program by linking.

24. A method for generating an optimization object, comprising:

performing a compilation by generating an object program in a predetermined compilation unit from a source program made up of a plurality of files;

performing a simulation by executing said object program generated by said compilation in a specific execution environment to thereby generate reference time information of referenced data;

performing a section name giving by giving, based on said reference time information from said simulation, the same section name to data referenced proximately time-wise of a plurality of files in said object program; and performing a link processing by collecting sections having the same section name into one aggregate to thereby arrange data referenced proximately time-wise so that said data may be approximate space-wise when an execution program module is generated from said object program by linking.

25. A method for generating an optimization object, comprising:

compiling an object program in a predetermined compilation unit from a source program made up of a plurality of files;

executing the object program to generate execution information indicating executed instructions and unexecuted instructions;

dividing a plurality of files in the object program into sections outputting executed instruction strings and sections outputting unexecuted instruction strings based on the execution information from said executing; and collecting sections outputting executed instruction strings and collecting sections outputting unexecuted instruction strings to thereby discriminate between an execution portion and a non-execution portion.

* * * * *